United States Patent
Azima et al.

(10) Patent No.: US 7,194,098 B2
(45) Date of Patent: Mar. 20, 2007

(54) ACOUSTIC DEVICE

(75) Inventors: Henry Azima, Cambridge (GB); Martin Colloms, London (GB); Neil Harris, Cambridge (GB)

(73) Assignee: New Transducers Limited, Huntingdon (GB)

( * ) Notice: Subject to any disclaimer, the term of this patent is extended or adjusted under 35 U.S.C. 154(b) by 0 days.

(21) Appl. No.: 11/072,618

(22) Filed: Mar. 7, 2005

(65) Prior Publication Data

US 2005/0147274 A1   Jul. 7, 2005

Related U.S. Application Data

(63) Continuation of application No. 09/978,663, filed on Oct. 18, 2001, now Pat. No. 6,904,154, which is a continuation of application No. 08/707,012, filed on Sep. 3, 1996, now Pat. No. 6,332,029.

(30) Foreign Application Priority Data

| Sep. 2, 1995 | (GB) | ................................. 9517918.0 |
| Oct. 31, 1995 | (GB) | ................................. 9522281.6 |
| Mar. 30, 1996 | (GB) | ................................. 9606836.6 |

(51) Int. Cl.
   *H04R 25/00* (2006.01)

(52) U.S. Cl. ........................ 381/152; 381/182; 381/431

(58) Field of Classification Search ................ 381/152, 381/190–191, 431, 182
   See application file for complete search history.

(56) References Cited

U.S. PATENT DOCUMENTS

| 1,500,331 | A | 7/1924 | Marriott |
| 1,735,860 | A | 11/1929 | Hutchison |
| 1,763,052 | A | 6/1930 | Hopkins |
| 1,767,777 | A | 6/1930 | Thomas |
| 1,773,910 | A | 8/1930 | Lane |
| 1,893,049 | A | 1/1933 | Boudette |

(Continued)

FOREIGN PATENT DOCUMENTS

DE           484872         10/1929

(Continued)

OTHER PUBLICATIONS

G. V. Dreiden et al., "Interference-holographic study of oscillations of honeycomb diaphragms," Soviet Physics: Technical Physics, vol. 37, No. 3 (Mar. 1992), American Institute of Physics (New York).

(Continued)

*Primary Examiner*—Suhan Ni
(74) *Attorney, Agent, or Firm*—Foley & Lardner LLP

(57) ABSTRACT

Acoustic device including a member extending transversely of its thickness and capable of sustaining bending waves at least over an intendedly consequentially acoustically active area of the transverse extent of said member, the member having, by reason of orderly design methodology disclosed and claimed, a distribution of resonant modes of its natural bending wave vibration at least over said area that is dependent on values of particular parameters of said members, including geometrical configuration and directional bending stiffness(es), which values have been selected to predetermine said distribution of natural resonant modes being consonant with required achievable acoustic action of said member for operation of said device over a desired operative acoustic frequency range.

32 Claims, 48 Drawing Sheets

U.S. PATENT DOCUMENTS

| | | |
|---|---|---|
| 1,944,861 A | 1/1934 | Du Puy |
| 2,063,944 A | 12/1936 | Pierce |
| 2,172,066 A | 9/1939 | Logsdon |
| 2,744,042 A | 5/1956 | Pace |
| 3,032,136 A | 5/1962 | Hegeman |
| 3,111,187 A | 11/1963 | Barlow |
| 3,115,947 A | 12/1963 | Wood |
| 3,164,221 A | 1/1965 | Rich |
| 3,247,925 A | 4/1966 | Warnaka |
| 3,272,281 A | 9/1966 | Rutter |
| 3,311,712 A | 3/1967 | Cain |
| 3,347,335 A | 10/1967 | Watters et al. |
| 3,422,921 A | 1/1969 | Warnaka |
| 3,423,543 A | 1/1969 | Kompanck |
| 3,449,531 A | 6/1969 | Ashworth |
| 3,509,282 A | 4/1970 | Ashworth |
| 3,509,290 A | 4/1970 | Mochida et al. |
| 3,596,733 A | 8/1971 | Bertagni |
| 3,636,281 A | 1/1972 | Cozart |
| 3,722,617 A | 3/1973 | Bertagni |
| 3,728,497 A | 4/1973 | Komatsu |
| 3,767,005 A | 10/1973 | Bertagni |
| 3,779,336 A | 12/1973 | Bertagni |
| 3,801,943 A | 4/1974 | Bertagni |
| 3,925,627 A | 12/1975 | Ashworth |
| 4,003,449 A | 1/1977 | Bertagni |
| 4,055,732 A | 10/1977 | Yoshimura et al. |
| 4,127,749 A | 11/1978 | Atoji et al. |
| 4,184,563 A | 1/1980 | Bertagni |
| 4,257,325 A | 3/1981 | Bertagni |
| 4,352,961 A | 10/1982 | Kumada et al. |
| 4,362,907 A | 12/1982 | Polacsek |
| 4,368,401 A | 1/1983 | Martin et al. |
| 4,392,027 A | 7/1983 | Bock |
| 4,439,640 A | 3/1984 | Takaya |
| 4,471,173 A | 9/1984 | Winey |
| 4,506,117 A | 3/1985 | Fresard |
| 4,514,599 A | 4/1985 | Yanagishima et al. |
| 4,607,747 A | 8/1986 | Steiner |
| 4,654,554 A | 3/1987 | Kishi |
| 4,751,419 A | 6/1988 | Takahata |
| 4,817,152 A | 3/1989 | Lee |
| 4,997,058 A | 3/1991 | Bertagni |
| 5,007,707 A | 4/1991 | Bertagni |
| 5,025,474 A | 6/1991 | Tanaka et al. |
| 5,091,713 A | 2/1992 | Horne et al. |
| 5,144,451 A | 9/1992 | Yamamoto et al. |
| 5,291,556 A | 3/1994 | Gale |
| 5,333,202 A | 7/1994 | Okaya et al. |
| 5,347,630 A | 9/1994 | Ishizawa et al. |
| 5,349,575 A | 9/1994 | Park |
| 5,400,414 A | 3/1995 | Thiele |
| 5,425,107 A | 6/1995 | Bertagni et al. |
| 5,539,835 A | 7/1996 | Bertagni et al. |
| 5,615,275 A | 3/1997 | Bertagni |

FOREIGN PATENT DOCUMENTS

| | | |
|---|---|---|
| DE | 2 612 450 | 10/1977 |
| DE | 3 730 305 C1 | 3/1989 |
| DE | 4 117 022 A1 | 2/1992 |
| DE | 41 21 686.5 | 1/1993 |
| EP | 0 114 910 A1 | 8/1984 |
| FR | 2 241 942 | 3/1975 |
| FR | 2 649 575 | 1/1991 |
| GB | 1 369 928 | 10/1974 |
| GB | 1 447 588 | 8/1976 |
| GB | 2 010 637 A | 6/1979 |
| GB | 1 550 924 | 8/1979 |
| GB | 2 023 375 A | 12/1979 |
| GB | 2 011 661 B | 3/1982 |
| GB | 2 115 646 A | 9/1983 |
| GB | 2 161 672 A | 1/1986 |
| GB | 2 219 712 A | 12/1989 |
| GB | 2 262 861 A | 6/1993 |
| GB | 2 262 861 B | 6/1994 |
| HU | 193461 | 2/1989 |
| JP | 58 008000 A | 1/1983 |
| JP | 1 245 795 | 9/1989 |
| NL | 142307 | 12/1969 |
| WO | WO 89/00798 | 1/1989 |
| WO | WO 90/03025 | 3/1990 |
| WO | WO 92/03024 | 2/1992 |
| WO | WO 93/07729 | 4/1993 |
| WO | WO 94/27331 | 11/1994 |
| WO | WO 95/01080 | 1/1995 |
| WO | WO 95/14296 | 5/1995 |
| WO | WO 95/31805 | 11/1995 |
| WO | WO 96/01547 | 1/1996 |

OTHER PUBLICATIONS

"Top Down Surround Sound™", Advance Speaker Technology for Automotive Applications, OnActive Technologies, LLC (Fact Sheet), Feb. 23, 1996.

"Planar Loudspeakers: an alternative technology", Frederick J. Ampel, Sound & Video Contractor, Mar. 20, 1993.

"Nonlinear Vibrations in Plates and Gongs", Thomas D. Rossing et al., J. Acoustical Society of America 73(1), Jan. 1983, pp. 345-351.

"Sampling Statistics for Vibrating Rectangular Plates", Richard V. Waterhouse et al., J. Acoustical Society of America 72(6), Dec. 1982, pp. 1863-1869.

"Head Linings Set Up Top Down Sound", Eureka Magazine, Apr. 1996, pp. 22.

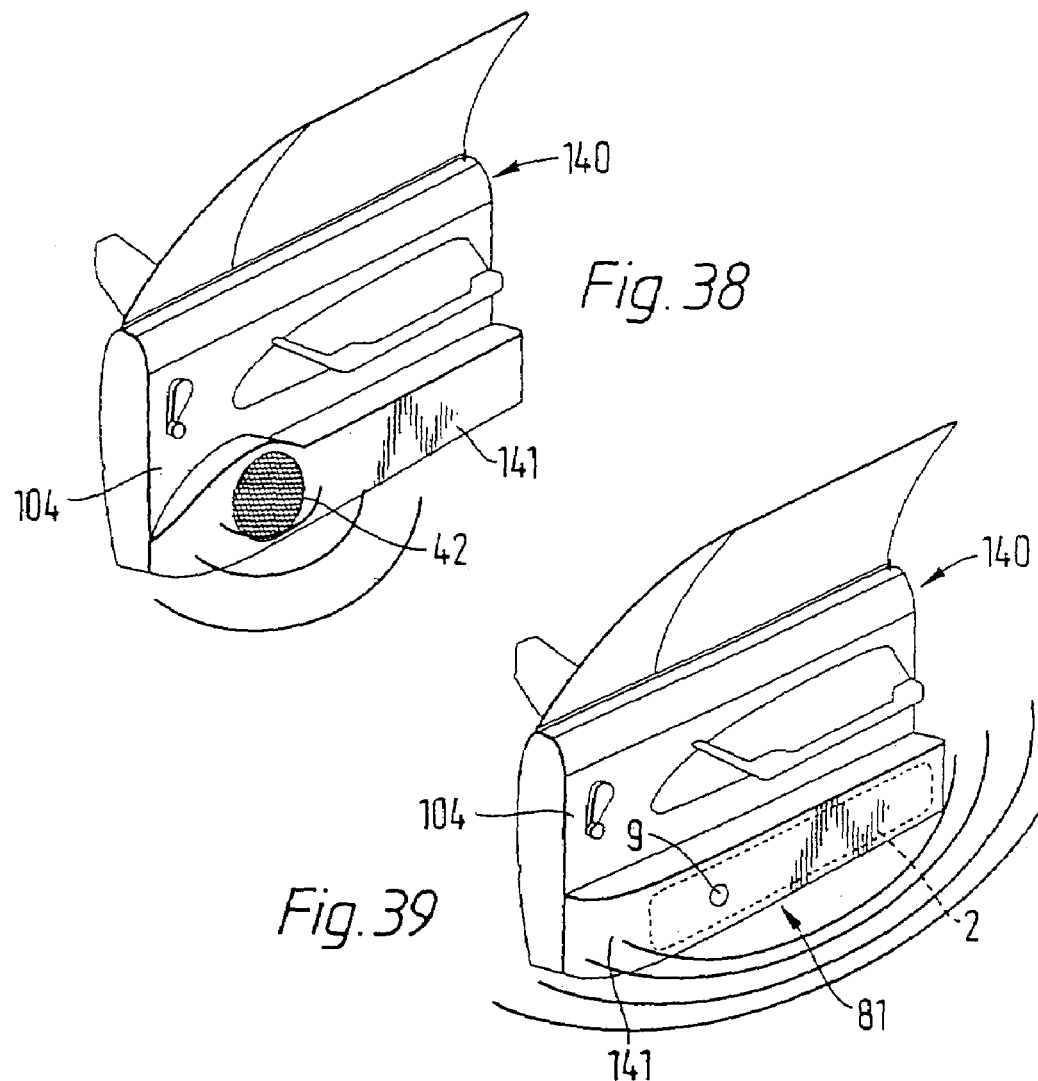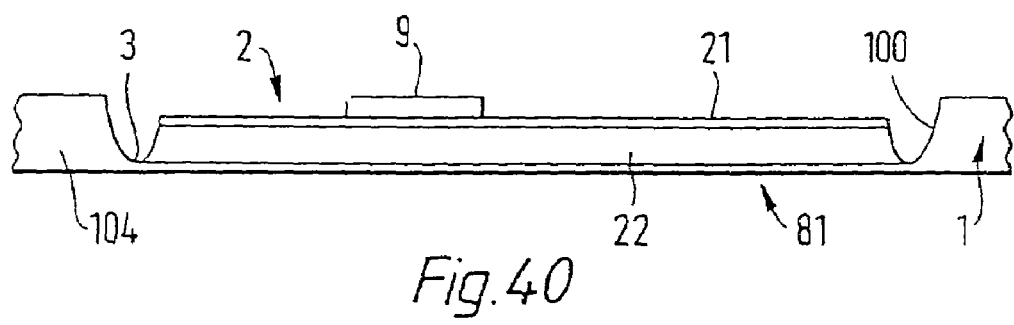

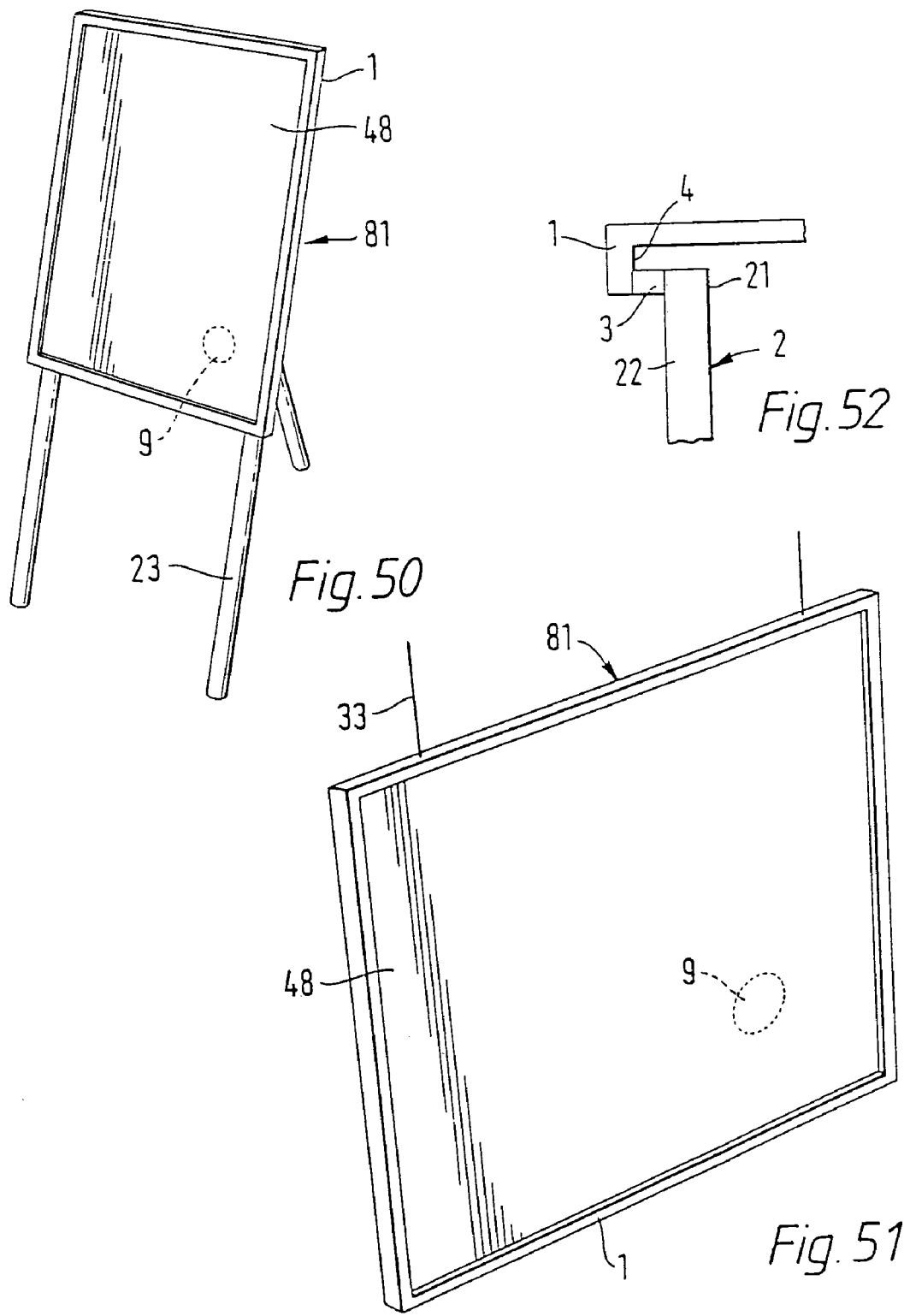

ACOUSTIC DEVICE

This application is a continuation of U.S. application Ser. No. 09/978,663, filed Oct. 18, 2001 now U.S. Pat. No. 6,904,154, which is a continuation of U.S. application Ser. No. 08/707,012, filed Sep. 3, 1996 (now U.S. Pat. No. 6,332,029). Both of these prior applications are incorporated herein by reference.

FIELD OF THE INVENTION

The invention relates to acoustic devices for use in or as loudspeakers when driven or excited, usually by electrical signals via electrodynamic means; or in or as microphones when driven by incident acoustic energy, usually to produce a corresponding electrical signal; or in or for other acoustic devices or purposes.

United Kingdom Patent applications as follows: No. 95/17918 filed 2 Sep. 1995 for "Acoustic Device" No. 95/22281 filed 31 Oct. 1995 for "Acoustic Device" No. 96/06836 filed 30 Mar. 1996 for "Acoustic Device" from which priority is claimed are hereby incorporated by reference, in their entirety, into this application.

GENERAL BACKGROUND

Conventional loudspeakers in widespread use employ acoustic air-driving elements of so-called "cone" type. The or each cone element is mechanically driven at its smaller end in a pistonic manner, normally by a moving coil of electromagnetic means having an operatively associated fixed magnet assembly mounted to a frame or chassis of the loudspeaker in accurate registration with the moving coil and cone assembly. Anti-phase air-excitation to rear of this assembly needs careful baffle/enclosure design to avoid cancellation effects in desired acoustic output from the front of the cone element. Naturally stiff lightweight sheet materials have been used for such cones, as well as very stiff composite sandwich structures that do not bend at all over the working frequency range; even cone elements with tailored reduction of stiffness outwardly with the aim of reducing the effective radiating area with increasing frequency to improve acoustic pistonic effects, including combating increasingly narrow directivity at high frequency. Excellent results are obtainable, e.g. using different sizes/types of cone elements and associated drive units for different frequency ranges, with appropriate electronic "crossover" circuitry, often all in one loudspeaker housing. However, mass and bulk tend to be substantial. Moreover, sound produced is constrained by its origin with one or more cone elements whose axiality imposes unavoidably high directionality, particularly the higher the frequency; and loudness very noticeably follows the inverse square law of radiation relative to distance, as though from a point source.

Not surprisingly, much interest and effort has long been directed to use of flatter acoustic elements or diaphragms to occupy less space, hopefully be less directional, and preferably be less weighty. Many proposals have resulted. Some use stretched webs or films of flexible material clamped at their edges in frames, e.g. along with bonded-on current-carrying strips or wires for electromagnetic drive using large and heavy arrays of perforated magnets, or with applied surface conduction for electrostatic drive from fixed perforated polarised electrode plates requiring large high-voltage transformers and subject to loudness being limited by voltage breakdown. Drive operation of these stretched film loudspeakers is inherently pistonic, and there tend to be unwanted modal "drum" and related resonances at discrete frequencies requiring specific damping provisions for satisfactory performance.

Other prior proposals have been based on using panels of expanded or foamed polystyrene edge-mounted in housings and also rely primarily on pistonic action. One example, known under the trade name 'Polyplanar', has conventional moving coil drive. Another, known as "Orthophase" has an array of magnets and coils disposed over its surface to try to achieve uniphase drive. Yet others, as available from Sound Advance Systems of California, have variously shaped flat surface polystyrene panels with complex rear ribbing and thinned edge profiling with a conventional moving coil driver mechanisms mounted to a chassis. Bertagni, from Argentina, has patented such proposals made from bonded expanded polystyrene beads, ostensibly based on how musical instruments produce sound, and requiring complex edge-clamped structures of variable thickness/flexibility, but also understood to rely basically on pistonic action. Yamaha of Japan made a large loudspeaker using a thick polystyrene diaphragm of "ear-shape" suspended at its perimeter, with moving coil drive requiring a large chassis for registering powerful magnet provision, effectively as a very large solid-cone, pistonic-action loudspeaker with a degree of self-baffling.

In a sense, these other proposals can be seen as being variations on the simple theme of almost any panel having potential for sound amplification, as long-known relative to musical boxes placed on a table top. In the 1970's, this theme was the basis for a self-contained electrodynamic unit known as "Sonance" (see U.S. Pat. No. 3,728,497) and intended for screwing or gluing to virtually any surface, including under a table top. Not surprisingly, absence of any design control over attachment surfaces/panels, together with no better than moderate efficiency, led only to unpredictable results not satisfactory for high quality sound reproduction.

PARTICULAR BACKGROUND TO INVENTIVE CONCEPTS

It is one object of this invention to provide an acoustic element with non-pistonic action in an improved manner leading, inter alia, to ready implementation as more viable flat panel loudspeakers.

Our approach involved relies on exploiting resonance, i.e. departing radically from long and strongly established presumptions regarding quality of sound reproduction being critically reliant upon avoiding resonance effects.

Our approach involves use of materials capable of sustaining bending waves and generating sound from action of those bending waves. General theory for analysis and calculations concerning bending wave action and related resonances in two-dimensional panel structures is long known and understood, for various purposes. For purposes hereof, we find that finite element analysis is particularly suitable and useful in analysing bending wave action in panel-like structures; and arriving at remarkably effective and compact loudspeakers, including with capability for wide-band performance of great clarity/intelligibility, and well-suited to good quality sound reproduction. Moreover, other valuable passive as well as active acoustic devices and applications arise. At least one prima facie attractive and likely mathematical technique, namely statistical energy analysis, is actually ineffective.

We know of a few prior proposals for sound reproduction based on bending wave action, though none appreciate or foreshadow the analysis, understanding and practical teaching hereof. Two of these proposals emphasise importance of "the coincidence frequency", where the speed of sound in panels subject to bending wave action matches the speed of sound in air. One, see U.S. Pat. No. 3,347,335 (Watters), proposes a light stiff strip element of composite structure that is excited whilst clamped so that controlled intendedly substantially single-axis bending waves are generated over a specified frequency range for which the panel is deliberately designed for a constant velocity of sound. The particular intention is to produce a highly directional sound output, and operate the strip only above the coincidence frequency, stated as typically in the range 700 Hz to 2 KHz. A weakened shear property is said to help meet the constant sound velocity desideratum.

Another, see WO92/03024, specifically illustrates and describes a one-meter square loudspeaker panel wholly of aluminium alloy having a honeycomb cellular core between facing sheets giving an extremely high stiffness in all orientations. This panel is required to be mounted to a support in a free undamped manner, and is shown mechanically excited at a corner by a vibrator device acting reactively from secure mounting to the support. Only limited working acoustic range is indicated, said to be suited to applications such as public address systems; and operation is again limited to being wholly above the coincidence frequency. Whilst very high mechanical efficiency is indicated for sound energy conversion, the described panel is so stiff that it is difficult to drive, requiring a very large and cumbersome moving-coil driver. In fact, overall efficiency from the viewpoint of electrical input is even less than for conventional loudspeakers. It is also very expensive to make; and rather heavy, particularly with its support frame. Limitations in operating frequency range of this proposal were confirmed, and at first appeared to preclude achieving practical loudspeakers, even for public address applications where there is acceptance of limited range/quality of sound reproduction but expectation/requirement for quite low-cost units.

However, our own theoretical and practical research and development reveals, as just outlined above, ways of designing and operating a panel as a well-behaved acoustic element that can have a surprisingly wide frequency coverage and remarkable sound distribution and loudness capability, including with low or virtually no perceived directionality and reduced proximity effects as to loudness. Indeed, when appropriately driven by electromechanical transducers, a wide range of lightweight flat or curved loudspeakers can be produced, for a wide range of applications, to some of which such loudspeakers hereof seem uniquely suitable, whether or not with wide frequency coverage. It is noted again that other acoustic devices arise of profoundly novel and useful characteristics, as will become apparent. It is also noted that, in contrast to other mathematical techniques, specifically statistical energy analysis, use of finite element analysis could, at least as applied by us, have revealed structural problems as the reasons for frequency limitation of WO92/03024 and its poor placement of its drive means being an inappropriate choice.

Essentially, our research reverted to seeking basic understanding of acoustic implications of the phenomenon by which any member with extent mainly transversely of its thickness and capable of bending wave action will have a characteristic complex natural bending wave vibration. Of particular acoustic relevance are contributions of resonant modes at frequencies related to inherent fundamental frequencies for the member concerned to such characteristic complex natural bending wave vibration. Each such resonant mode contributes a particular component of bending wave vibration ranging over said extent of the member between vibrationally most active subareas and vibrationally inactive subareas, corresponding to "anti-nodes" and "nodes" (or "dead spots"), respectively. We found that combination of the bending wave vibration components from the totality of the natural resonant modes results in grouping of nodes and anti-nodes by superposition and clustering at subareas forming regions of substantially more and less vibrational bending wave activity that can be considered as "combined anti-nodes" and "combined dead spots", respectively. It was confirmed that most such members have poor acoustical performance, especially at frequencies effectively excluded by WO92/03024, i.e. at lower frequencies going below the coincidence frequency and down towards the largest or fundamental wavelengths of possible bending wave vibration for the member concerned.

However, further as foreshadowed above, we have specifically established how, by careful analysis and orderly design, some such members can very greatly outperform the teaching of WO92/03024 by reproducing a surprisingly wide audio frequency range with remarkable clarity when used in loudspeakers. Indeed, the acoustic characteristics of such members can be so well-ordered and/or prescribed that uses are seen for the members, in themselves, as passive acoustic devices for such purposes as providing reverberation or acoustic filtering or setting/altering, or generally improving, room etc acoustics.

Sounding boards are, of course, very well-known for stringed musical instruments such as pianos and the violin family. The making of successful such sounding boards is very old, and they are invariably held effectively rigidly at edges and/or clamped medially. To date, getting good/acceptable results has tended to be very much of a "black art" nature, involving quite complex shapes and generally achieved essentially pragmatically, typically by using quite complex proven templates. Indeed, even now, best results are generally accepted as involving highly skilled crafting by hand. This contrasts strongly with what is now put forward herein as being readily achievable, including for essentially free-standing or self-contained devices, by straightforward application of highly practical teachings, including what can be, or can include, very simple panel-like structures. Indeed, affording simpler alternatives to traditional sounding boards, particularly of calculated and orderly design as herein, is seen as an aspect of this invention.

The calculated and orderly design criteria we are now able to put forward, from analysis and experiment in the light of insights gained from profoundly improved explanation and understanding of acoustical bending wave action, are based on achieving beneficial distributions of bending wave vibrations associated with resonant modes in a said member. These improvements are achievable by the invention even for simple shapes of said members that satisfy proportioning criteria taking appropriate account of actual physical parameters relevant to bending wave action, see further below. Also, for any associated transducer means, highly effective location and other criteria are developed herein, see also further below. In relation to this invention herein, the term "transducer means" is intended to encompass, as appropriate, single and plural transducers, as well as any type and structure of transducer that will serve to excite bending waves, whether of electromagnetic or piezoelectric types specifically described later, or of other types, such as magnetostrictive.

Moreover, desired or required effective control of edge vibration effects is readily available by edge framing simply carried by the member itself, even, in some cases, relying only on holding edges or resting same on a surface; and selective damping can be applied at localised medial positions in operative areas of said members. Edge framing may be selective at positions affecting resonant modes at frequencies of interest, but more usually complete, though perhaps with selective enhancement of intermediate damping material. Generally, however, such intermediate damping material should not clamp the edges against desired vibrational action but should be at least in light contact, particular requirements necessarily being determined case-by-case in finalising any product design, but generally not being highly critical. Requirement(s) of or for edge-damping will depend on such factors as testing performance to assure avoidance of "ringing" in desired operation, materials of members hereof and size, including vibrational energy reaching edges. Localised medial damping will also be at areal positions appropriate to frequencies of interest and/or by way of affixed damping and/or stiffening material dimensioned to correspond with wavelength(s) of frequencies of interest.

GENERAL ASPECTS OF INVENTION

Reverting to our research and development work, poor acoustic performance in said members, considered generally, appears to be influenced by presence and distribution of the above-mentioned dead spots and combined dead spots in the transverse extent of the member; and/or the converse, i.e. by spacing and distribution, or spread, of said anti-nodes and combined anti-nodes and/or complexity of combined anti-nodes. We find, as aspects of invention, that inherently better acoustical performance or action arises from care taken to reduce, preferably as near as practicably eliminate, occurrence of combined dead spots; and/or the converse of more evenly distributing the anti-nodes and combined anti-nodes over said transverse extent of the member, preferably at or approaching as evenly as practicable. At least in/for embodiments of the invention for application in audio frequency ranges, particular attention is directed to resonant modes at lower frequencies than considered to be of useful interest in WO92/03024. It is found to be highly effective for attention to be directed to lower frequency resonant modes in a much broader frequency range of actual operational interest, even to resonant modes that may be below a high-starting such frequency range of interest, i.e. closer or closest to the lowest possible, or conceptual fundamentals, for natural bending wave vibration in the member. The normal variation of bending wave speed with frequency in practical materials and structures is fully accepted in members hereof without finding problems.

We further find, as an aspect of invention that best location of transducer means is at one or more positions coupling to one or more said combined anti-nodes whereby many, preferably a number considered to be a practical maximum or optimum, further preferably all, of said lower frequency resonant modes in an operational acoustic range of interest have vibrationally active anti-nodes—which can be by way of plural transducers on a combination basis using two or more said positions, advantageously in as complementary a manner as available relative to the resonant mode vibrations at the positions concerned. Such positions are different from all known prior art, and are even found to be advantageous in use beyond said members with preferentially orderly distribution of said anti-nodes and combined anti-nodes.

A most useful practical criterion, and aspect of this invention, is for frequencies of natural resonant modes of interest to have a numerical sequence or spread that is more even, preferably at or approaching best available, seeking to reduce or avoid unduly close groupings and/or erratic or disparate spacings or differences, basically involving choosing or prescribing and using relevant parameters of said members that reduce clusterings or disparities of spacings of frequencies of natural resonant modes from what generally produces unsatisfactory acoustic action/performance towards better or improved, specifically more satisfactory or at least more acceptable, acoustic performance. Changes in frequencies of resonant modes, including in ordering thereof, can occur for different relative dimensions of said members but are readily calculable and taken into account. Generally, for resonant modes relatable with different conceptual fundamentals, this criterion/aspect is herein seen as "interleaving" of the resonant mode frequencies concerned.

Another useful criterion, and aspect of the invention relative to shape(s) and proportioning of said transverse extents of members hereof, and location(s) of transducer means of "active" acoustic devices, concerns desirability of only a small and orderly spread of transit times for bending waves at resonant mode frequencies relative to the transducer means and reflecting edges of the member, including taking account of the speed of sound, i.e. representative bending waves, being frequency dependent, whether or not in preferred sandwich-type laminated structures, see further below. Close orderly arrivals, say just short of coincidence, of such resonant mode bending waves back at the transducer means after relevant complete traversals of said member involving two edge reflections have highly beneficial effects as to rapid spreading or augmenting buildup of bending wave action out over the whole area of the member.

It is postulated and envisaged herein that acoustic performance of members will get better and better the nearer they approach a substantially uniform spread or distribution of natural resonance modes and related vibrational bending wave action over at least the intendedly operative area of the member. In practice, achievement to date has generally been rather less, though highly impressive as to acoustic results. Indeed, the advances hereof can be taken up to greater or lesser extents as a matter of choice, and at least transducer locating, design and mounting teachings hereof can have very useful application even where care is not taken to improve resonant mode distribution and localised complexity.

FURTHER PRIOR PROPOSALS

It is believed to be convenient, at this point, to review two prior patent specifications first published after the priority dates for this application, perhaps particularly as it is found feasible, often advantageous, to implement the present invention for loudspeakers using piezoelectric transducers. WO 95/31805 and WO 96/01547 both concern, inter alia, loudspeaker proposals by way of piezoelectric driver patches, whether applied to panels of lids of laptop computers or to fold-out panels of compact disc players, or within shells of video display units or disk drives of computers, or to lightweight polystyrene tiles, or supplied as an add-on sound unit for mounting to other surfaces. Illustrations of preferred embodiments show substantially centrally located paired piezoelectric drive patches: and much is made of such things as hollowness of associated laptop lid, and other specific three-dimensional housings including a particularly preferred loudspeaker housing of triangular-section; also of various steps proposed for avoiding panel resonances. These latter steps are clearly merely of an ad hoc or "try-it-and-see" nature, involving the addition, as and where found to be effective, of damping and stiffening strips until sine-wave-sweep tests show unwanted vibration/resonance to have stopped. Compared with teaching hereof, there is no indication of any significant understanding of the mathematics and physics of the processes involved in generating sound by bending wave action in panels; and no appreciation of the contribution to be gained from orderly panel design and transducer location etc for good acoustic performance. At least mostly, the paired piezoelectric patches are applied to surfaces incapable of bending wave action as herein. It is not clear that significantly more is involved than was the case for the above-mentioned much older intendedly and inherently pistonic acoustic driver units to be affixed to any surface. Certainly, teaching of these prior references appears to see beneficial contributions from hollow volumes of housings, usually with problems to be solved by reducing resonances. That conforms to historical presumptions, thus contrasts starkly with this invention, where resonances are basic mechanisms to be positively predetermined/encouraged, including optimised/maximised in an orderly manner, for useful acoustic performance/action of panels in themselves; also positively utilised in combination with predetermined asymmetric location of advantageous carefully designed electromagnetic transducers that include moving coil as well as piezoelectric types.

SUMMARY OF THE INVENTION

The understanding we have gained leads to many ways and viewpoints in and from which this invention is novel and can be characterised in various aspects, for itself and relative to the known prior art. Reference is directed to the claims, particularly to independent claims representing a selection of such aspects of this invention, though, as will become clear, there are more and other alternatives, both general and specific.

PRACTICAL IMPLEMENTATION OF THE INVENTION

Our basic research and development has particular relevance to practical implementation of this invention, and is now reviewed in more detail.

Many factors actually or potentially contribute to bending wave action, thus frequencies and distribution etc of vibration anti-nodes associated with natural resonant modes in members hereof. As first done for members where relevant materials parameters contributing to actual bending wave action, specifically to bending stiffness, shear etc, were kept substantially the same in all or at least particular directions of interest, it was established that shape and dimensions of the members make particularly significant contributions of great value to realising inventive aspects and achieving practical device embodiments.

Dimensions, as such, for any particular shape, are mainly effective by their inherent contributions to determining lowest natural frequencies of possible actual bending wave vibration for the member, even to conceptual frequencies effectively as different fundamentals for related frequencies of natural resonant modes, including by reason of angled relation of directions of dimensions concerned.

As to shape, particularly proportions as to relative values of defining geometric parameters, it first proved useful to consider simple geometries, specifically members bounded by rectangles, or by closed conic sections, i.e. elliptical; and to do so in the above-mentioned context of a said member that is substantially isotropic in bending stiffness in all directions, or at least much the same parallel to sides of a rectangle or to major and minor axes of an ellipse or super-ellipse, though see further below regarding impact and utility of anisotropy.

SPECIFIC APPLICATIONS/FURTHER ASPECTS OF INVENTION

For a rectangular shape, an artificial first construct found to be of particular practical value concerns distributions of vibration anti-nodes associated with natural resonant modes, and of related dead spots, that would theoretically arise for each of the different lengths of its sides when considered alone, i.e. each as a single axis for bending wave action, as if there could be no other bending action in the member. This is so great an over-simplification as to be surprising that any useful results arise. However, it is routine, mathematically, including for computer modeling by commercially available maths program packages, to generate data representing such artificially theory. Thus, frequencies of fundamental and natural resonant modes can be calculated/computed for any dimensional values, and corresponding patterns for vibrational energies at various positions or elemental sub-areas in the transverse extent of the member concerned generated individually for any mode, including usefully presented in tables/matrices, or graphically. Such individual patterns for related resonant modes can be superposed at will as components of a composite pattern of at least part of notional one-axis natural bending wave action that will have complementary distributions of vibrationally more/most active regions and vibrationally less/least active regions; and selection for such modes to be superposed, thus parts of notional one-axis natural bending wave actions to be considered, is proposed on the basis of proven effectiveness for purposes hereof. Such composite pattern generation were used to find orthogonally-related dimensional values (corresponding to the different sides of a rectangular shape) for which respective said composite patterns will, as notionally superposed, produce at least some useful degree of "matching" between the vibrationally more/most active regions of one of the composite patterns concerned and the vibrationally less/least active regions of the other of the composite patterns concerned, and vice versa.

This matching can be seen, albeit through admittedly artificially simplified/idealised approximation, as aimed to reduce the coincidences that would otherwise contribute to the aforesaid combined dead spots of members or panels to which teaching hereof has not been applied. Moreover, this matching can be sought to any achievable beneficial extent, including maximally or optimally for reducing or minimising notional such contributions to combined dead spots, at least within limits of our approximations. The selected resonant mode frequencies for the two composite patterns involved can, preferably do, include the lower orders of interest or relevance in or to an acoustic range of desired operation, as outlined above, even including below same if beneficial.

In theory, perhaps, best matching should be sought for as many as possible of the resonant modes and corresponding composite patterns of our above construct. In practice, and as applies to the above modal frequency interleaving, very satisfactory results have been obtained from limiting attention individually and collectively to particular said lower orders of resonant modes, say up to the third orders of each conceptually fundamental frequency (making nine in all for said transverse extents of the two-dimensional said members), preferably up to at least the fifth orders (total twenty five), perhaps up to or beyond the seventh orders, for maximising or optimising matching. Better modeling, as later done using finite element analysis, will usually show other resonance, including lowest modes affected or attributable to diagonal dimensions and/or non-bending wave modes, which are additional to considerations for this approximate construct. In successful actual development work, the resonant bending wave modes taken into account in these matching routines were at frequencies going consecutively, considered as a single combined sequence, from conceptual frequencies treated as fundamentals for the two sides of a rectangle up to over twenty, usually thirty or more, preferably at least twenty five. Results show very satisfactory purely consequential orderliness, spread and acoustic action/performance for higher frequency resonant modes.

Interestingly, and valuably in practice, particular aspect ratios for side dimensions of a rectangular shape with isotropic bending stiffness emerged as being of usefully general application. One such preferred and highly effective aspect ratio is at about 13.4% from square (i.e. out of equality of sides), specifically at 0.882 or 1.134; and much of our early development work has used this value. However, another potentially valuable aspect ratio has been noted at about 37% out of square, though damping control of at least some of lowest resonant modes may be particularly advisable/valuable. There are others that can be viable, too, at least if lower efficacy is acceptable, whether or not comparably effective, or merely adjudged acceptably so for particular applications/devices and related desired operational frequency ranges, or (e.g. in specific loudspeaker implementations) utilised on a compromise basis including minimising contribution(s) to acoustic action/performance of unwanted frequencies of resonant modes, perhaps particularly below desired operational frequency range, see also further below regarding location of transducer means.

As should be abundantly clear, the above construct involving superposition of composite patterns is not put forward as a true representation of actual natural bending wave vibration in any particular said member, only as an approximation found to have practical value. The actual natural bending wave vibration in any said member will be very complex, making effectiveness of the construct all the more surprising. Thus, there must be interactive effects between such main conceptually fundamental-related bending wave actions, as notionally considered in the above construct for two side dimensions and directions of substantially rectangular shapes, including localised bending for one affecting the other; also edge effects, including by way of reflection and damping, further to contribute to overall transverse bending wave vibration and distribution of vibrationally more/most active areas or combined anti-nodes. Whilst such effects can generally be expected to be helpful and/or of little impact for higher frequencies of resonant modes, with necessarily higher individual node populations of said transverse extent of the member, we have further established that particular unwanted vibrations and/or vibrational reinforcements can be dealt with by said damping, i.e. as overall or selective edge damping and/or selective localised medial damping at relevant position(s) of said extent.

There is, however, one effect that it has been found can be beneficial to take into specific account, at least as useful refinement, namely, for a substantially rectangular said member, the resonant modes associated with is diagonal dimension. Assuring at least mainly helpful contribution to desired distribution(s) of resonant modes can be aided by cropping or trimming or curving of corners, or forming to such shapes, though see further below regarding anisotropy of bending stiffness. Sensible practical limits for consideration of this refinement as to resulting shape and transverse area reduction arise naturally from approaching some other analysable shape, e.g. super-ellipses or at least regular polygons, say preferably not reducing the diagonal beyond larger or smaller of side dimensions. Useful, though not essential, further refinement is seen in such corner cropping or trimming being differential, at least for corners of different diagonals, whether to different extents for each, say in a mutual relationship producing a similar "matching" (for diagonals-related resonant modes) to that above for the side dimensions, and perhaps further relative to or effectively continuing or complementing or usefully compounding the sides-dimension matching ratio. Application of effective shortening to one diagonal only can be enough, in practice, say to each end equally for a resulting shortening to medially between full diagonal dimension and longer side dimension, preferably to attain progression of side and diagonal dimensions at or approaching maintaining or repeating above preferential aspect ratio for successively increasing values, conveniently so approaching by substantial evenness of dimensional differences or a straight-line dimensional relationship. Satisfactory shortening of only one diagonal of a said rectangular member, at least idealised for isotropy of bending stiffness, is seen at about 15% or about 10% short for above about 13.4% and about 37% aspect ratios, respectively.

The aforesaid construct, involving generating/using data for theoretical one-axis bending wave actions for each of differing boundary-defining sides of generally rectangular members, for selected natural resonant modes; and/or cumulative superposition as composite respective patterns; and/or combination of such composite patterns to determine viable respective dimensions and/or ratio(s) of sides to desirably reduce combined dead spots and/or effectively place anti-nodes or combined anti-nodes of one in dead spots or combined dead spots of the other, afford individual and/or combination aspects of this invention: as does one or more of selected orders of resonant modes being low in the range of acoustic frequencies of interest. Indeed, wider inventive application is seen to other shapes for a said member and boundary- or shape-defining geometrical parameters therefor, along with corresponding constructs concerning at least notional fundamental frequencies and related resonant modes in particular directions or axes that need not be orthogonal nor directly related to such geometrical parameters, e.g. for straight-sided shapes such as unequal-sided quadrilateral or regular or irregular polygonal or parallelogram, or curved-sided shapes such as conic sections or circular with variable radial slotting, or super-elliptical (see below) with power factors as well as major/minor axes ratios; or combinations of such shapes, indeed anything other than a member of too narrow width to support useful two-dimensional resonant modal complexity.

Certainly, such extension is available from other more sophisticated mathematical techniques, e.g. FEA, that are available, including computer program packages; and permits substantially full analysis of overall natural bending wave vibration including and according to identifiable causative resonant modes and generation of relevant data, including plotting, from appropriate definition of boundary shape, for inspection and manipulation for beneficial frequency interleaving and/or for pattern matching in distributions of vibrationally more/most active anti-nodes/combined anti-nodes and vibrationally less/least active dead spots/combined dead spots, for desirably more even distribution of resonant modes, thus reduction of at least combined dead spots.

Such inspection and manipulation according to variation of one or more of two or more geometrical parameters may be particularly readily facilitated using a table or matrix of vibration energy contents of a grid of elemental subareas of said transverse extent, particularly by changes that take place with parameter variation, preferably as one or more ratios of such parameters. Energy summations for the subareas and generally will give required information.

Further aspects of invention arise herein for such distributed, say grid-related, energy summation as method or means to achieve maximal or optimal or acceptable distribution of vibrational anti-nodes/combined anti-nodes associated with natural resonant modes transversely of said member.

Turning to elliptical shapes of members capable of bending wave action, also first considered where there is isotropy of bending stiffness at least in directions of its major and minor axes or universally, the natural bending wave vibration concerned includes resonant modes contributed by hyperbolic and/or angled components from peripheral curving and going through the major and minor axes. The major and minor axes are found to be significant, particularly their ratio. A practical ratio of major and minor axes for true elliptical shapes has been determined at about 1.182, with a viable alternative (interestingly similarly to above for rectangular) at about 1.34.

It will be appreciated that super-ellipses effectively involve outwardly deforming the curved boundary of a true ellipse between its major and minor axes going so far as to produce shapes approaching, seemingly rather similar to curving of the above-mentioned diagonal-reducing corner treatment of a rectangular shape, though see further below regarding locating transducer means). There is an additional variable represented by power factor 2n as well as major and minor axes a and b and their ratio a/b in the relevant boundary-defining function $$(x/a)^{2n}+(y/b)^{2n}=1$$

which leads to two possibilities, namely determining preferred major/minor axis ratio a/b for any particular value of n or determining preferred value of n for any particular ratio a/b. Examples we have processed up to the date of this Application are between 1 and 2 for a/b and for n (i.e. from 2 to 4 for 2n); such processing again being for isotropy of bending stiffness and under the simplifying constraint of equality of area. Interestingly, the value 1.1 for a/b appears unpromising. However, the value 1.15 is a good one, viz for a/b=1.15, n=1.9 for n=1.8, a/b=1.13 to 1.22 or 1.32 indicating advantageous spreads or tolerances on practicable interrelationships of n and a/b. Also the value of 1.4 for a/b represents a viable alternative, viz for a/b=1.4, n=1.37 to 1.40.

Extensive, but essentially routine, processing work on other values of n and a/b could lead to other viable possibilities, and co-optimisation of n and a/b together may produce, whether much as in first-given above examples or going further, one or more particularly advantageous super-elliptical shape(s).

One composite shape investigated is of substantially super-elliptical and substantially true elliptical parts merged with a common major axis favouring said elliptical part by about 1.1–1.3:1, and with an aspect ratio of favouring said major axis by about 1.2:1 relative to width.

Interestingly, it has been established that regular limiting cases of rectangular and elliptical shapes in terms of sides and axes being equal, i.e. for respective square and circle shapes that are isotropic as to bending stiffness etc, result in members having significantly less good acoustic action or performance, though the teaching later as to location of transducer means has been found to have some useful gain for shapes proportioned other than as preferred above, including circular and square. However, for said members as particularly valuable and advantageous acoustic devices or elements, compelling desiderata, and aspects of invention, are seen in irregularity/inequality (as to shape) and asymmetry (as to locating transducer means below); also in having at least two angled axes/directions or dimensions giving rise to different conceptual frequencies of natural vibration, including for shapes with such axes/directions or dimensions not necessarily at right angles to each other, such as diagonals of a rectangle, and applicable generally, e.g. to sides and/or diagonals of other quadrilaterals or sides and angles and/or apex-to-apex lines; and in there being, for each of basic shape types, one or more predetermined relationships between conceptual frequencies that leads to beneficial interleaving of resonant mode frequencies and/or "filling" of at least some, preferably up to as many as practical, of what would, for other dimensional etc relationship, constitute combined dead spots.

Significantly, it has further been established that said members with shape variations by different relative values or ratios of defining parameters than specifically put forward above can be used in a generally equivalent manner. Thus, the above analyses, including the construct, are equally applicable to members with any particular anisotropy of bending stiffness, i.e. different in directions along length and breadth of a rectangle or parallel to major and minor axes of true ellipses or a super-ellipses, and will produce corresponding preferential aspect ratios etc. Perhaps most interestingly in practice, the converse is likewise available, i.e. determining degree of anisotropy or ratio of bending stiffnesses that produces effective equivalence to, even "converts" or "mimics", for given variant shapes, the idealised isotropic cases we analysed first, thus use the same preferential aspect ratios etc as above, and gain some or most if not all the latter's beneficial acoustic action or operation, at least so long as the given shape is not too narrow to support useful complexity and interaction of its total resonant modes.

Desired anisotropy of bending stiffnesses can be achieved by different "grain", e.g. reinforcing fibres or lay or weave, of surfacing skins or sheets applied to a core in a said member of composite laminated sandwich structure, including differently oriented or relatively angled "grain" to each side or as multiple layers to either side. There are, of course, core-related parameters, such as directionally differential shear moduli or values, that can influence bending stiffnesses. Moreover, for a rectangular said member, diagonal effective bending stiffness(es) or resistance(s) can be likewise adjusted relative to length/width bending stiffnesses (which may be equal or unequal) so as to get some if not all of benefit otherwise obtainable from shortening at corners, e.g. trimming or cropping them. Another way to vary bending stiffness in any direction is by curvature of the member itself, whether in only one direction or even in two or more directions, and whether along or at an angle to or transversely of any particular direction, say one or other of directions associated with parameters defining shapes and/or conceptually fundamental frequencies (hereinafter, including in the claims, most often referred to simply as "conceptual frequencies"). It is further possible to have varying bending stiffness along any axis or direction, including progressive or otherwise over area, whether by combinations of "grains" in skin layers of sandwich structures or differences areally in core properties, say thickness decreasing or increasing from edges inwardly or whatever.

Aspects of this invention arise from predetermining differential bending stiffnesses in different directions in a said member in order to achieve at least some useful results in terms of distribution(s) of vibrational nodes and combined nodes and/or dead spots and combined dead spots associated with natural resonant modes and acoustic action/performance.

Other aspects of invention arise from accepting, or seeking, or modifying, some effect(s), such as arising from augmenting due to edge reflections or interaction from positional proximity or superposition of nodes for some resonant modes, or other differential effect(s) comparing one resonant mode with another; say in terms of having some particular "voicing" of the resulting acoustic performance/action of the member concerned. Modification can be by way of general or selective edge damping or localised medial addition of damping material, even by holes or slots formed in the member. An aspect of this invention also resides in seeking and assuring more even distribution of vibrational anti-nodes and/or combined anti-nodes being limited to lower orders of resonant modes, say at or up to at least third order and/or not more than seventh order (whether determined absolutely from conceptual frequencies or relative to lowest frequency modes within and/or below a frequency range of interest), including consequential effect(s) on operation at higher frequencies, and proving highly beneficial in extending usefully achievable range of operation well above the upper frequencies considered limiting in WO92/03024.

More specific aspects of invention include operating over a wider frequency range than WO92/03024; and/or removing its limitations to operating only above the coincidence frequency, for example to operating frequency ranges that include the coincidence frequency and/or are wholly below coincidence frequency.

Members embodying aspects of this invention by having designedly distributed resonant modes of carefully related conceptual frequencies of natural bending wave vibration can, in themselves, serve as useful acoustic devices. One way is for reverberation purposes including to improve or desirably alter acoustic characteristics of some associated acoustic device, such as a conventional loudspeaker or driver unit or equipment including same. Another way is as an acoustic filter converting between incident and desired acoustic ranges. Further ways include for desirable environmental "colouring" or "voicing" purposes, say for a room, including effectively removing or compensating for unwanted effects (as could otherwise be due to room shape or proportions or contents. Such uses are referred to herein as "passive".

However, use of members embodying this invention is envisaged in or for what are referred to herein as "active" devices or purposes, requiring association with transducer means, and found to be dramatically beneficial for loudspeakers. Particularly, it has been established that location of the transducer means can greatly influence acoustic action or performance, leading to various more aspects of invention.

Location of Transducer Means

Specifically, we have established that there are much better positions for launching bending waves into a device as or for a loudspeaker and utilising a generally rectangular said member than what is shown in WO92/03024, namely at a corner, or substantially centrally as in WO 95/31805 and 96/01547. This is the case even after above-discussed improvements as to substantially isotropic such members being designedly out of the square shape mentioned in WO92/03024, or predetermination of anisotropy for other square or out-of-square shapes.

Improvements hereof in determining location(s) for transducer means also began with the above construct concerning notionally unidirectional bending wave vibrations and their combination to obtain improved resonant mode distribution. A successful method and means for preferred transducer site identification resulted from finding those positions at which the number of dead spots for any of the resonant modes concerned is low or least and/or the number of vibrationally active resonance anti-nodes concerned is high or highest, i.e. in terms of the resonant modes taken into account for "filling" of what would otherwise be combined dead spots. Specific side dimension proportions, for a substantially rectangular said member with the above about 15% out-of-square aspect ratio, emerge readily from such further analysis as coordinates for transducer sites at about 3/7, 4/9 and 5/13, giving 24 possible sites from each corner and ignoring duplications. For any particular transducer means, it is preferred that each location for transducer means use two different ones of these proportional coordinates along different length sides, whether single transducer means or each of plural transducer means (as can be advantageous for power and/or frequency cover), further preferably combining 3/7 and 4/9. Close approximations to these proportionate coordinate sites came first from the above notional construct.

Interestingly, these same proportionate coordinate values apply preferentially and beneficially for location of transducer means in any member of substantially rectangular shape and capable of vibrational bending wave action involving resonant modes. Specifically, this includes such members not fully satisfying the above aspects of invention in terms of their dimensional proportions and corresponding isotropy/anisotropy; and/or having "bulk" damping, i.e. limitation of distance of travel at significant or any energy levels of bending wave vibrations induced by transducer means due to losses in the material(s) of the member itself, that, in view of area or some dimension of that member, results only in low or no vibrational bending wave energy being reflected, even reaching, one or more edges of the member wherever the transducer means may be located in that area, thus without significant reflections from such edges. Whilst such members will not be as effective as members that are preferentially proportioned as in earlier aspects of this invention, whatever potential they have for operation as loudspeakers is much better realised by applying the above dimension proportioning criteria to locating transducer means relative to one or more corners (or notional corners if subject shortening ends of one or more of its diagonals), thus leading to minimum spacing from side edges of such members of at least about 5/13 or 38% of its width and length dimensions. In practice, quite surprisingly improved results arise, in terms of intelligible acoustic output, including in rather marginal and quite lossy materials/structures, at least compared with substantially central or edge-adjacent mounting of transducer means. Tolerances mentioned later apply regarding transducer location appear capable of further relaxing, the limits being inevitably materials-dependent and feasible materials being too great fully to investigate to date.

The criteria developed in these considerations for determining at least minimum spacings from edges of a substantially rectangular said member for mounting of transducer means, are beyond the teaching of the known prior art, even as to having arisen by serendipity alone.

Generally, analysis as taught herein leads not only to preferred locations for transducer means, but also to a further matter/aspect of great practical value, namely, relative to any particular appropriate location(s) for its transducer means, capability to identify actual locations where any selective damping should to be applied to deal with any particular undesired frequency or frequencies.

Regarding true elliptical shapes of said members, main series of resonant modes associated with major and minor axes are of elliptical and hyperbolic natures, as noted above, and preferential locations for transducer means are, for the above-noted 1.182 major/minor axes ratio, at coordinate positions relative to centre of about 0.43 and 0.20 along half-major and half-minor axes, respectively. It will be noted that orthogonal coordinates are not really appropriate, and it is only with appropriate coordinates, specifically elliptical/cylindrical, that values emerge for transducer locations that are of general application to other elliptical shapes, i.e. different major/minor axes ratios, including as arising from application of anisotropy of bending stiffness for non-ideal major/minor axes ratios (i.e. other than 1.182), and enable producing Cartesian equivalents in each case via trigonometric relationships.

As for substantially rectangular members hereof, more precise analysis, or experiment, can determine possible small adjustments that may be beneficial, also other site options for transducer means, including to concentrate on coupling particular resonance modes, though efficiency of operation is very much related to each transducer means coupling to as many resonant modes as practicable without adverse effects.

It is noted that above-specified preferred sites for transducer means are well off-centre for rectangular said members, including off centre-lines for width and length; and are further somewhat displaced from diagonals, i.e. truly asymmetric. Also preferred sites for transducer means of substantially elliptical shapes of members hereof are off-centre and off major and minor axes. Moreover, preferred proportionate coordinates are substantially maintained regardless of isotropy/anisotropy of bending stiffnesses, directly as Cartesian coordinates for sides of substantially rectangular said members and indirectly relative to underlying elliptical/cylindrical coordinates for substantially elliptical said members.

Indeed, it is an aspect of this invention that designated sites for at least one transducer means be of this nature, i.e. off-centre by reason of coupling at preferred combined anti-node positions, and off-axes for both substantially rectangular and substantially true elliptical shapes of members hereof, typically off-diagonal by between about 7% and about 12.5% of length and width from centre-lines, and by about 20% or more of major axis and about 10% of minor axis lengths, respectively.

For super-elliptical shapes, we got intuitively surprising results, in that preferential locations for transducer means, appear to be much more akin to what was found best for circles than for either of rectangles or true ellipses, specifically as a ring of possibilities at about 70% of distance from centre to boundary.

However, as for rectangular shapes, it is noteworthy and an aspect of invention hereof, that preferred sites for transducer means are not only plural in number, but are at positions well off major and minor axes or centre-lines, though generally more so, i.e. from about 10% (true ellipse minor axis) to about 35% (for super-ellipse), preferably in prescribed or prescribable manner.

Whilst there may be complex shapes for which preferred locating sites for transducer means may be otherwise, it is an aspect of this invention, at least for preferred embodiments of generally simple shapes, to have such possible sites individually at asymmetric positions off axes or lines that join points of maximum/minimum dimensions or directions of defining geometrical parameters, and that may be in related one or more sets that, in themselves, are in centre-symmetrical or other orderly arrangement as a group for each set. The above relatively beneficial results from geometrical location of transducer means as herein for substantially rectangular shapes are seen as having general inventive application to panel members not proportioned etc as preferred herein.

When used with one or more transducer means in panel loudspeakers, preferred said members hereof operative over their whole areas, i.e. up to edge boundaries as above, have bending wave vibration well distributed substantially over such whole areas from the transducer means to the edge boundaries. Moreover, resulting acoustic action need not be directional (as in U.S. Pat. No. 3,347,335 above), but may be for at least part of such output of loudspeakers, e.g. if desired or required. This areal spread of bending wave vibration greatly reduces perceived proximity-dependent loudspeaker loudness effects; and, where not deliberately operative with directionality, with perceptibly much better spread than typically rather narrow and narrowing beam effect above lowest frequencies, in loudspeakers using cone elements. Moreover, resulting vibration action can, except for lowest frequencies, be used from both front and back of a said member as there will be little or none of the anti-phase problems attaching to cone element loudspeakers.

Transducer Means

Reverting to transducer means, as such, highest powers and best quality of sound reproduction from loudspeakers are achieved using magnet-and-coil drivers, rather than the piezoelectric types so eminently suited to lower power and/or quality performance. Interestingly, in principle, it is immaterial which of coil or magnet parts move for imparting bending wave action, though the art of moving coil drivers is so well known and developed (for cone loudspeakers) that various specifically useful/advantageous novel designs to be described further and illustrated are within the natural context of developing moving coil types. Detail investigation and development indicates particular merit arising from assuring that size and/or mass criteria are met for the moving parts concerned. In principle, maximum size is subject to conforming with preferred mechanical coupling to the member being at least primarily resistive and with exciting higher and lower frequency resonant modes as desired, particularly for audio usage. Whilst approximations have indicated theoretical maximum sizes at about 9%–10% of length/width and/or major/minor axes dimensions for rectangular or elliptical/super-elliptical shapes of said member, i.e. up to about 1% of operative transverse area, that can be exceeded at least by such as piezoelectric transducer patch-type transducers, at least up to 2% (each if plural). A particularly useful criterion, in practice, is that, for any particular said member or panel, there will be a size at which frequency roll-off is caused, basically as corresponding wavelengths in the panel approach and reach similar order to the size of transducer. These factors need further to be considered alongside mass considerations for moving parts of transducer means, including electromagnetic, for which a viable guide is maxima at about 1–2 times the mass of the part of the member that is removed for hole-mounting such active moving part or is covered by surface-mounting same.

Other Structural, Etc. Factors

It is possible for conditions at edges of said members to allow sub-fundamental acoustic action/performance, e.g. from resilience/elastic vibration relative to self-carried framing or to other edge support, even selective clamping, or in a sense reactive to constraint of up/down, forward/backward, sideways and twisting freedoms of movement. Such components can further arise from mounting transducer means to said members, by reason of compliance etc in or of the mounting, particularly for moving-coil type electromagnetic transducers and resilience in mounting its relatively stationary magnet part(s) to the member (and against which the moving coil vibrates) as beneficial to lower frequency responses. Whether such sub-fundamental effects are as variations to effective dimensions, or as additional pistonic action, is immaterial to contribution(s) to overall acoustic action/response.

Reverting to said members, as such, applications are envisaged where, for various reasons, less than the whole of the overall transverse extent thereof is to be, or needs to be, acoustically operational for purposes embodying this invention, e.g. where the member overall is substantially oversized or out of proportion for desired or practicable adjustment by anisotropy of bending stiffness compared with desired or acceptably effective acoustic action/output, at least as a loudspeaker. Conveniently, for full application of above proportioning and location etc criteria, there can then be inboard definition of such desired etc operational area, for example by way of cutting at the boundary of such operational area and mounting both parts on some carrier sheet or panel that will not usually meet the above requirements hereof, or partial cutting or deformation at such boundary, or ribbing or add-on damping or stiffening material at or outside such boundary, etc. Proportioning and siting for transducer means can, of course, then be applicable as above to the inner operational area.

As will later be more specifically indicated, a very wide range and variety of materials can be used for said members in embodiments and applications of this invention. Thus, as active sound sources, or loudspeakers, the range in size and/or quality can be from impressive results for such as greetings etc cards or in books etc, notebook or laptop computers; in-car etc. audio, ceiling etc. tiles or wall panels, and high clarity public address systems etc; to general stereo and surround sound systems, home-movie, and hi-fi quality sound reproduction; even to such large scale applications as cinema screens and high power for outdoor or stadium concerts, including use of multiple side-by-side modules for largest applications. Also, there will be further specific guidance for selection from a wide variety of materials, including for actual or effectively multiple-ply structures, particularly for appropriately matching skins or facing sheets and cores of preferred sandwich structures, including as to core shear requirements particularly affecting propagation losses for bending wave vibration, so that shear values may be to some extent dependent on sizes of said members for particular acoustic devices. However, at least minimum structural requirements of members for the above range of applications also range from lower to higher structural strength/integrity and/or bending stiffness, typically for lower to higher power of driving or exciting transducer means. At the lower part of such range, bending wave propagation can be quite lossy, even single sheets used rather than otherwise preferred sandwich structures. Generally, tolerances for the above-developed dimensional proportioning and transducer location criteria will be quite tight for high performance said members, say up to about 3% off for proportioning and up to about 5% off for transducer location, but much higher, say up to 5% and 10% or more, respectively for higher loss and lower performance said members.

Whilst additional conventional low frequency loudspeakers, or woofers, may well be used with panel elements hereof, and combinations of such panel elements can be used for highest quality and widest frequency ranges handled, even combining additional pistonic action for some panel(s) hereof, it is a particular feature, aspect and advantage of embodiments this invention that a remarkably wide frequency range can be handled by a single panel element, ranging from up to about 100 Hz, say about 50 Hz if large and/or baffled, to in excess of 15 KHz, even 25 KHz and higher. The lower limits of such operating frequency ranges are above the lowest resonant mode frequencies. Certainly, operating acoustic bandwidths in excess of 4 KHz are readily achieved.

In these connections, perhaps particularly for single member or panel loudspeakers, various options are available in terms of design etc, including setting the coincidence frequency above or below, or medially within, or at low or high ends of and assisting in defining actual suitable operating frequency ranges; and using electronic circuitry for selectively adjusting relative values of input audio electrical signals to be converted to sound etc, generally more simple than for hitherto conventional cone-element loudspeakers say resistive-inductive application of only about 3 db of selective variation and/or capacitive raising of high frequencies. This will not, of course, be accompanied by the sort of "boxy" effects of related enclosures and baffling. Also, whilst sound output rearwardly of members hereof used as loudspeaker panels is not of inherently anti-phase nature requiring elimination, shallow rearward absorption/baffling provisions can be advantageous for loudspeaker units to be mounted directly against or closely adjacent solid/sound reflective surfaces.

Each particular design of member hereof for use in a loudspeaker will require inter-active decisions, usually involving compromises regarding physical and operational parameters and requirements. Thus, bending stiffness(es) and mass per unit area contribute (through square root of the quotient $B/\mu$ of the former and the latter) along with dimensions/area to setting lowest true bending wave frequencies, with Young's modulus (E) and thickness of skins of sandwich structures of the members as well as the square of their core thickness having particularly relevant effects on bending wave stiffness. Said bending wave stiffness(es) and mass per unit area also contribute, through square root of inverse $\mu/B$ of above quotient, along with the ratio of squares of speed of sound in air and (by bending waves) in the members, to setting the actual coincidence frequency, with core shear modulus (G) and core thickness (d) contributing to said ratio along with said of mass per unit area ($\mu$) being particularly influential as the actual coincidence frequency is always greater than results from much simpler notional calculation assuming no core shear thus no account taken of said ratio. Lowering or raising the coincidence frequency can be by raising or lowering said ratio.

Regarding core shear modulus (G), it is, in itself, a significant design factor that needs to be enough to hold the skins apart sufficiently rigidly for desired bending wave action. Relatively lower and higher values result in greater and lesser, respectively, transmission of energy applied by the transducer means in core shear waves rather than desired skin bending waves. Such shear waves do not radiate sound, and the net acoustic result of lower core shear modulus values is that the effective sound radiating areas of the members tends to reduce with frequency, though still substantially larger than any parallel with conventional cone-element tweeters resembling a highly directional point source. The underlying effect of shear causing fall-off of vibrational efficiency of operation with frequency can be used to advantage for piezoelectric transducer means as particularly suited to card or book, even noticeboard, embodiments typically of the order of about A5 to about A4, even to A1, sizes preferably with coincidence frequency as high as 20 KHz or more and operating frequency range going from between about 200 Hz and 350 Hz up to about 15 Khz or so, and related lowest resonant modes concerned at about 100 Hz to about 250 Hz.

Regarding mass per unit area ($\mu$), there is an inverse relationship with efficiency of any loudspeaker concerned, thus general benefit from having it as low as possible, i.e. consistent with operational goals and resulting requirements regarding other physical parameters, particularly at least reasonably high stiffness-to-mass ratio and specific modulus involving core shear modulus (G) along with ratio of mass per unit area ($\mu$) and the core thickness (d), which makes composite skinned-core laminated structures particularly suitable for the members hereof.

In applying these factors to practical loudspeaker etc design, i.e. using available actual materials and values of their relevant parameters, satisfactory lightweight core materials will generally be of expanded foamed synthetic plastics materials or of honeycomb or other openwork form fabricated from sheet materials, see further later.

Such structures give rise to further factors involving skin and core properties, both alone and in conjunction with each other and/or with size and mass of active parts of transducer means, including the possibilities of further resonances such as affected by core compliance along with skin and/or transducer part mass(es), specifically resonances from size/volume of core cells and/or from compliant core compression/recovery and/or from skin portions overlying open core cells potentially with tiny drum-like subsidiary vibration effects, etc. Such further resonances can be useful, i.e. be positive factors in materials selection/specification, by contributing to, even extending, actual operating frequency range, usually at the higher end, typically approaching or above 20 KhZ, say 19 Khz–22 KHz. If those further resonances would not be useful, even be deleterious, to performance, that can be taken into account for avoidance in selection etc of materials.

Desired or effectively required sizes and shapes are obvious design factors, and bring in anisotropy, as to which it can be relevant that at least some of available honeycomb have, certainly can have, different shear moduli in different directions. Possibilities obviously arise as to incorporation of members hereof into host sheets or panels and as to defining operational areas by deformation or added defining material as mentioned above. Desired type etc of transducer means, even viability effectively forcing or limiting choice thereof, is/are further key consideration(s), including as to compliance of mounting at least active moving part(s) thereof to or into members hereof, as to normal requirement for predominantly resistive rather than reactive mechanical coupling of transducer part(s) to such members, and as to output power desiderata thus input power and forces applied by moving part(s) of transducer means being desirably consistent with buckling etc characteristics/resistance of core materials.

Generally, from the above, relevant factors including materials parameters available and required can be matched to extents resulting in achieving the aforementioned remarkably wide range of satisfactory loudspeakers and other acoustic devices, the scope for doing so relative to various materials parameters individually and in combinations and need to balance conflicting effects by now being self-evident.

Use of said members hereof with associated transducer means as microphones is, of course, feasible. Then, it is particularly preferred that multiple transducer means be used, preferably to get the best possible sampling of possible active resonant modes, say where appropriate, with transducer means at least one of each of progressively outward different ones of preferential locations. The reverse or inverse action compared with loudspeakers hereof can produce signals capable of intelligible reproduction and/or ready meaningful input to data processing machines. Moreover, capability of combining through additional transducer means on a member hereof also operating as a loudspeaker has advantages, as has provision or further combination with or as cladding or a casing.

Further regarding transducer means, two particular types have been mentioned, namely piezoelectric, and electromagnetic with specific reference to what is effectively continuation of long-established practice for cone-element loudspeakers by way of moving coil means being fixed/bonded on, say acting against mass of magnet means also carried by the member, with passing reference to alternative use of moving magnet means the excitation purposes hereof. The Profound differences of the nature of mechanical coupling to panel-like members hereof, exciting bending waves rather than for pistonic action to reciprocate a cone element, have also been alluded to, particularly at least being predominantly mechanically resistive rather than reactive nature thereof, thus inherently more efficient. It is the case that light moving magnets and relatively heavy electric coils would be more reactive and less efficient, but nonetheless viable. Corresponding consequential differences become reflected in novel parts and their interrelationships, including by reason of inherent capability for mounting intendedly stationary as well as moving parts to members hereof, rather than stationary magnet parts to fixed frames, though that can be done for members hereof if desired or preferred or even required to get additional pistonic action at lowest frequencies. Moreover, a radically fresh approach has been found to be notably capable of satisfactory and beneficial operation, namely by way of we call "inertial" contribution to inducing at least bending wave vibration.

So, in addition to aspects of invention arising from novel transducer parts, interrelationships of parts, and mounting thereof, whether at and to surfaces or in wells or even through-apertures at and to sides thereof, another transducer means aspect of this invention concerns addition to operatively moving part(s) of transducer means of more mass, including where such addition is substantially medially of such parts actually mounted to members hereof beyond or outside such additional mass, say peripherally, preferably at or adjacent edges thereof at or adjacent edges of wells or apertures in members hereof with said additional mass projecting into such wells or apertures, further preferably with appropriate clearance therein, particularly advantageously mounted to skins and extending into cores of preferred laminated sandwich structures for members hereof.

BRIEF DESCRIPTION OF DRAWINGS

Particular device and applications embodiments will now be described in more detail, both by way of example and as leading to further device etc aspects of invention, with reference to the accompanying drawings.

Generally panel-like members embodying above concepts and aspects of this invention concerning distribution of bending wave vibration and, at least effectively, related natural resonant modes will be referred to variously as "distributed mode resonators" or "distributed mode resonating panels" or "distributed mode loudspeakers" or "DML" or "multi-mode resonating panel".

Figure 1:
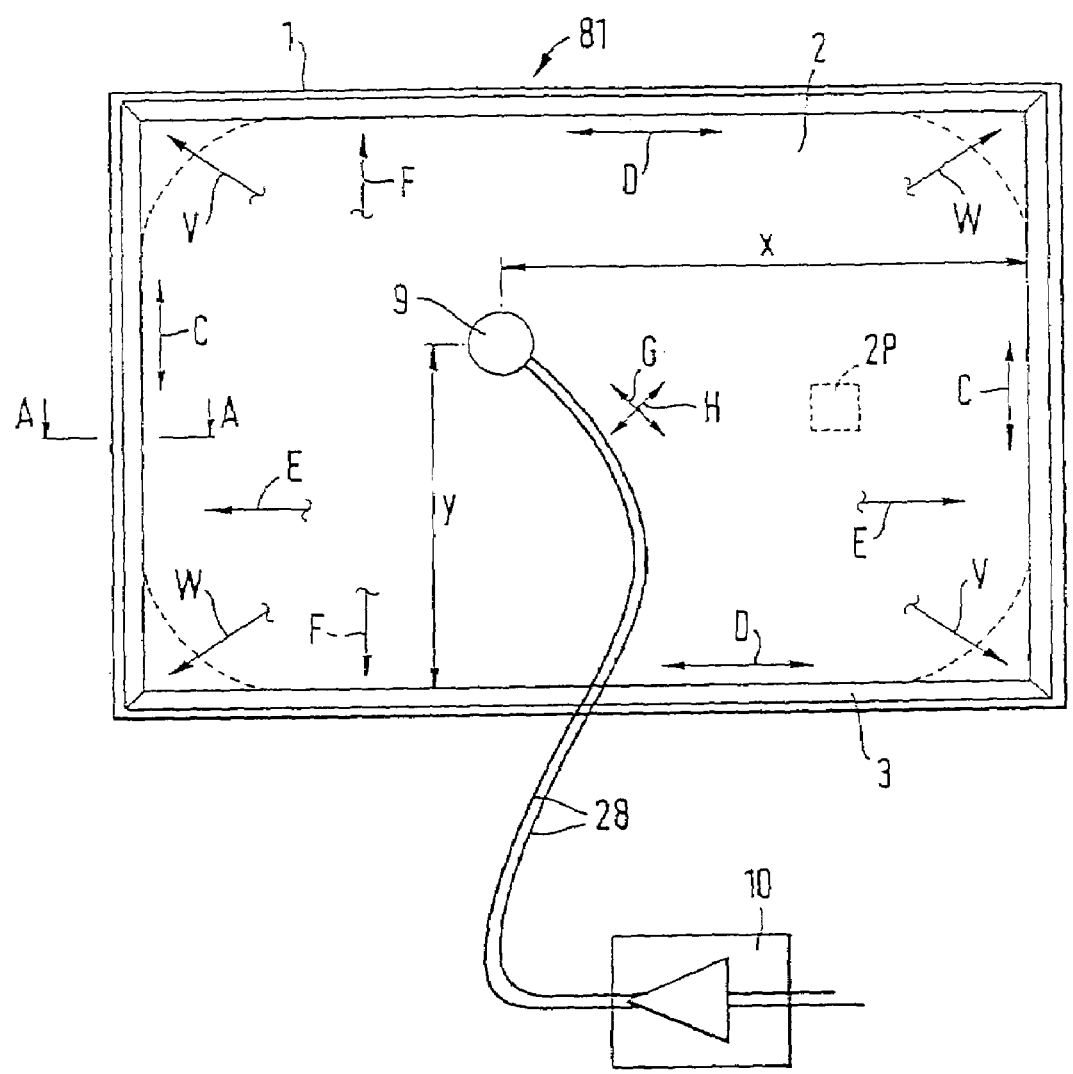

Also, the word "resonate" is used, as a descriptive and semantically accurate convenient shorthand term for such desired or acceptably achievable areally distributed and orderly natural resonant mode related bending wave vibration, involving the positive and deliberate encouragement by design of such resonance-based vibration; and is not to be confused with other usages of that word in other connections where any vibration is considered inherently problematic (and, perhaps, as often as not actually related to inaccuracies and/or wear of cooperating parts!).

Figure 2A:
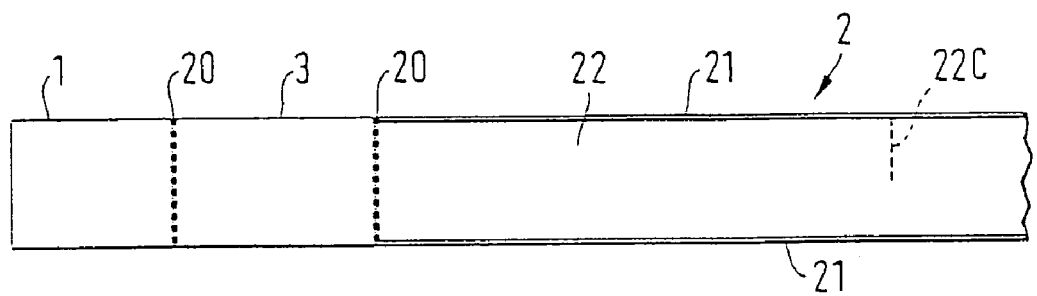
Figure 2B:
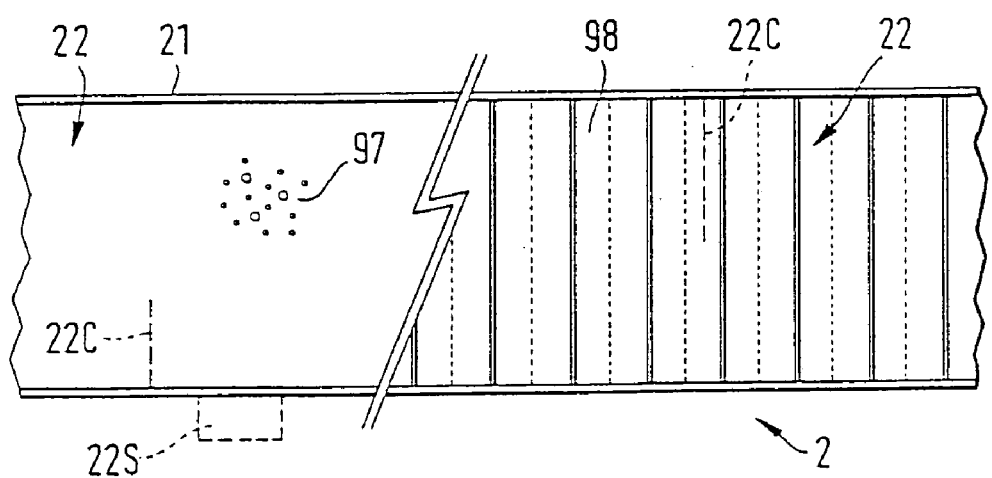
Figure 3A:
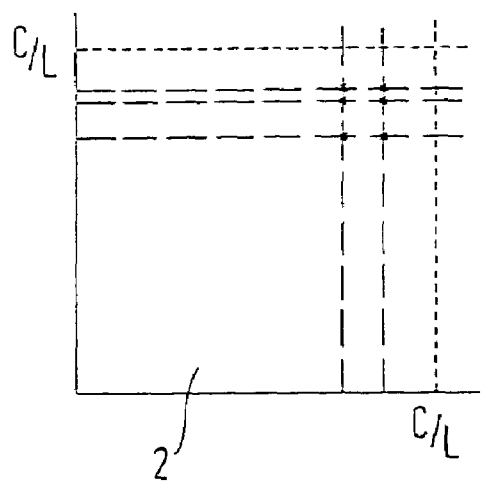
Figure 3B:
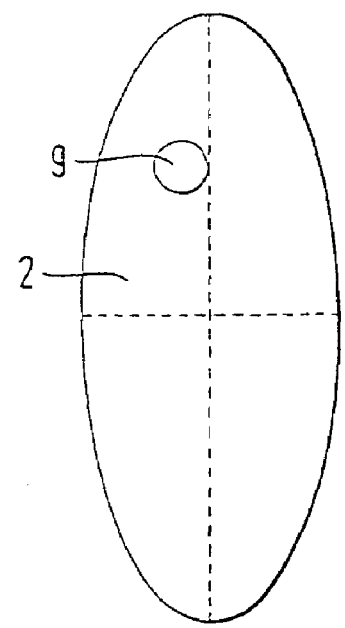
Figure 3C:
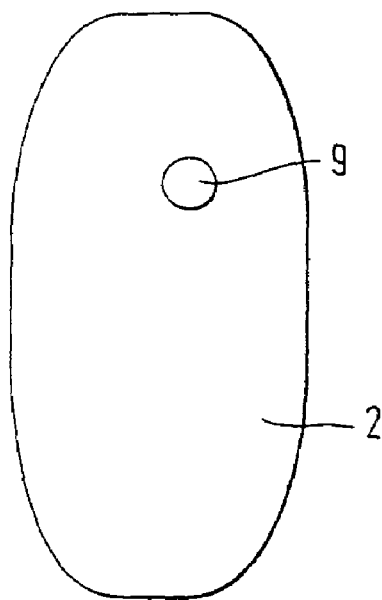
Figure 3D:
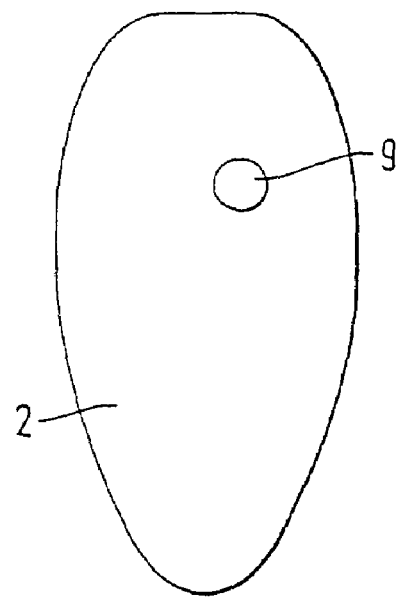
Figure 4:
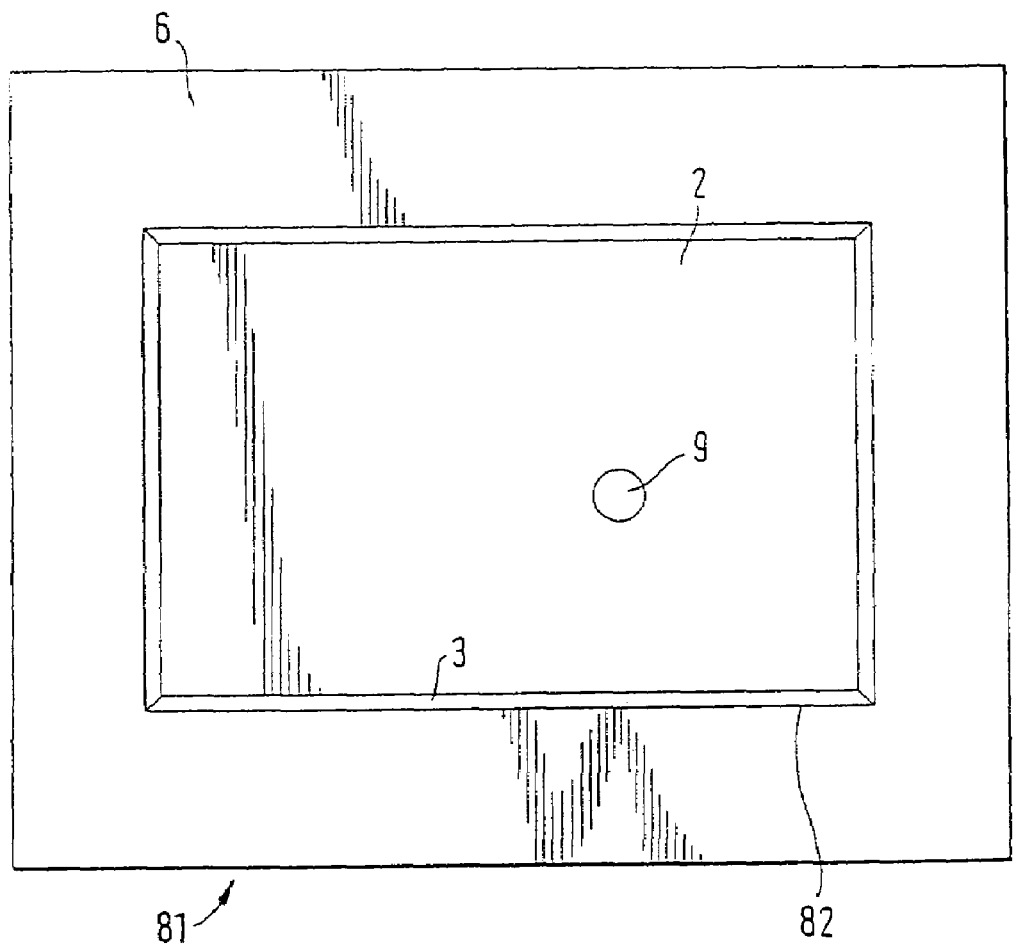
Figure 5A:
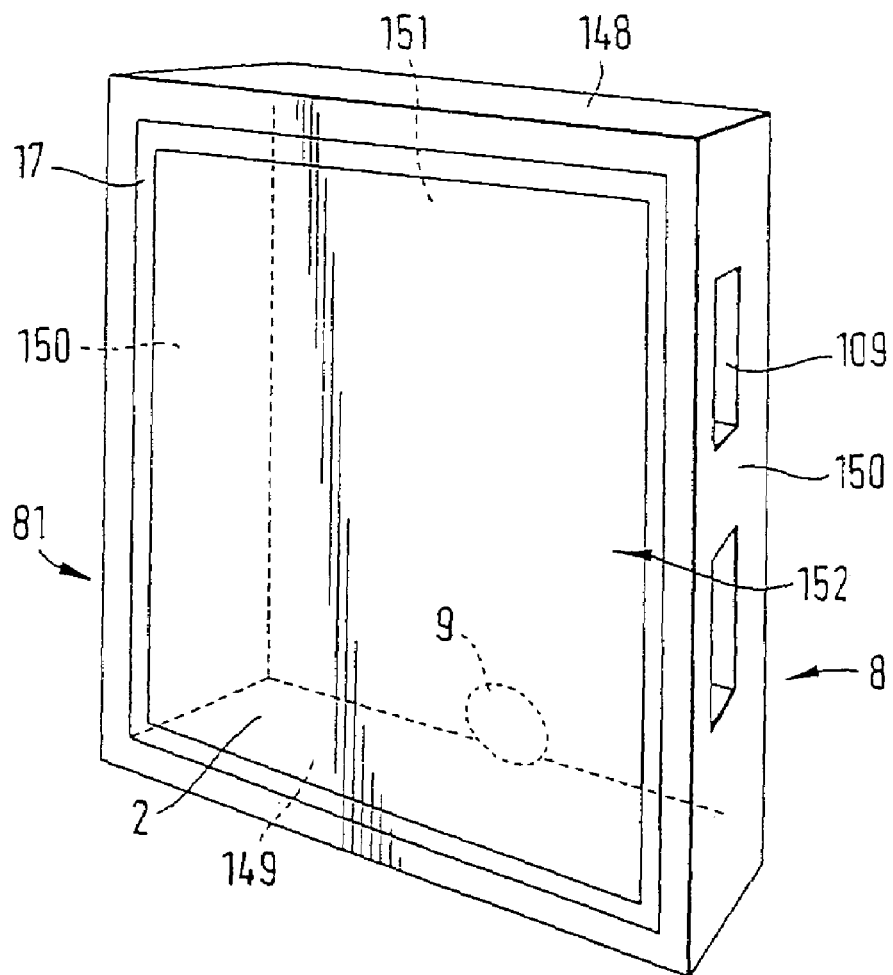
Figure 5B:
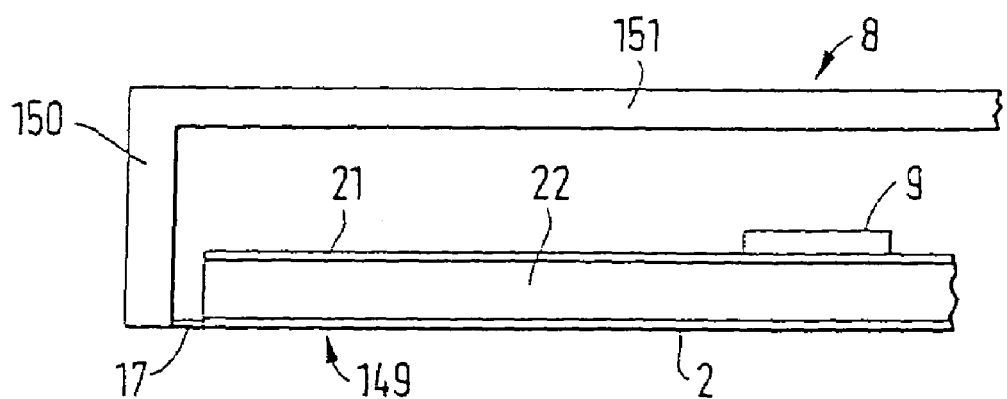
Figure 6A:
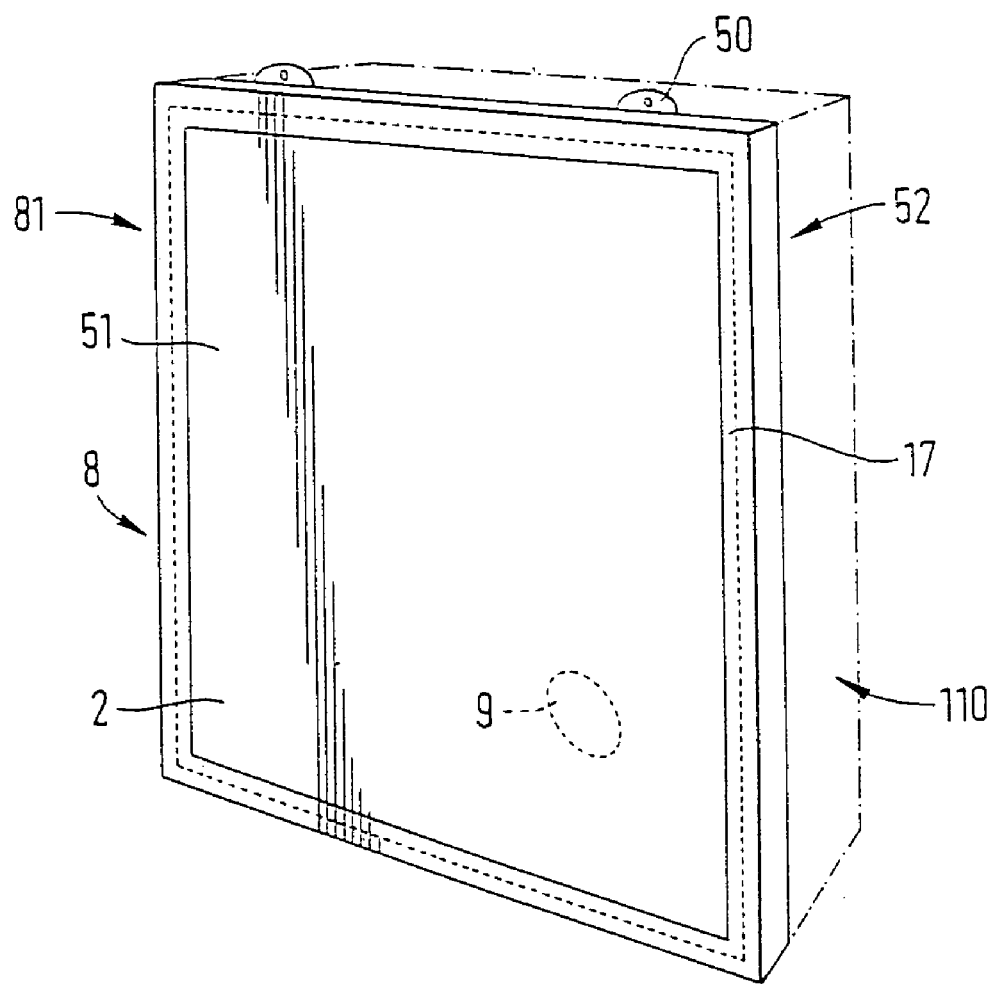
Figure 6B:
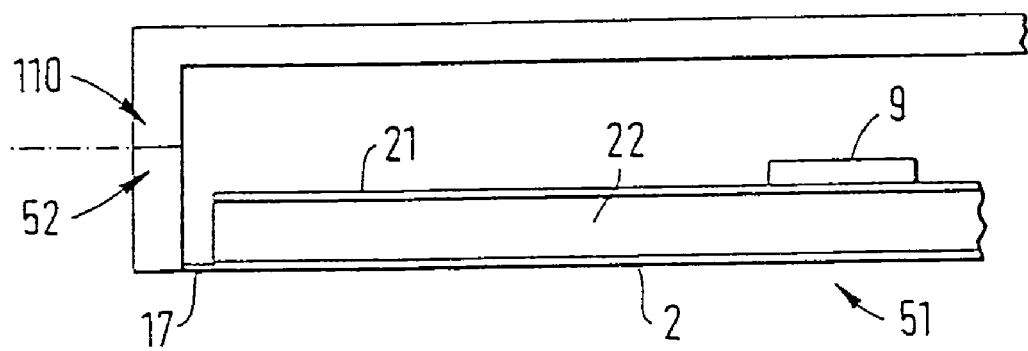
Figure 7A:
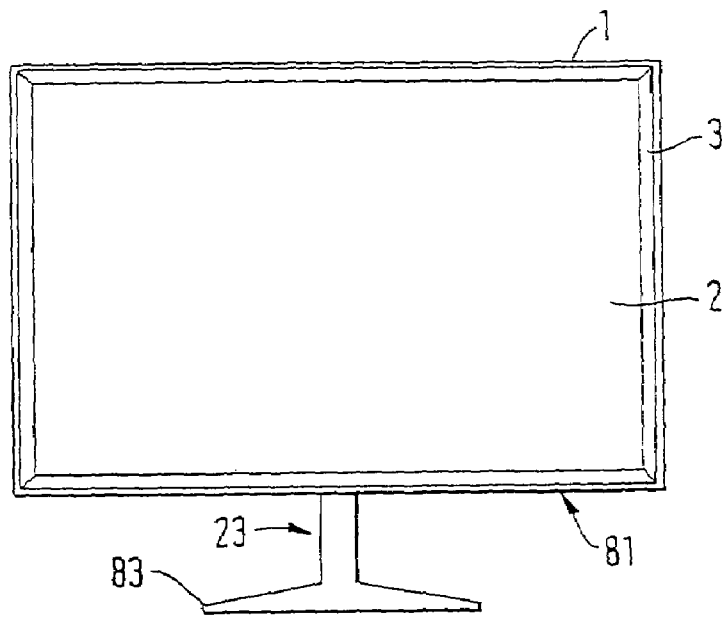
Figures 7B, 7C:
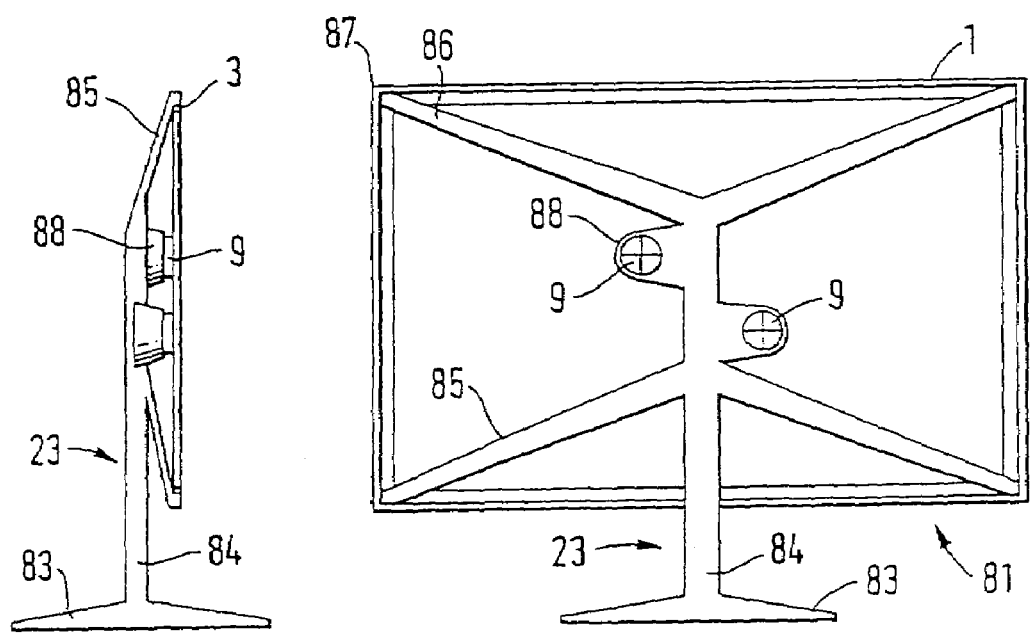
Figure 8:
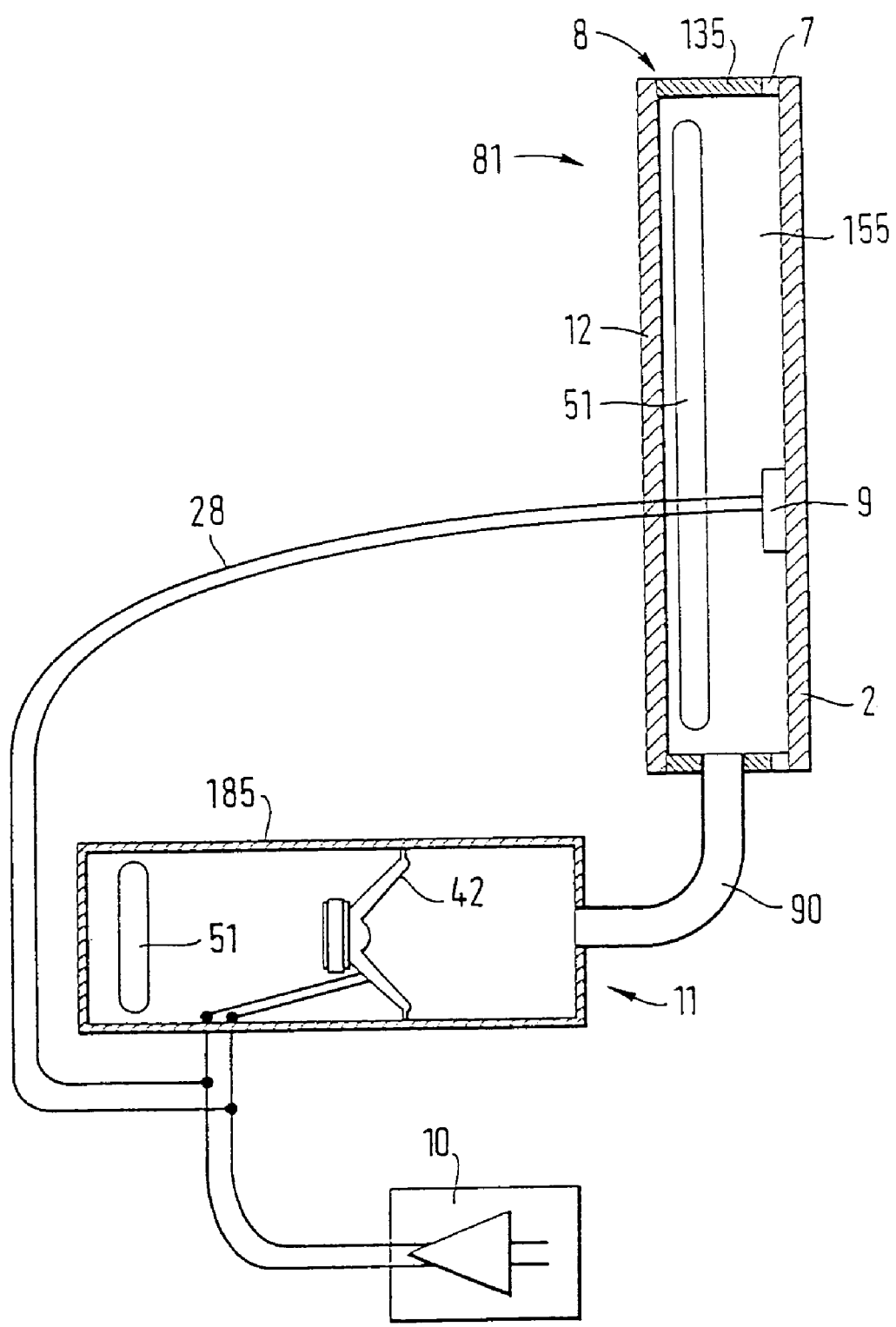
Figure 9:
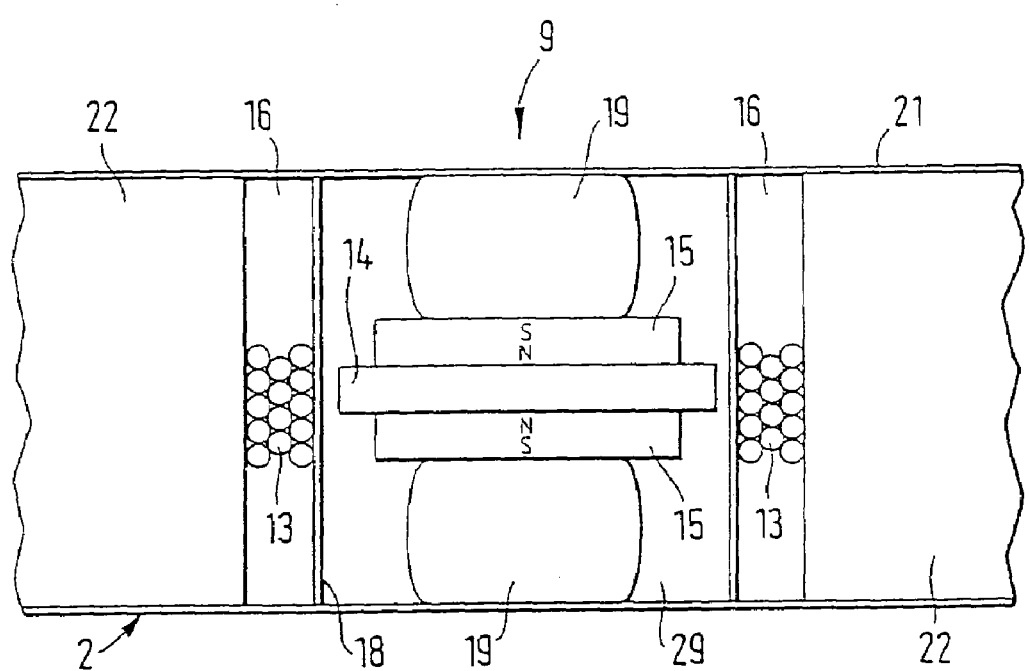
Figure 10:
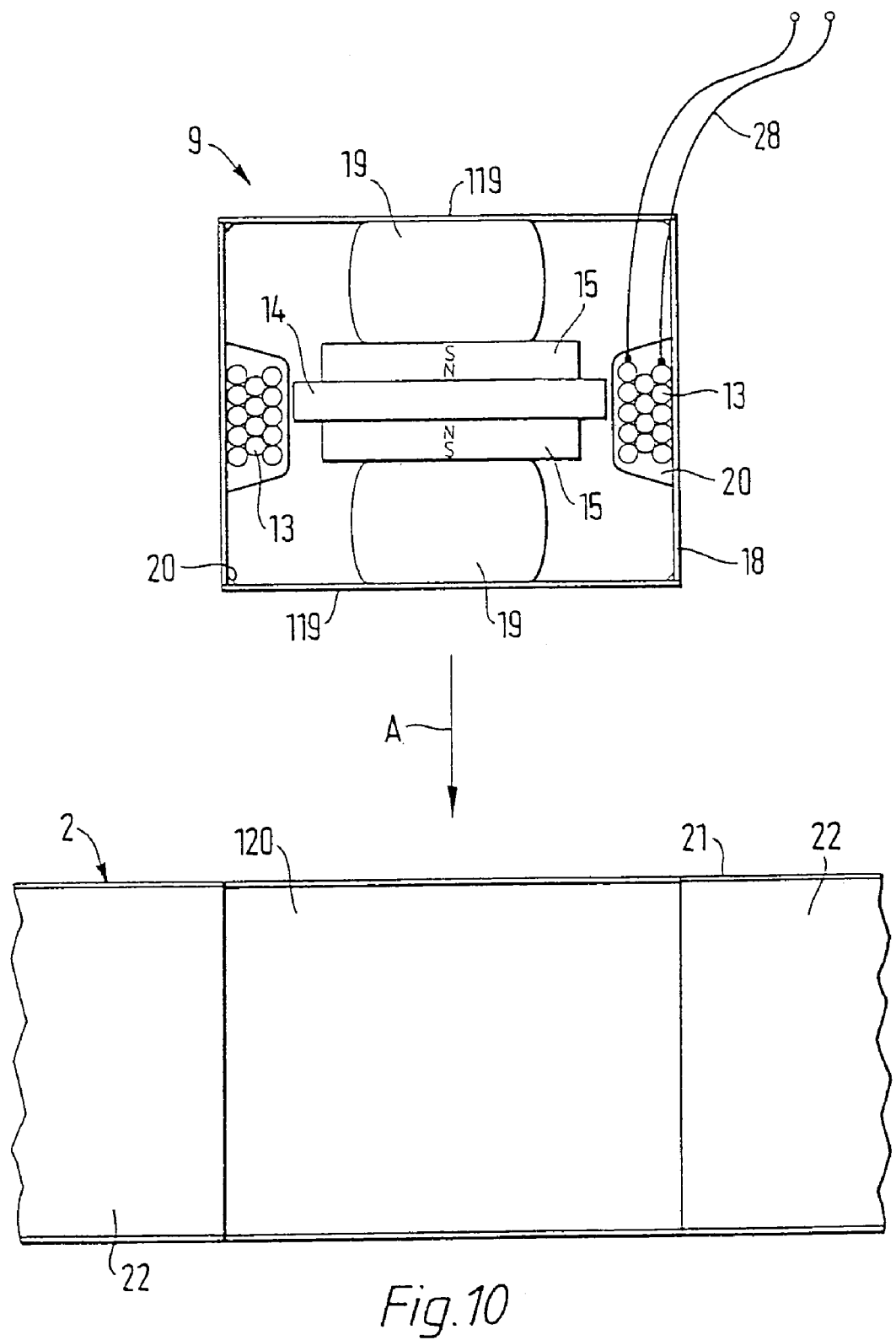
Figure 11A:
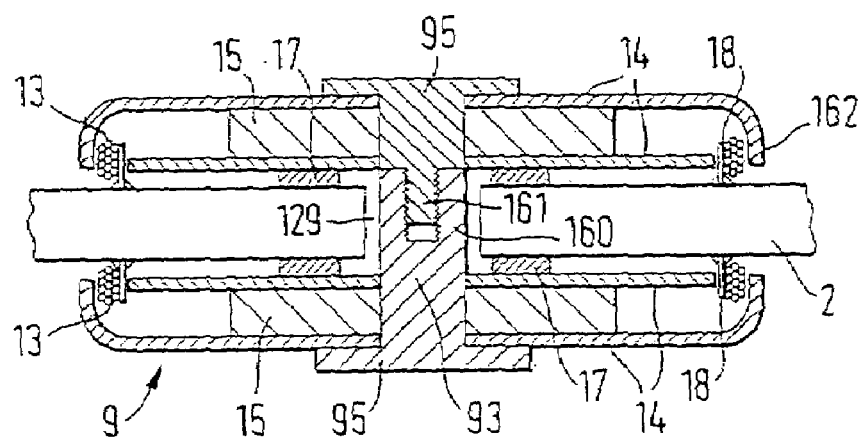
Figure 11B:
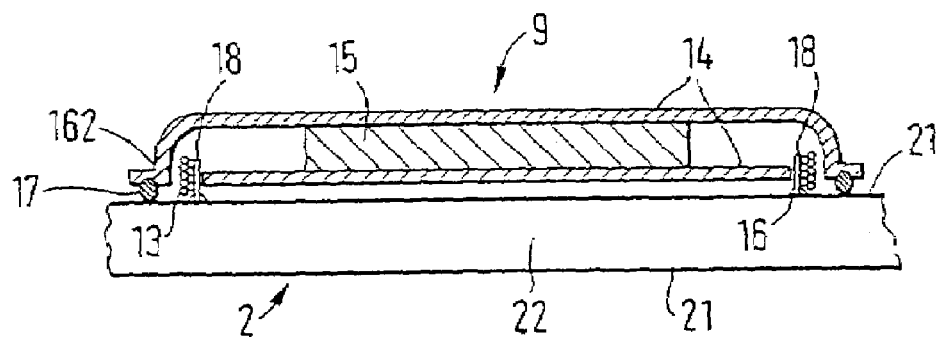
Figure 11C:
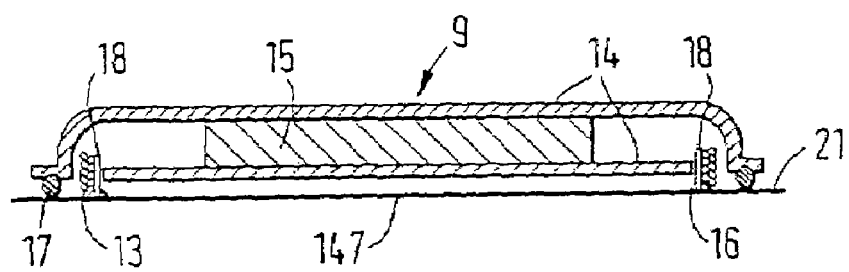
Figure 12:
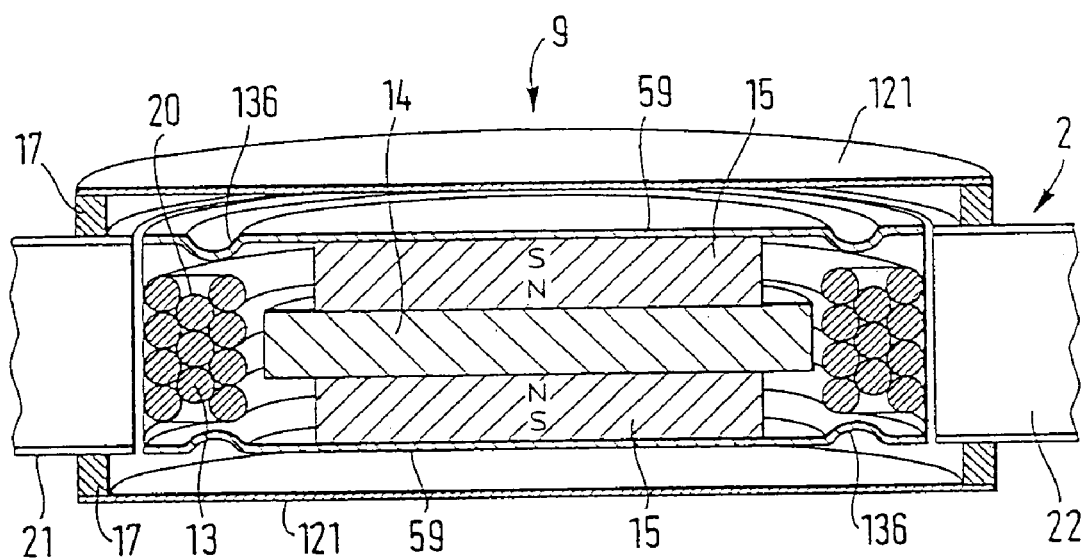
Figure 13:
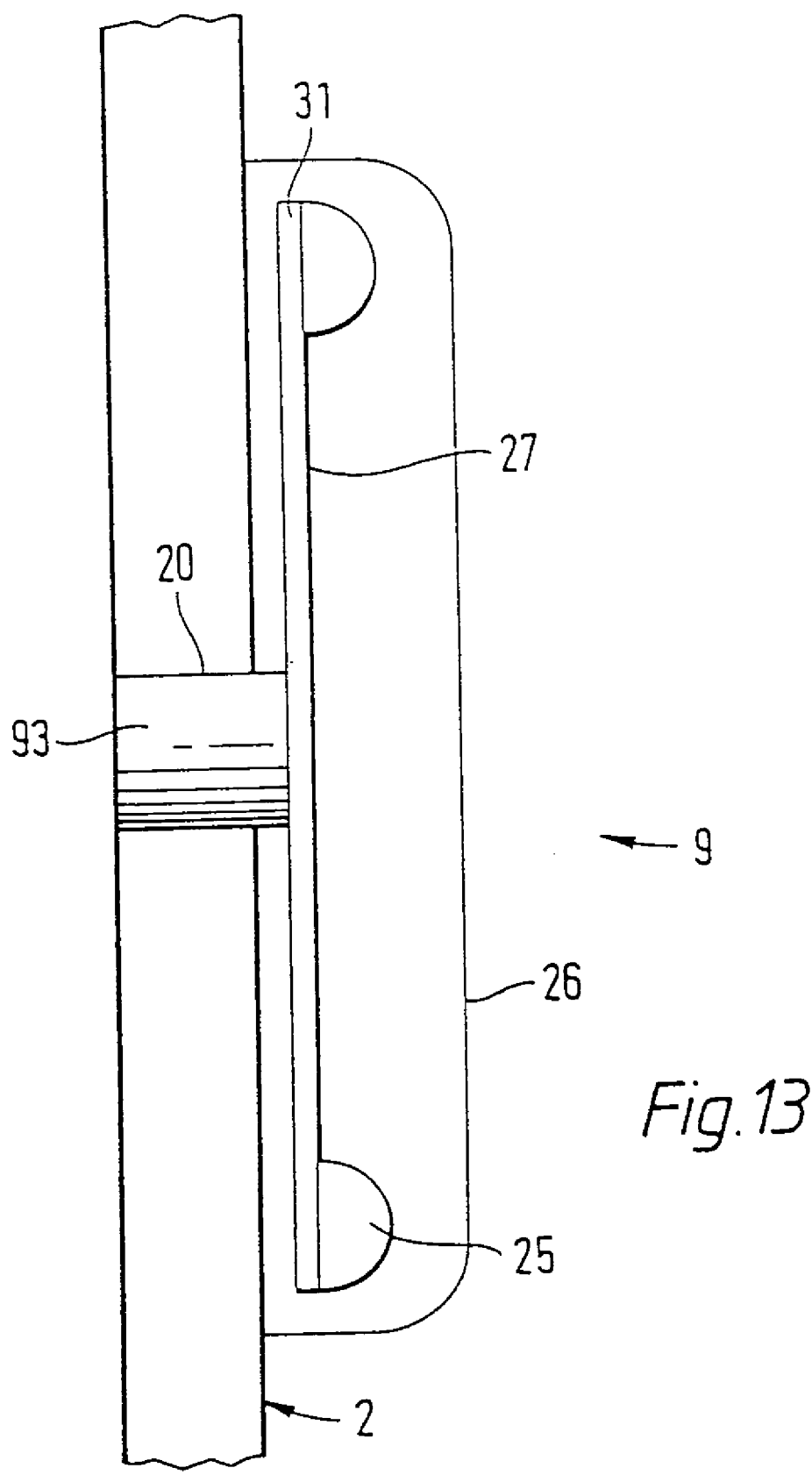
Figure 14:
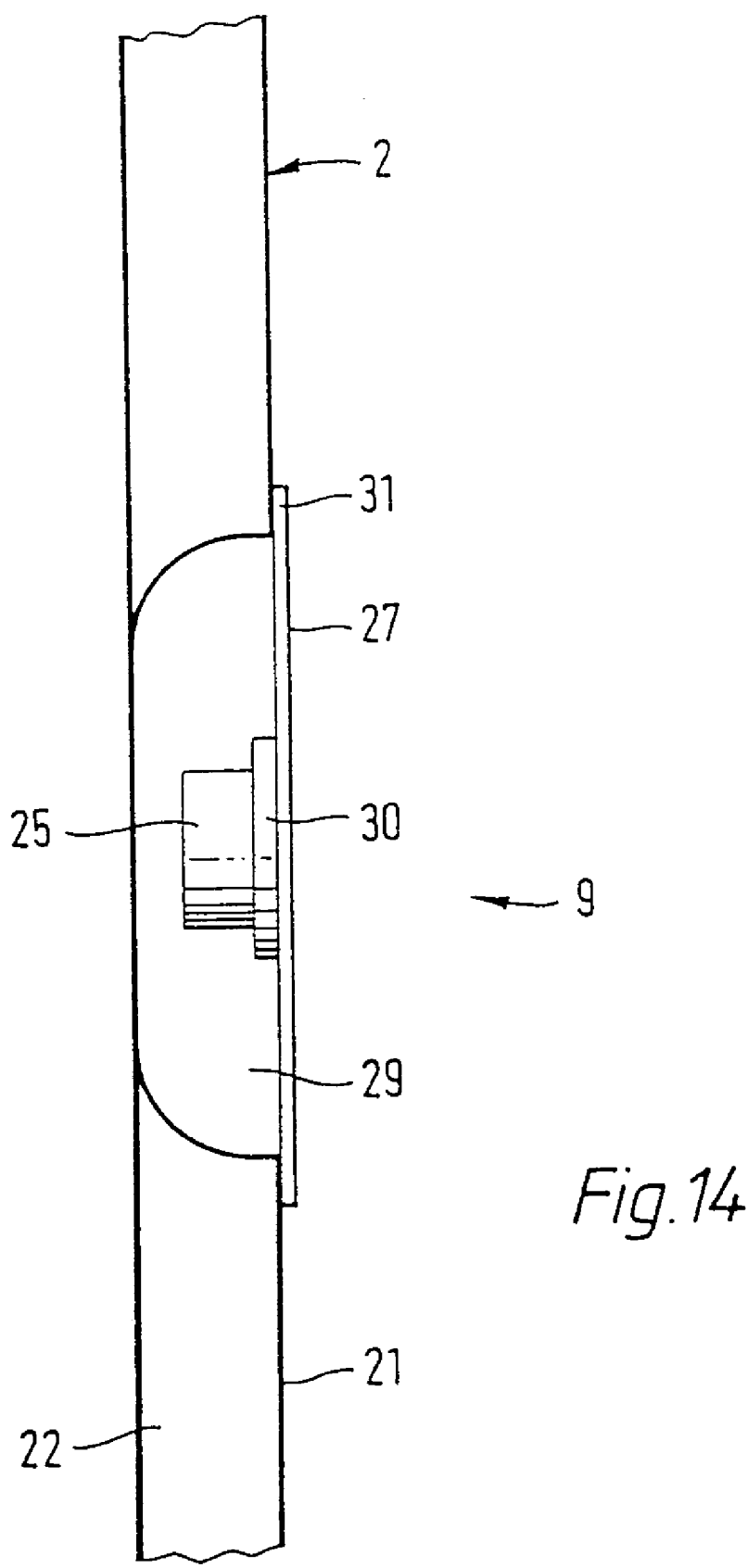
Figure 15:
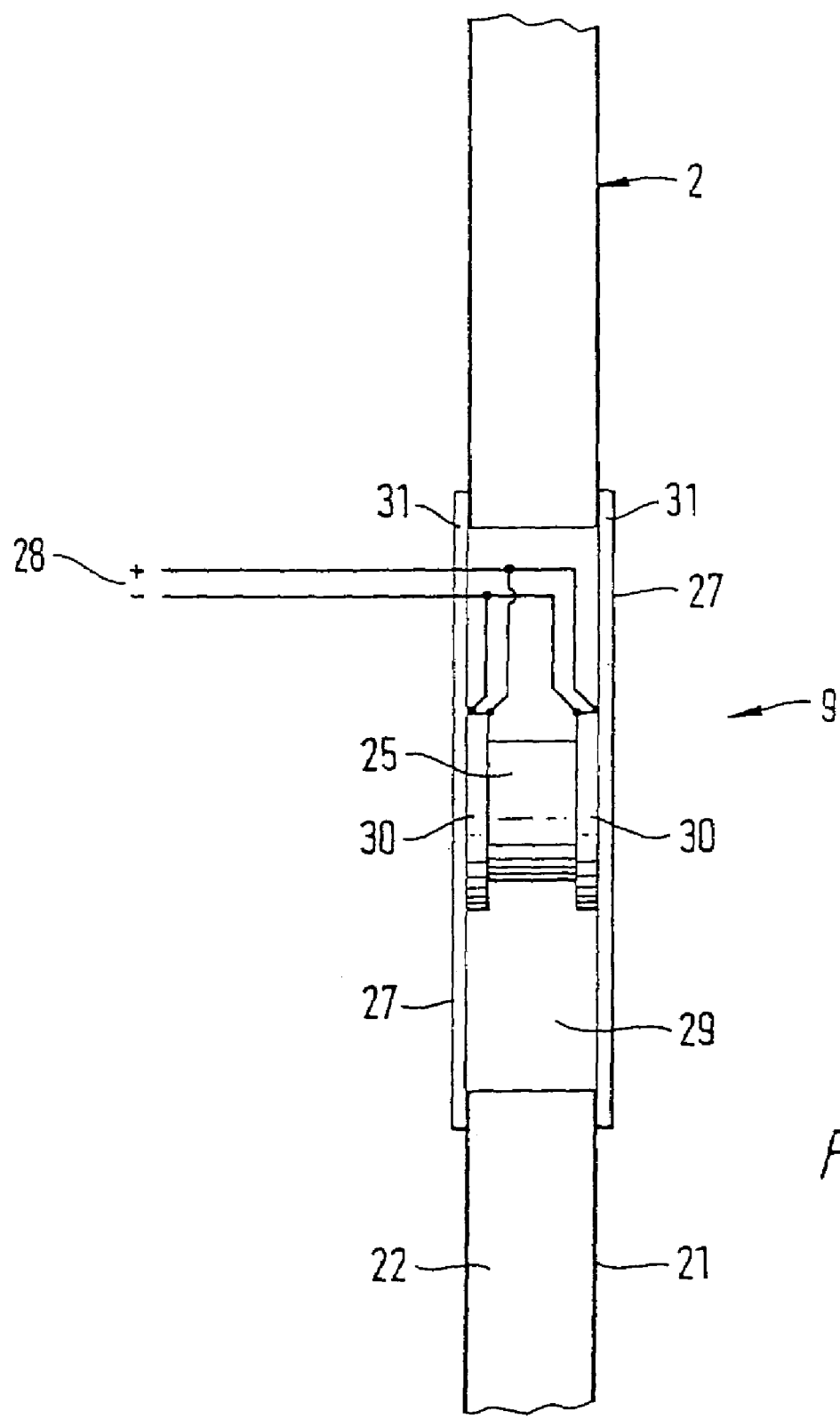
Figure 16:
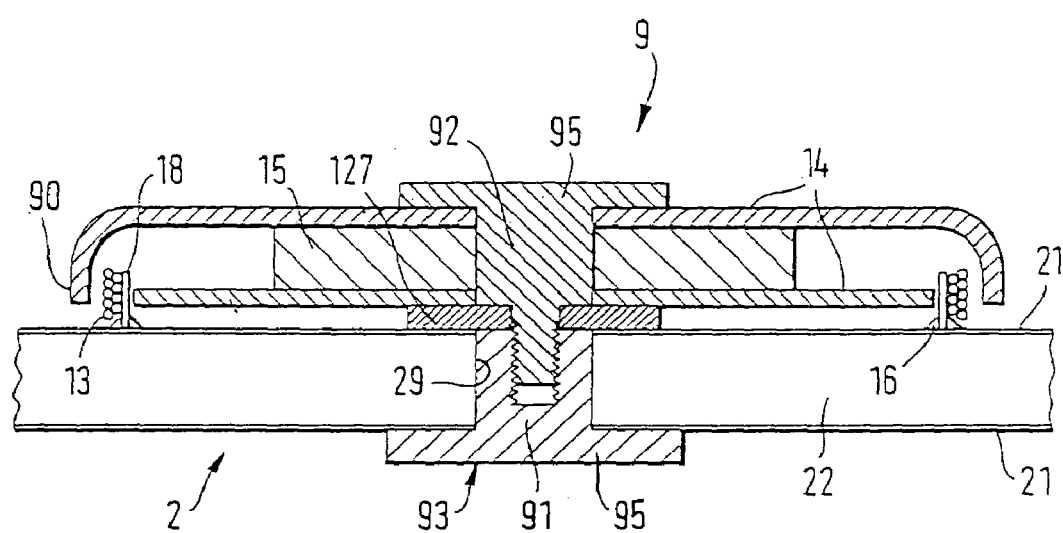
Figure 17:
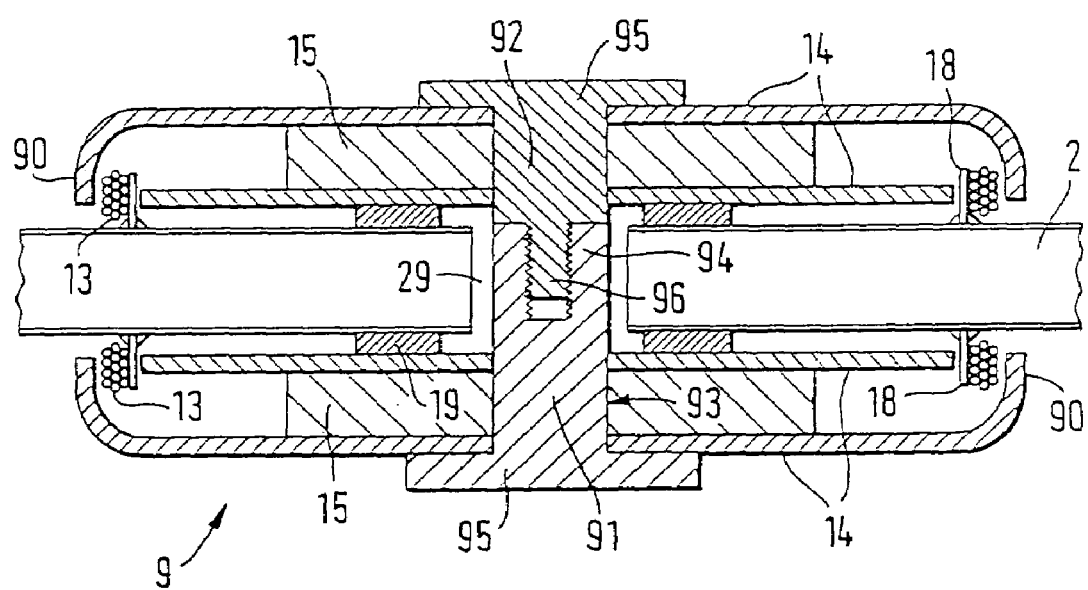
Figure 18:
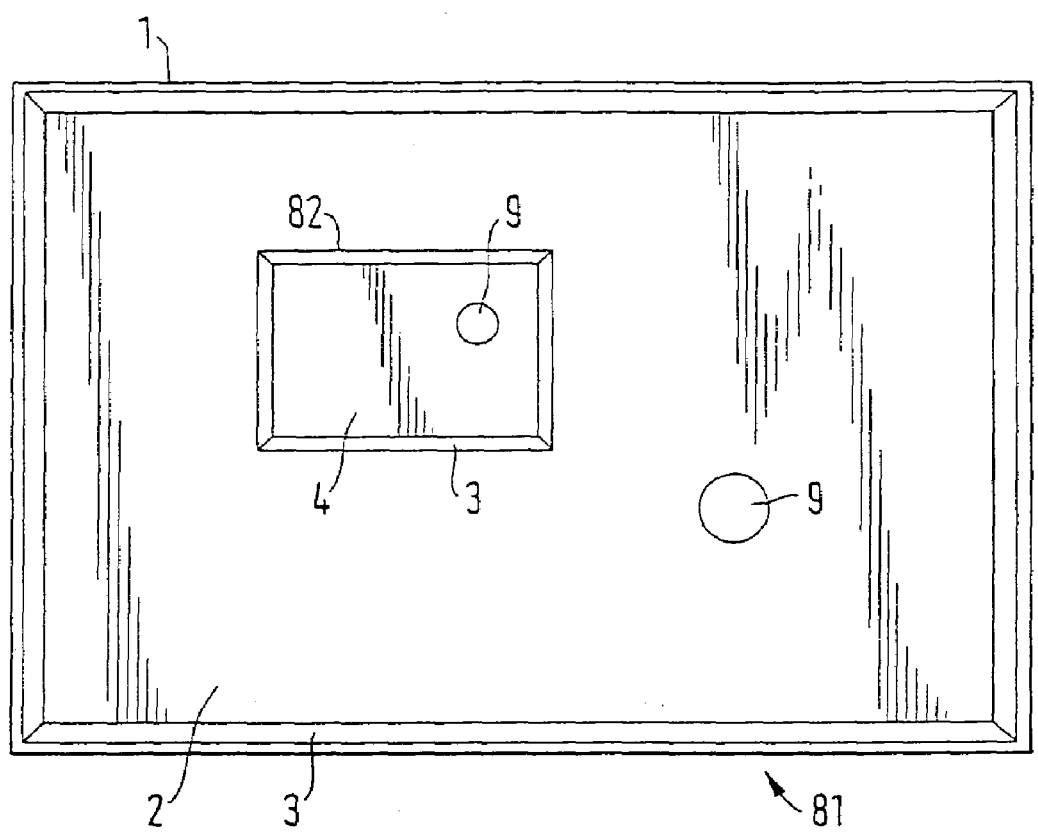
Figure 19:
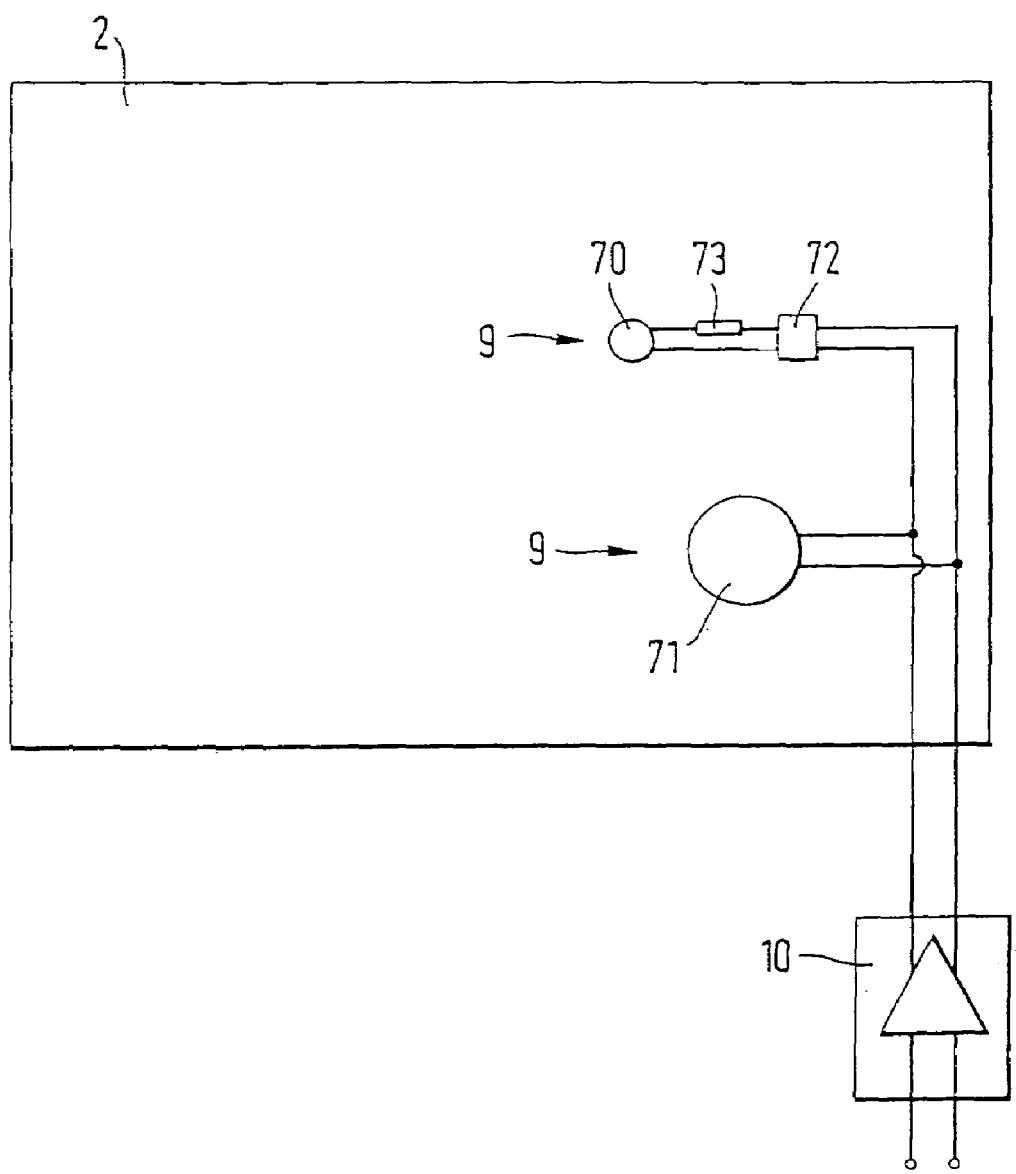
Figure 20:
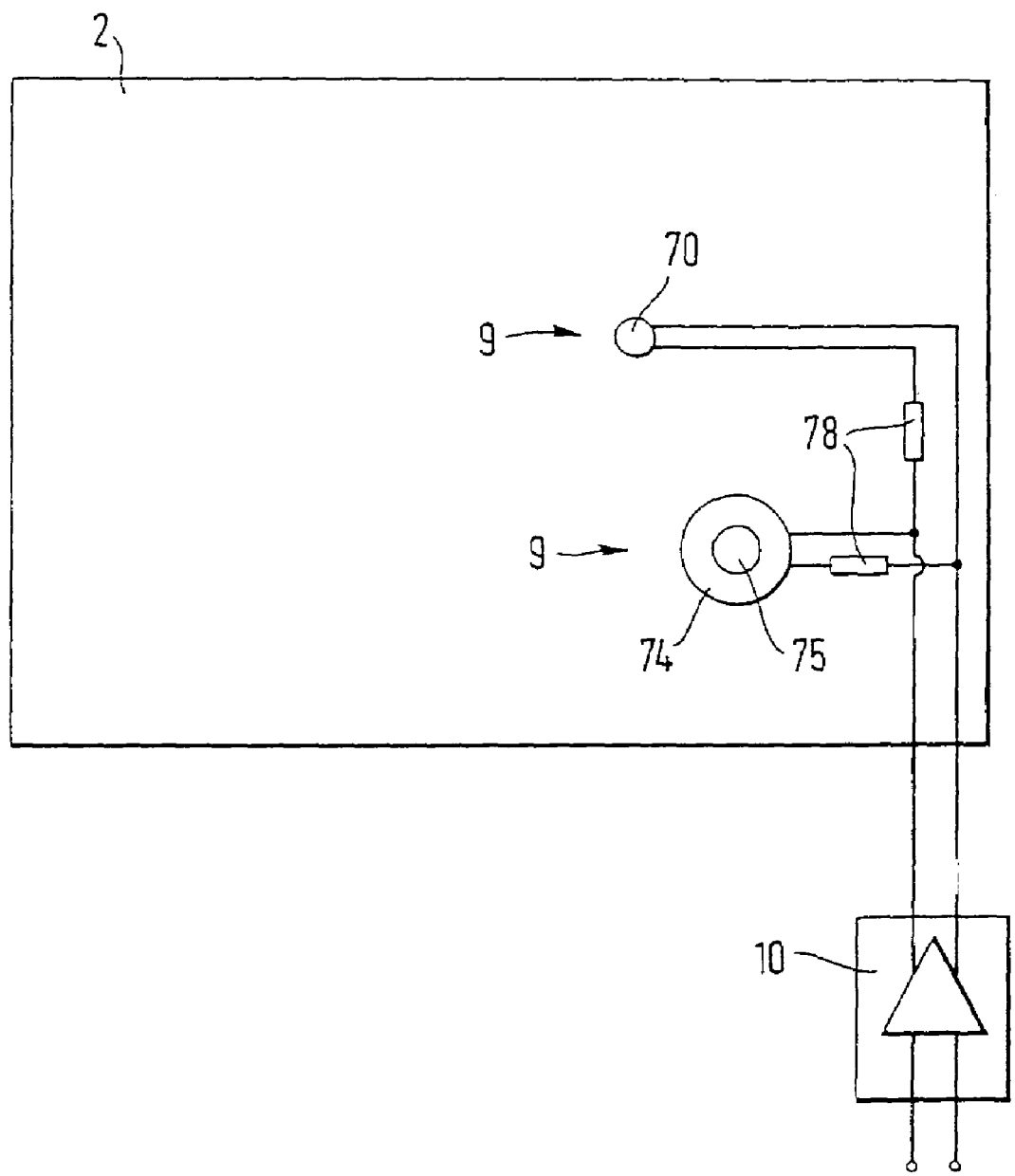
Figure 21:
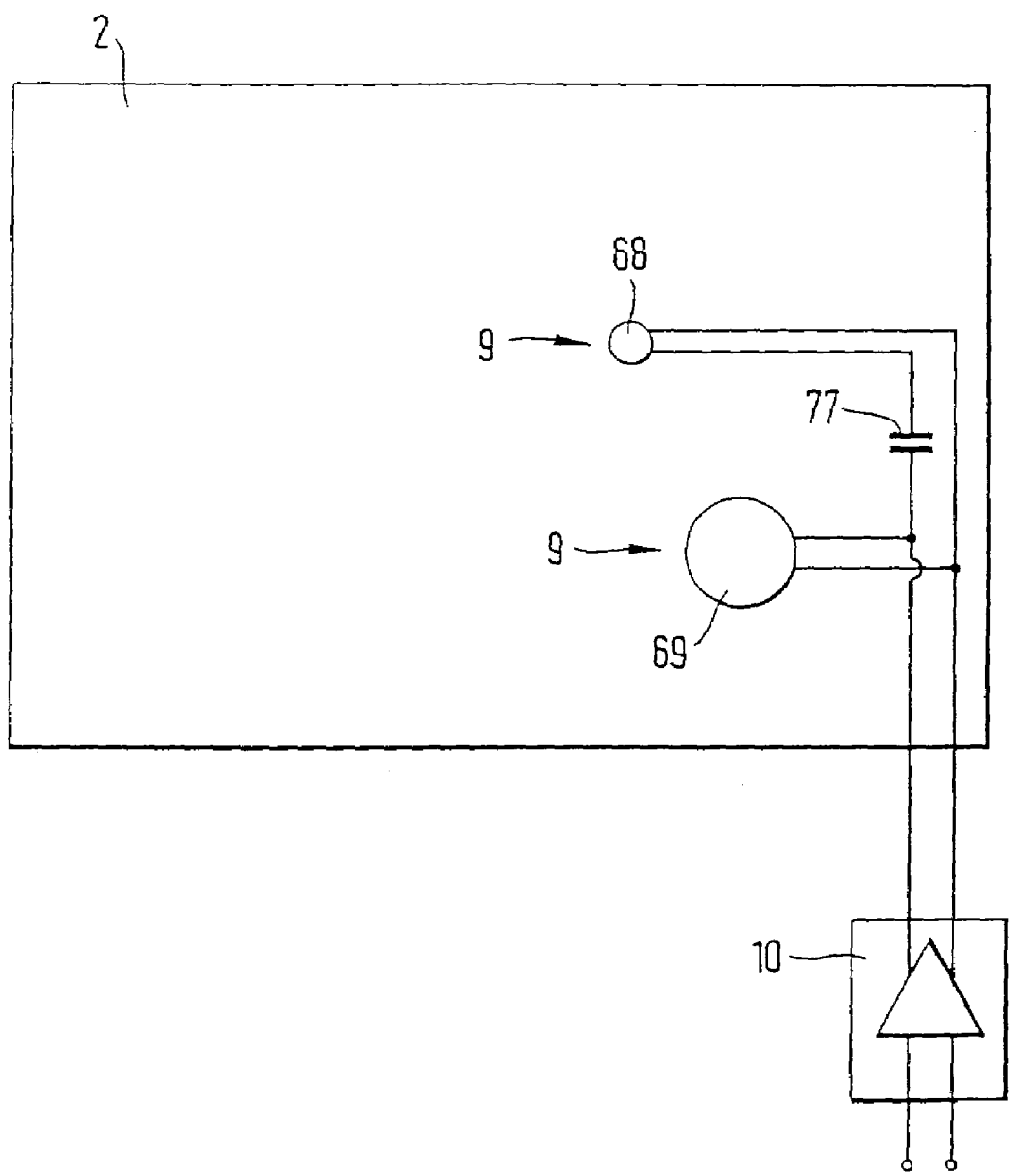
Figure 22:
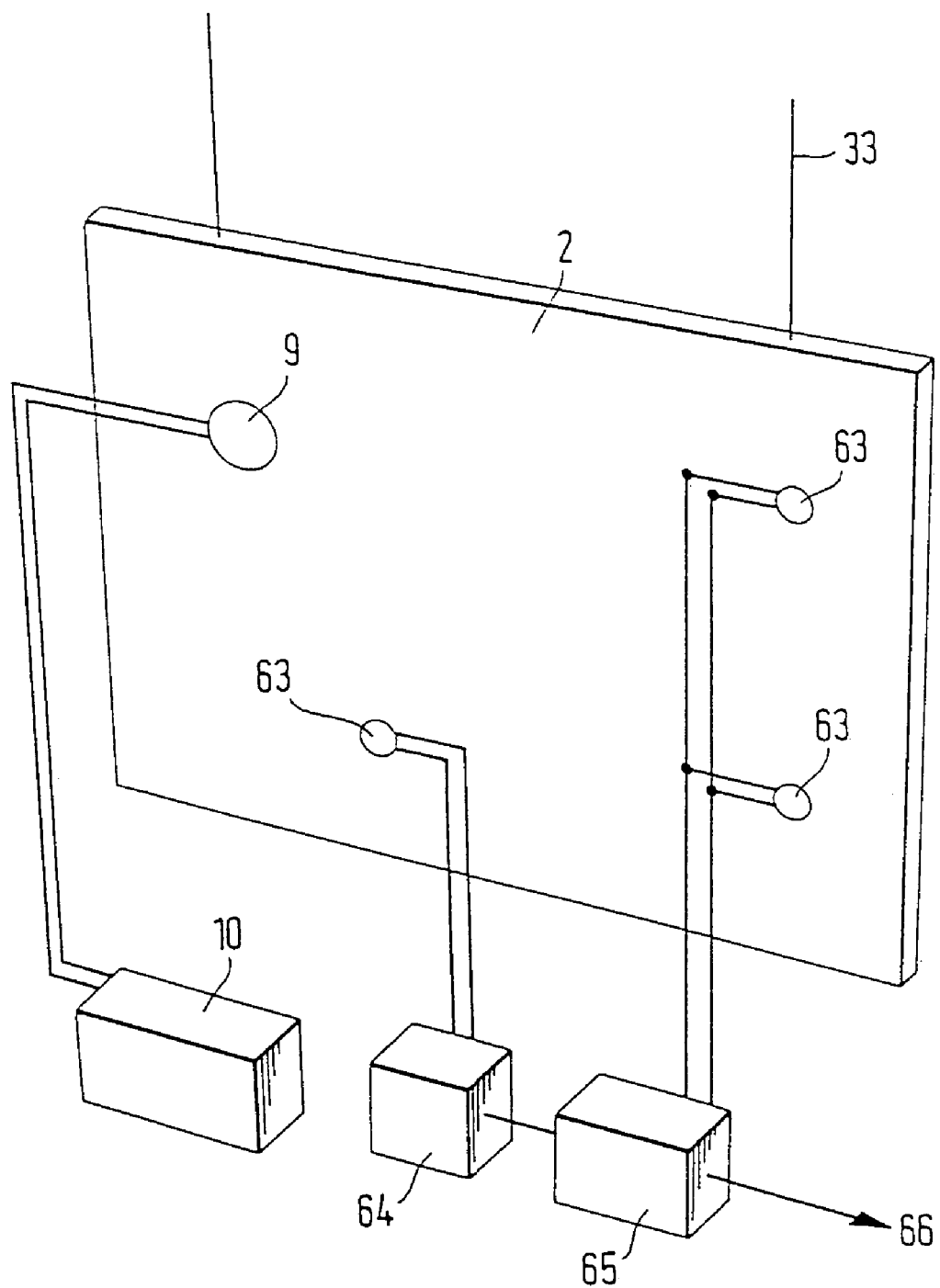
Figure 23:
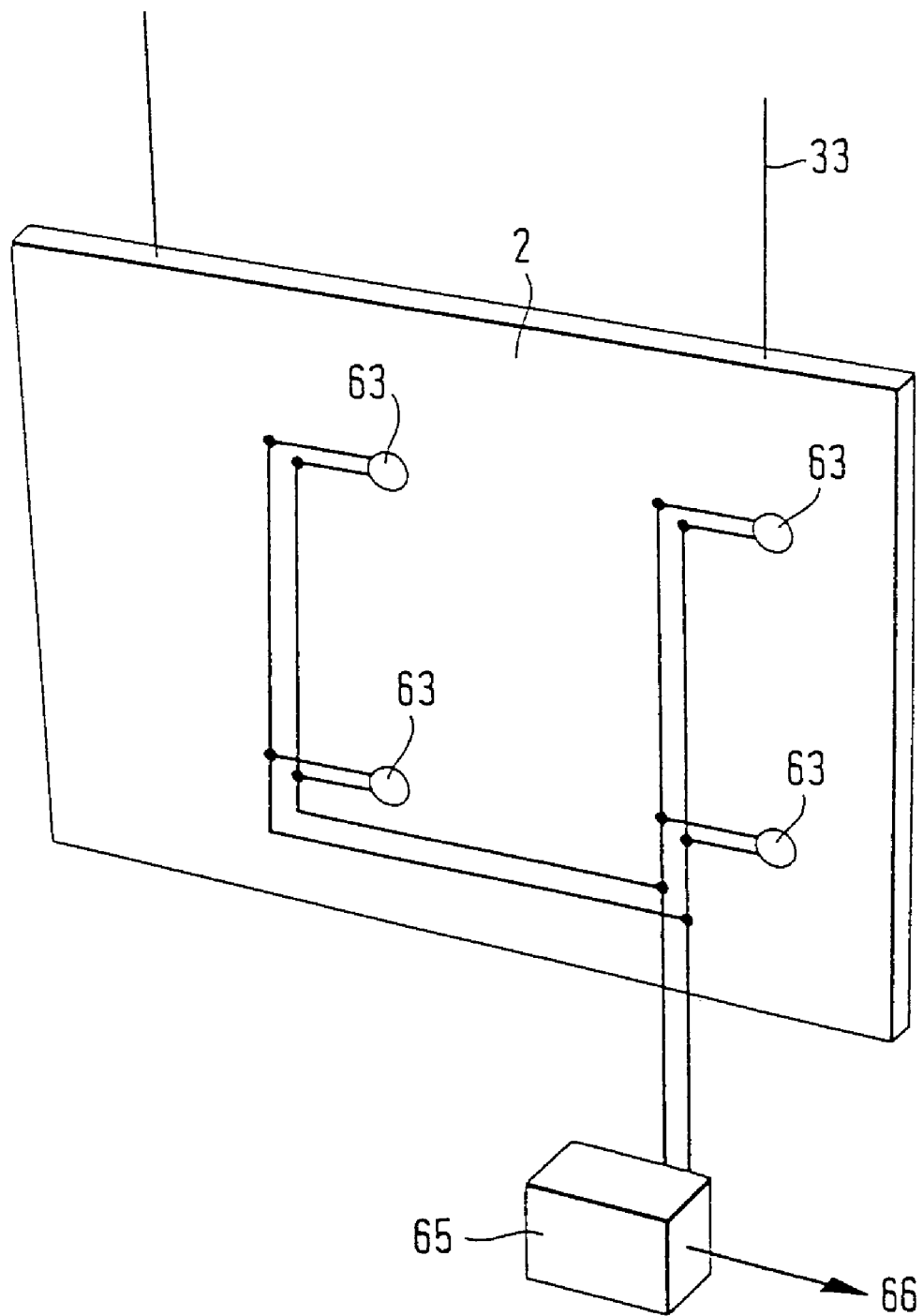
Figure 24:
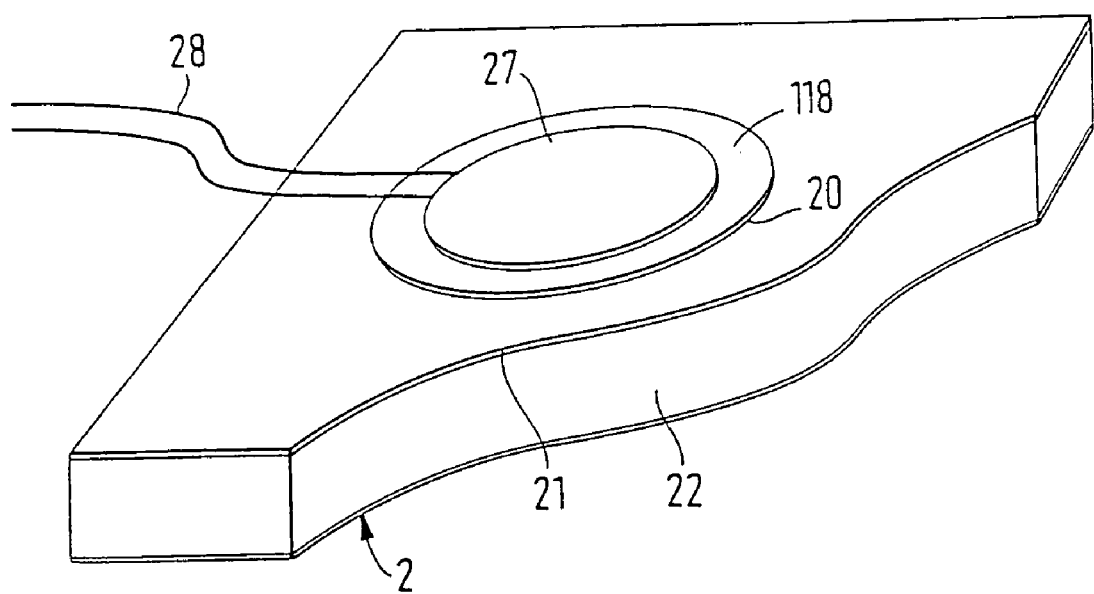
Figure 25:
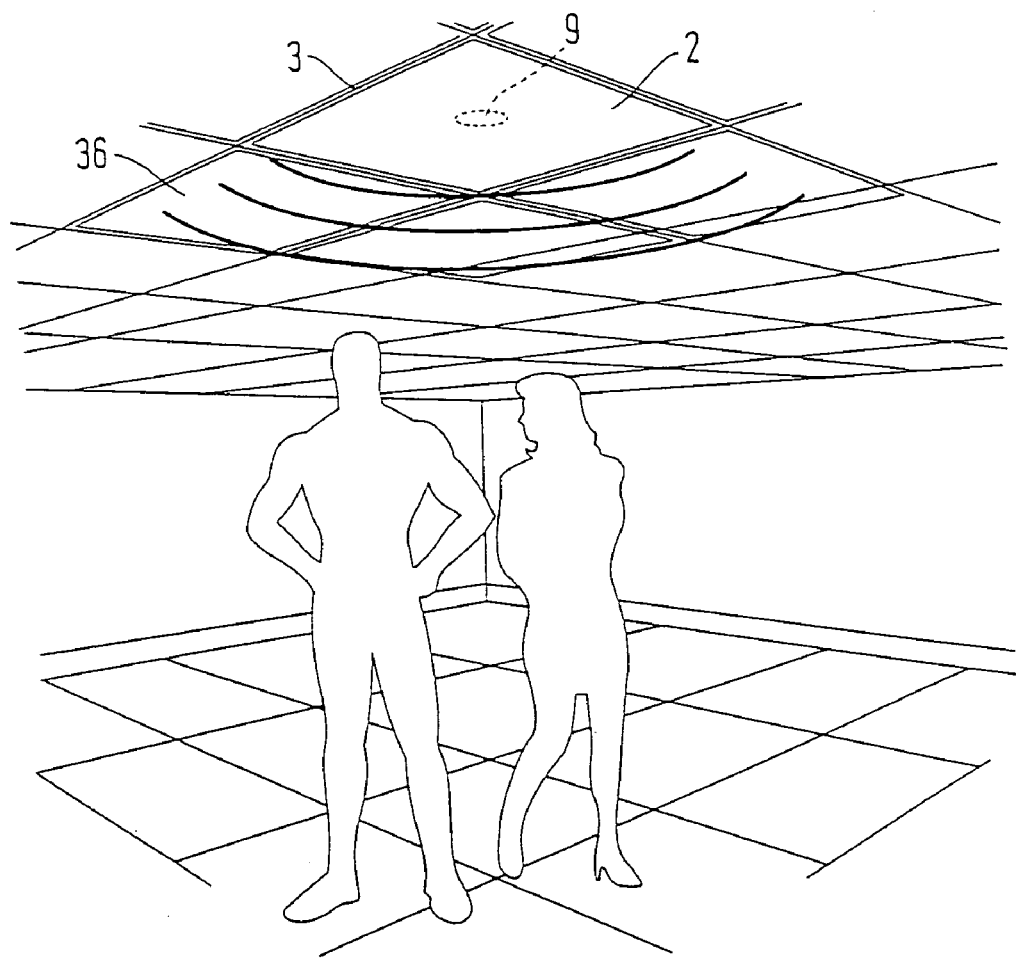
Figure 26:
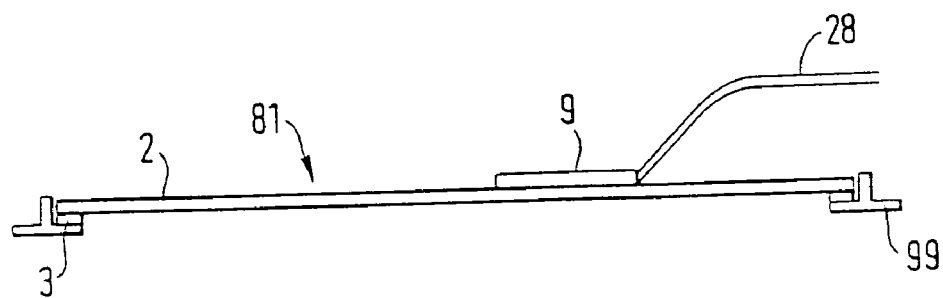
Figure 27:
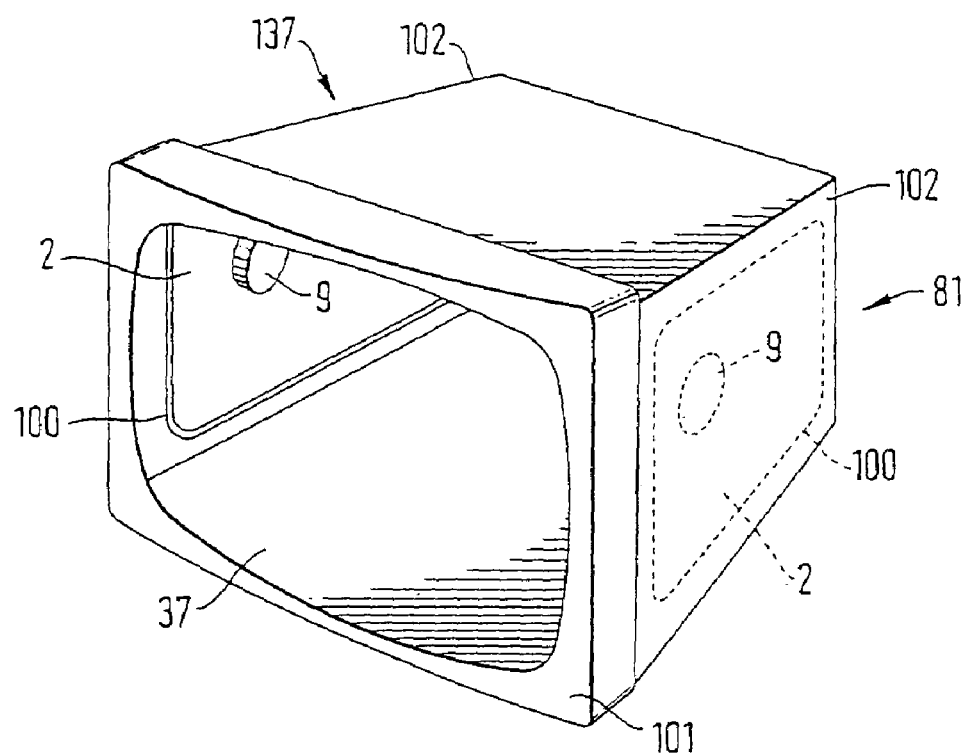
Figure 28:
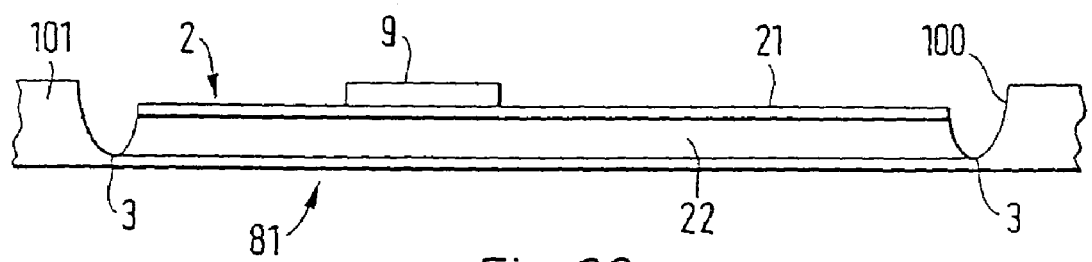
Figure 29:
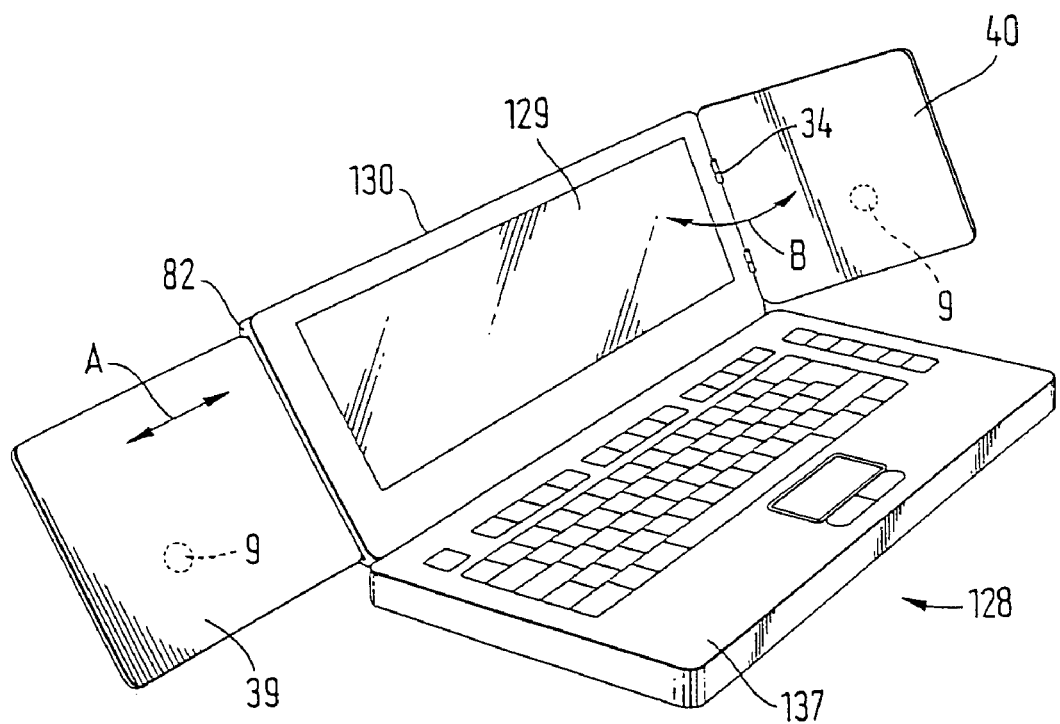
Figure 30:
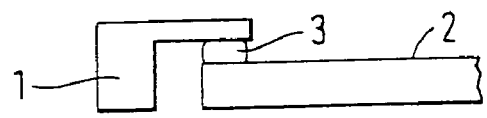
Figure 31:
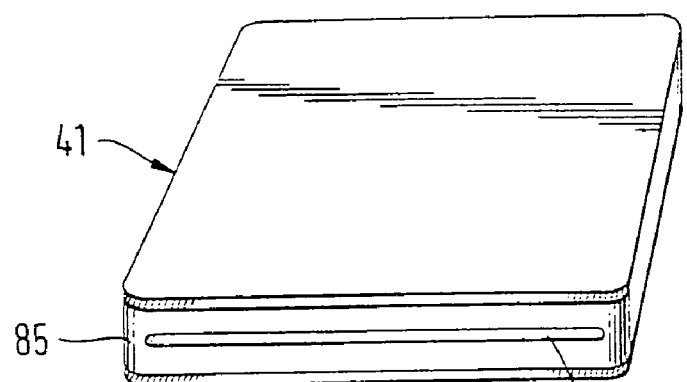
Figure 32:
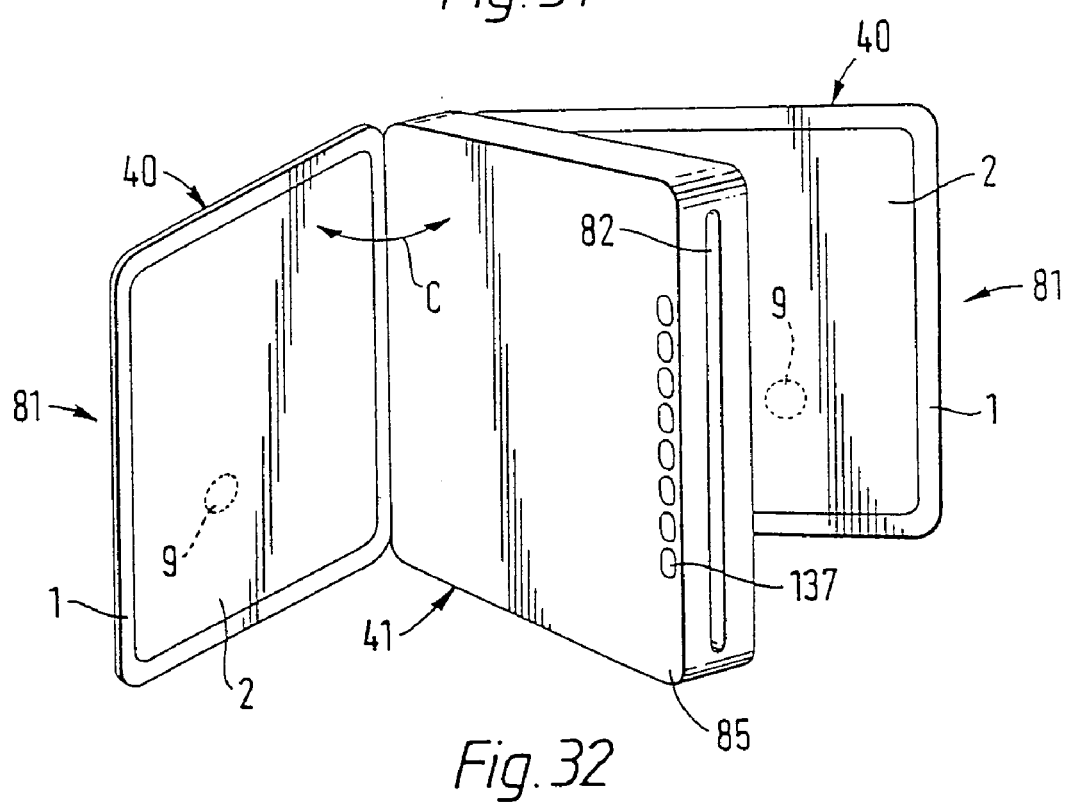
Figure 33:
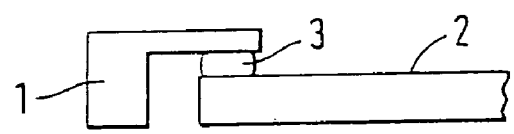
Figure 34:
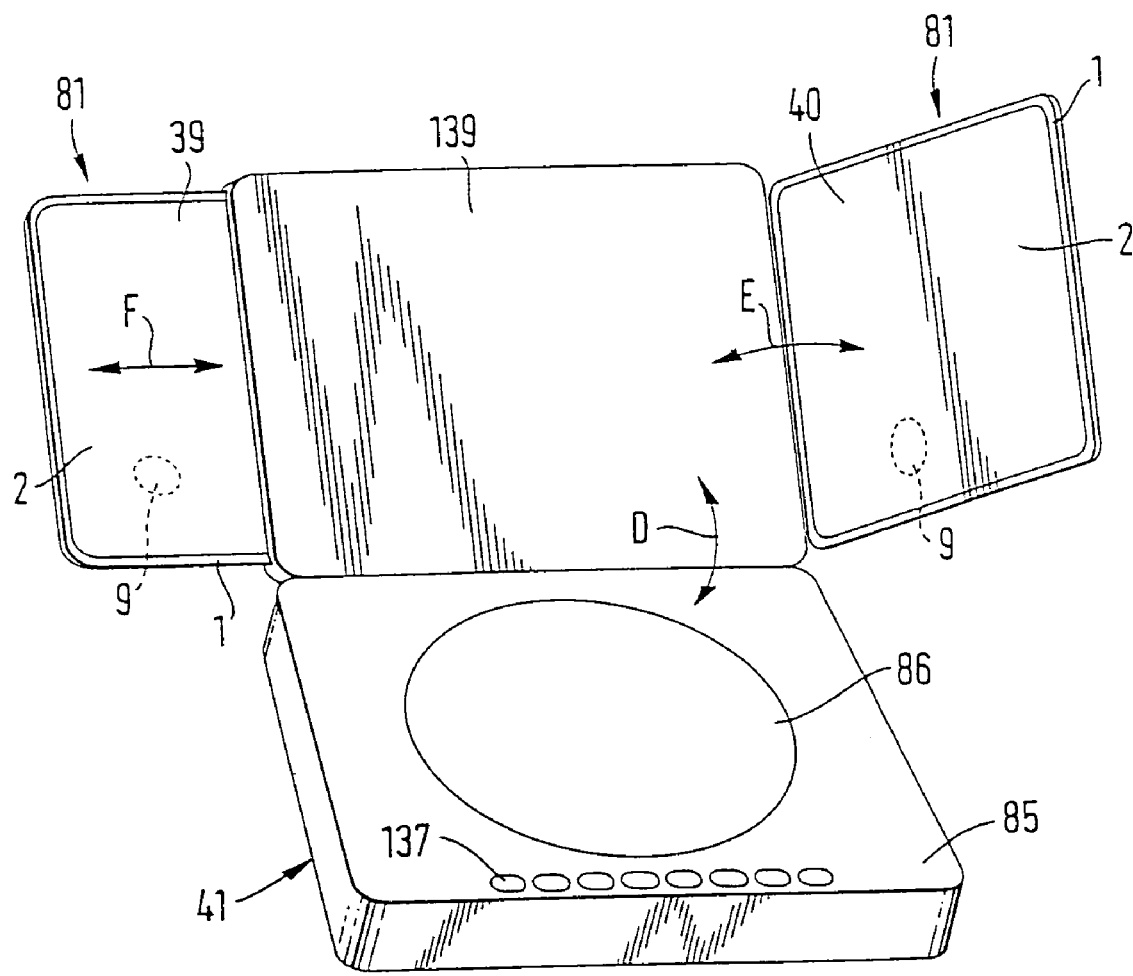
Figure 35:
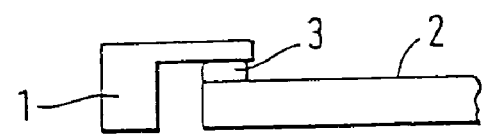
Figure 36:
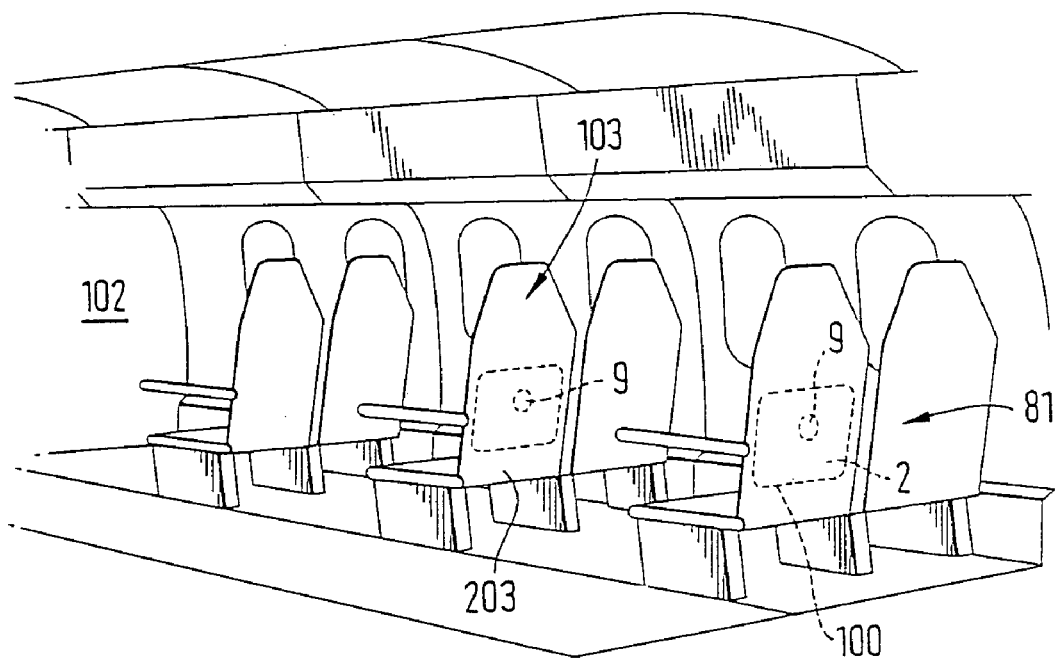
Figure 37:
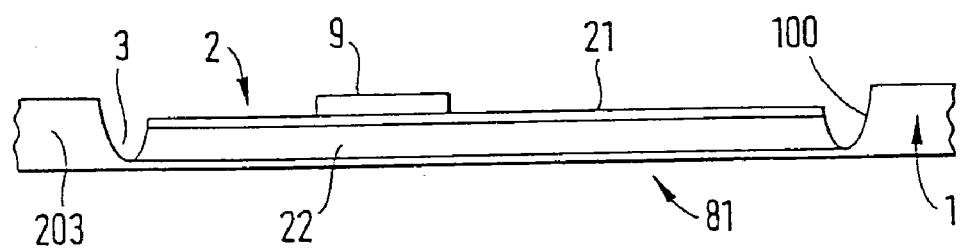
Figure 41:
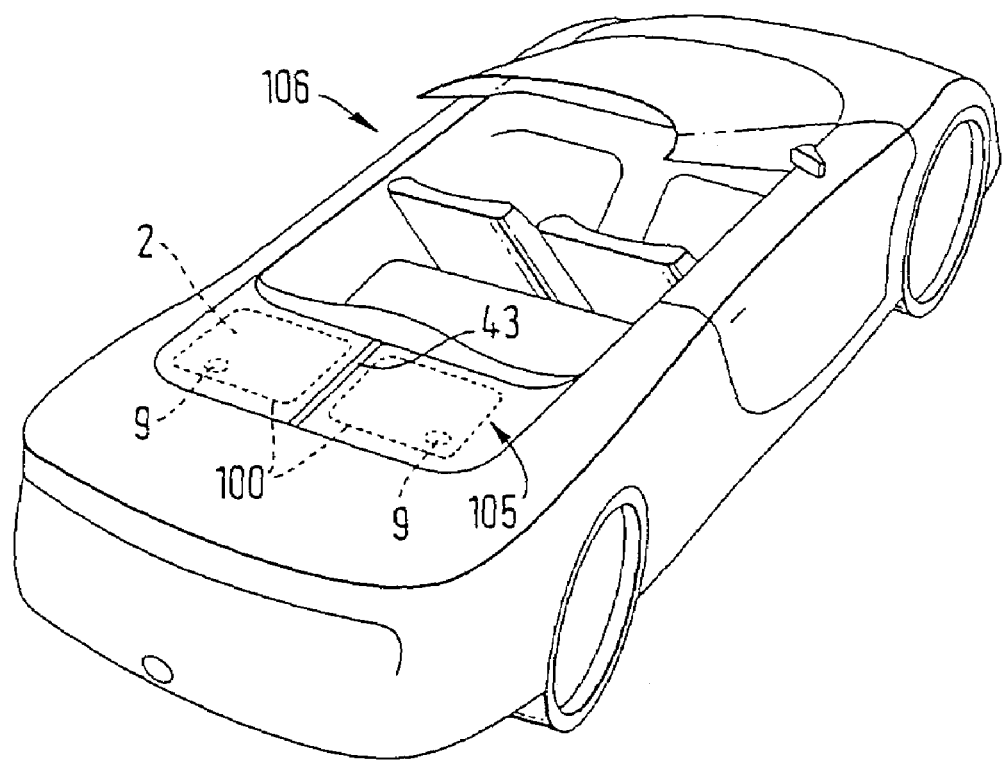
Figure 42:
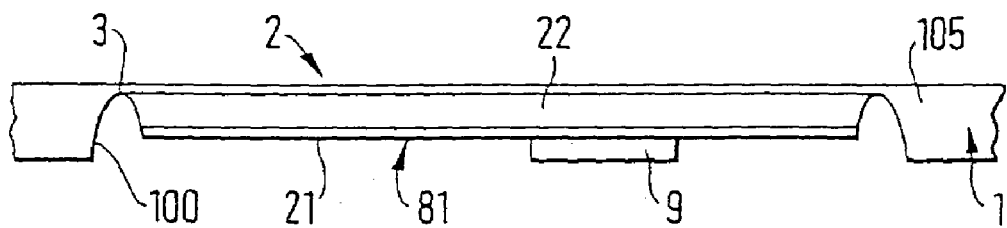
Figure 43:
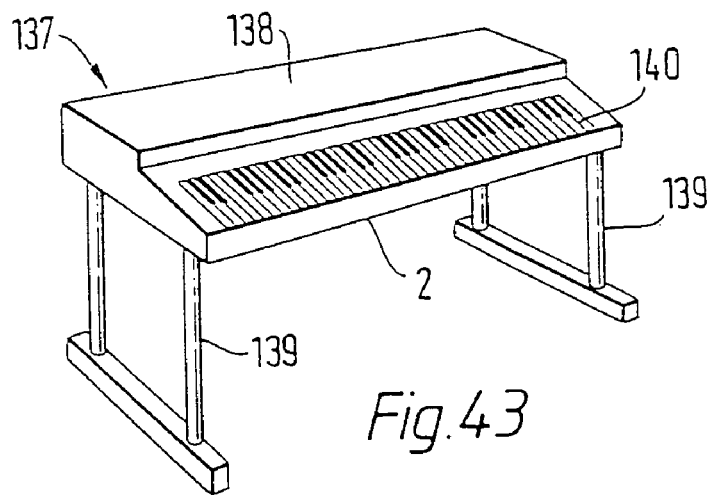
Figure 44:
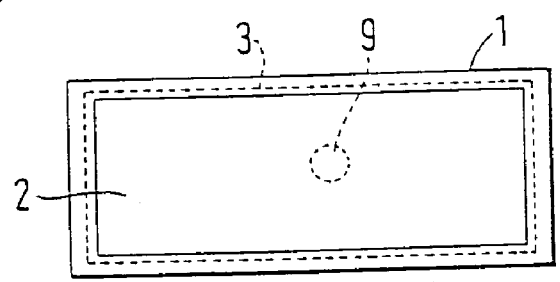
Figure 45:
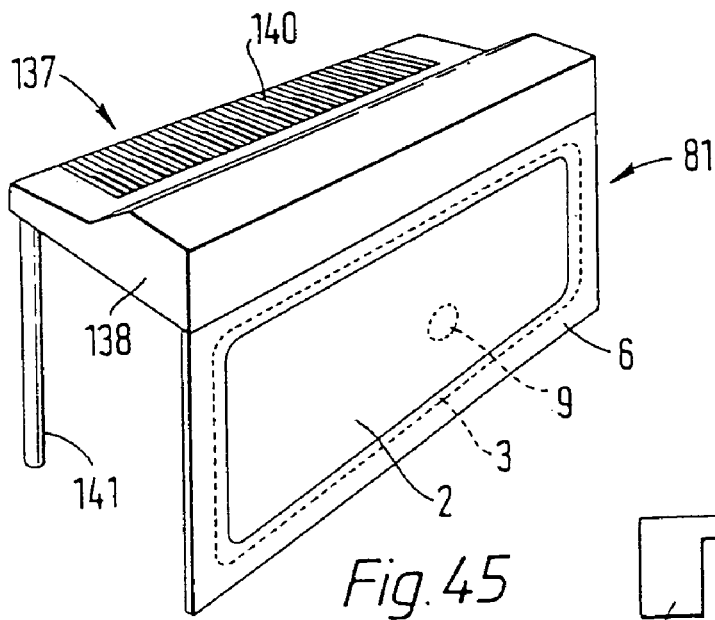
Figure 46:
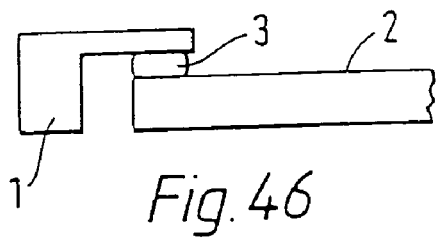
Figure 47:
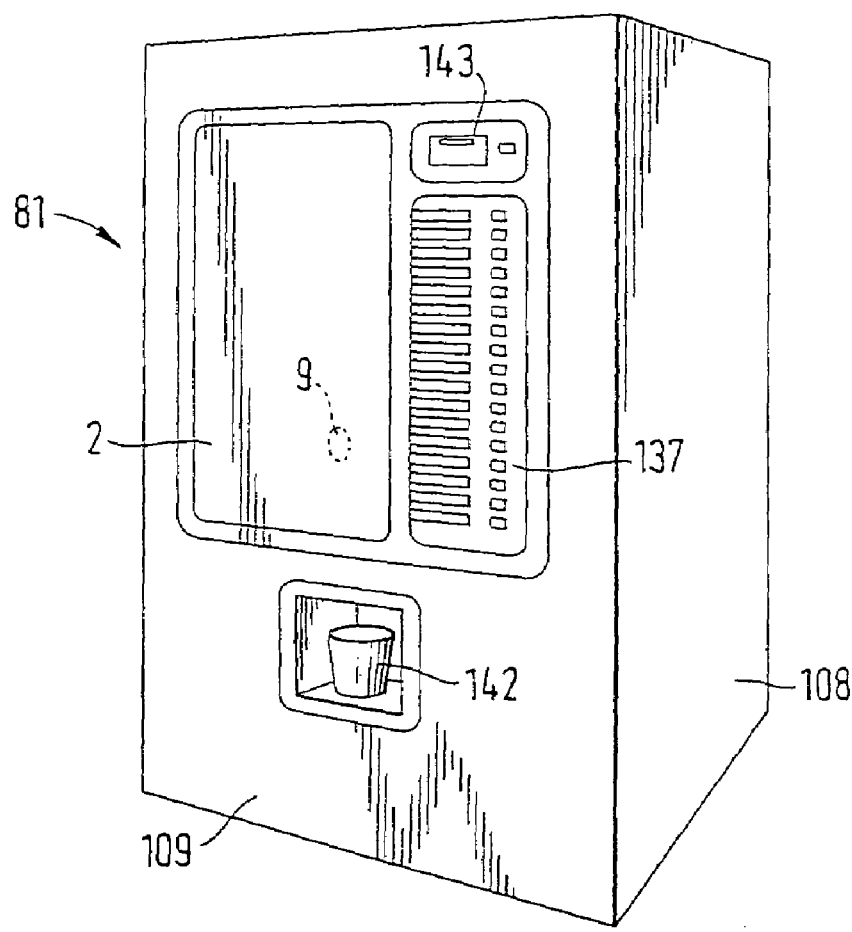
Figure 48:
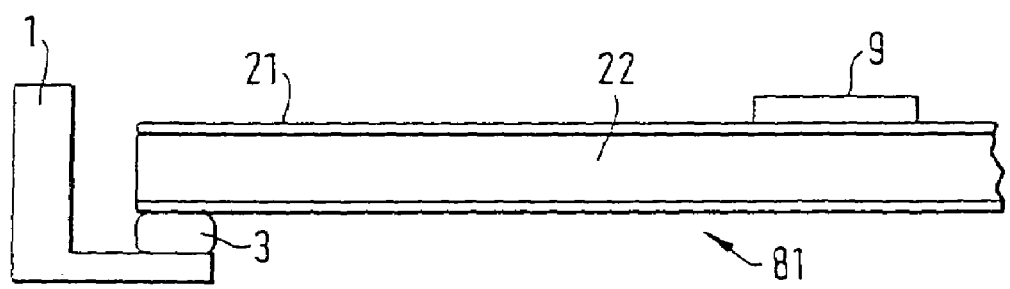
Figure 49:
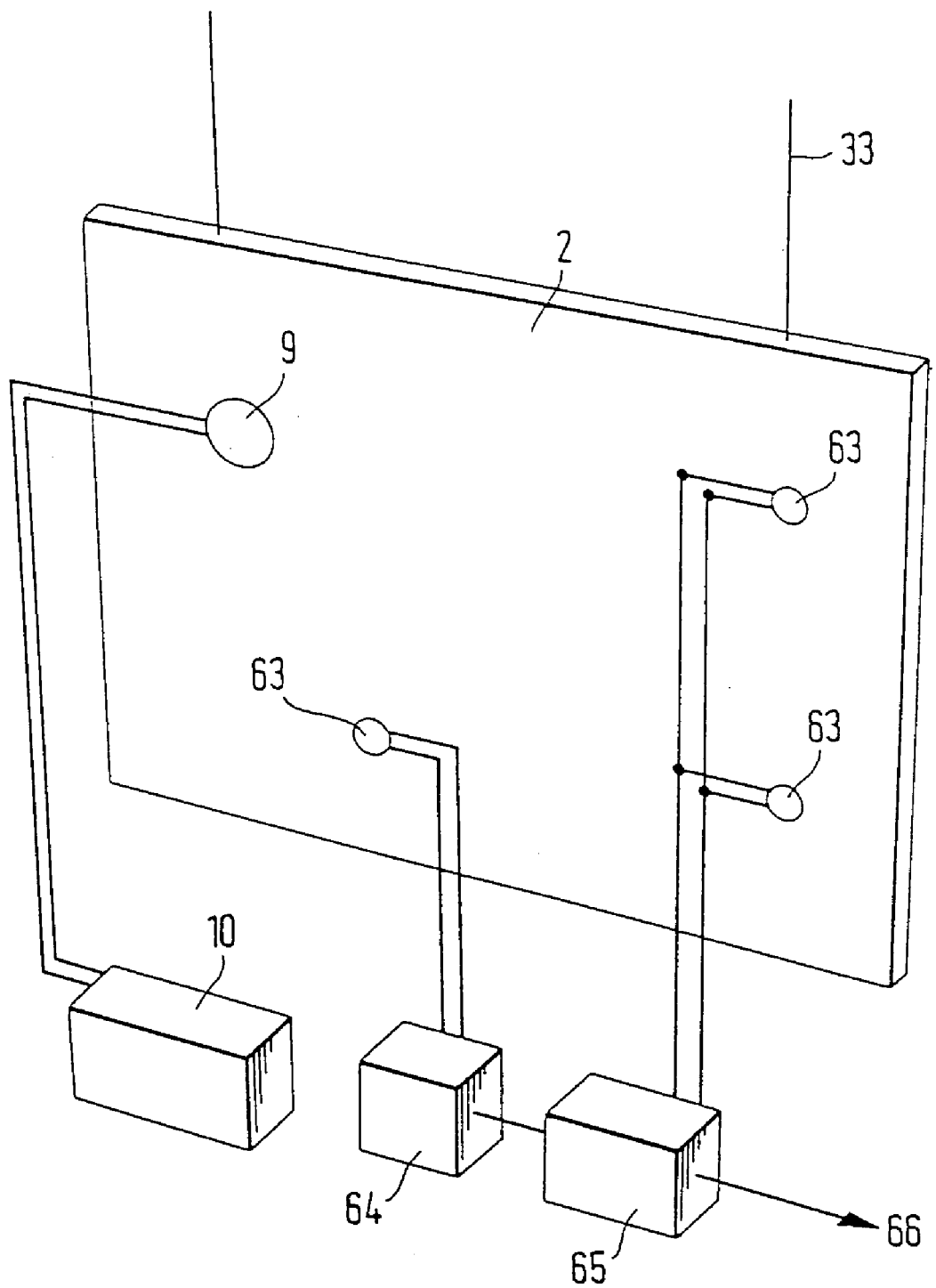
Figure 53:
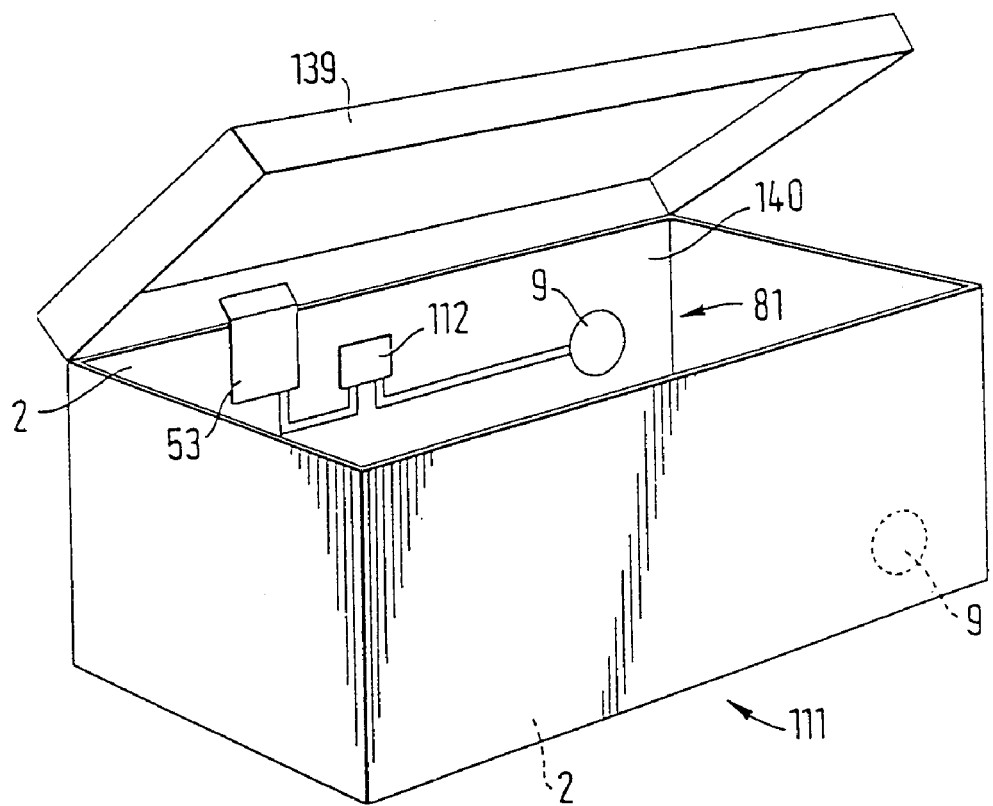
Figure 54:
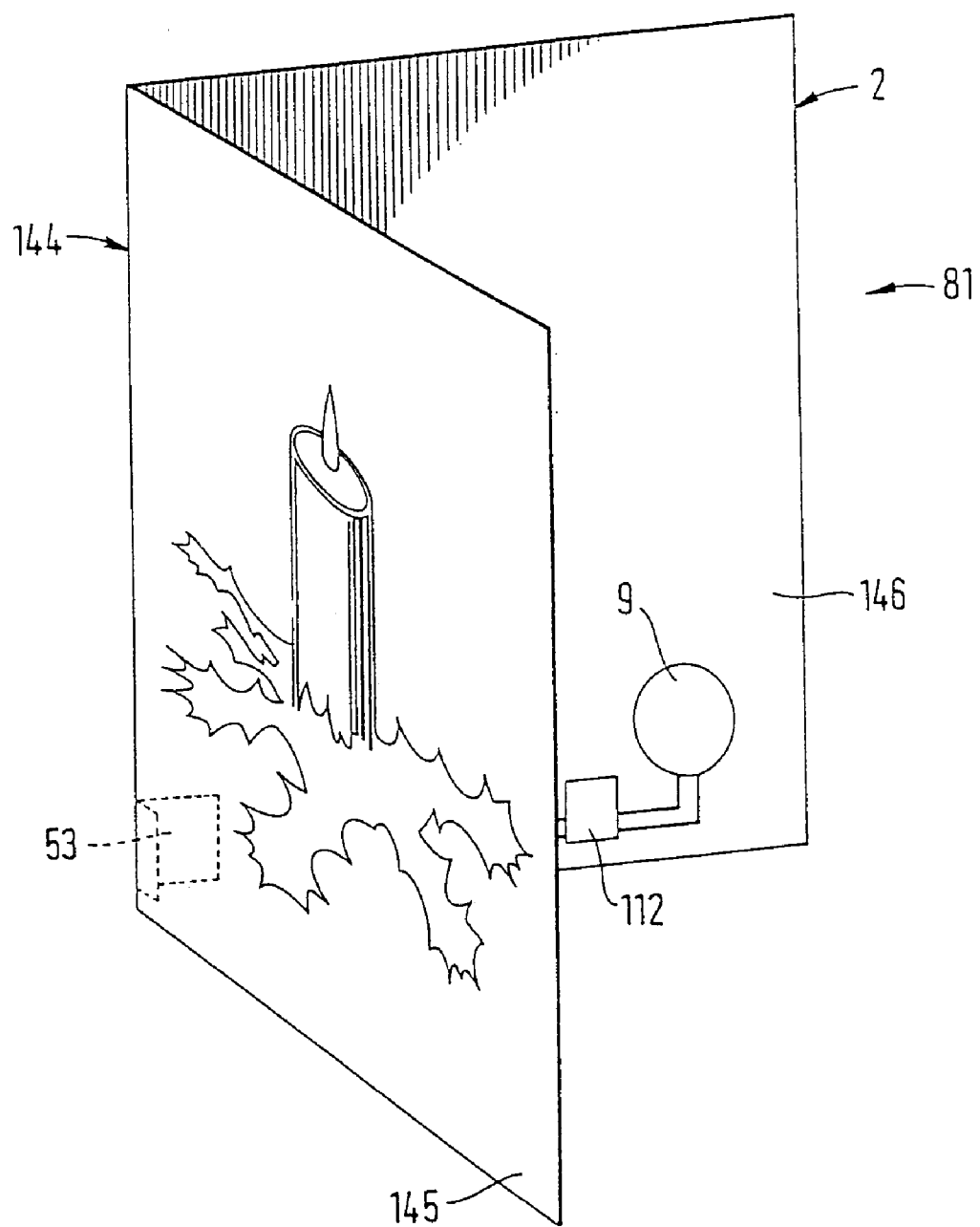
Figure 55:
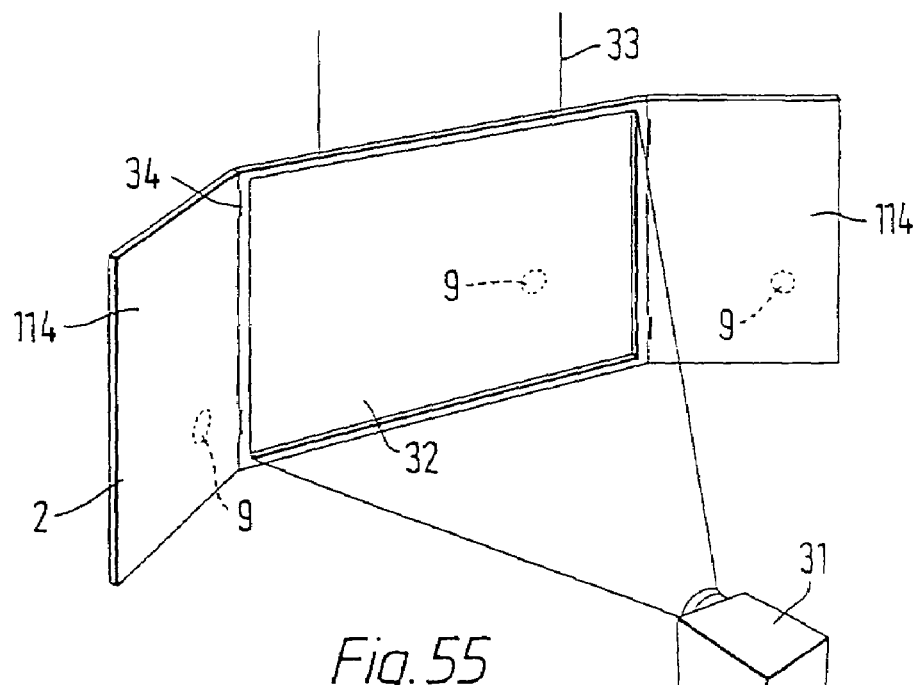
Figure 56:
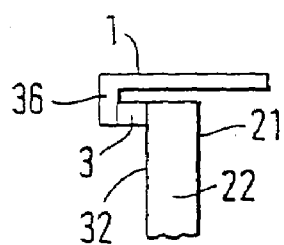
Figure 57:
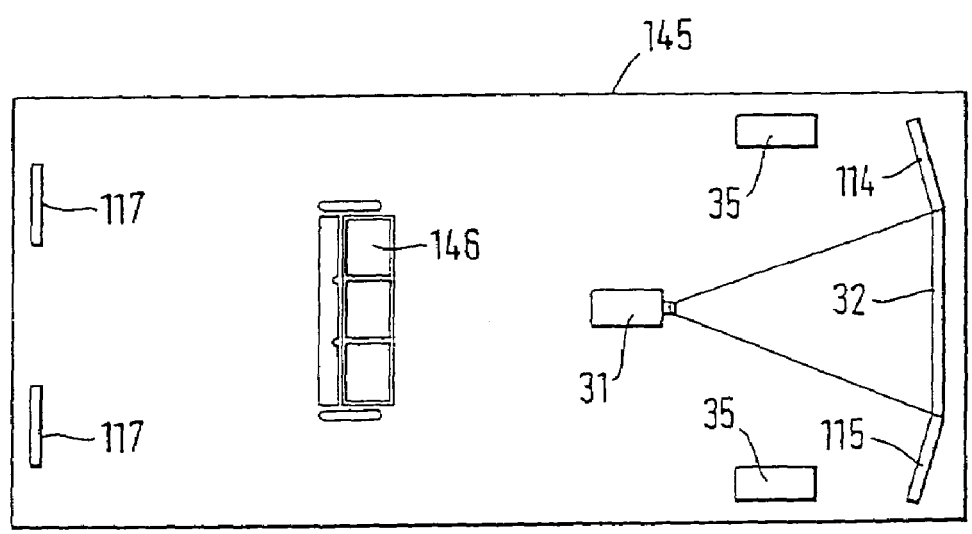
Figure 58:
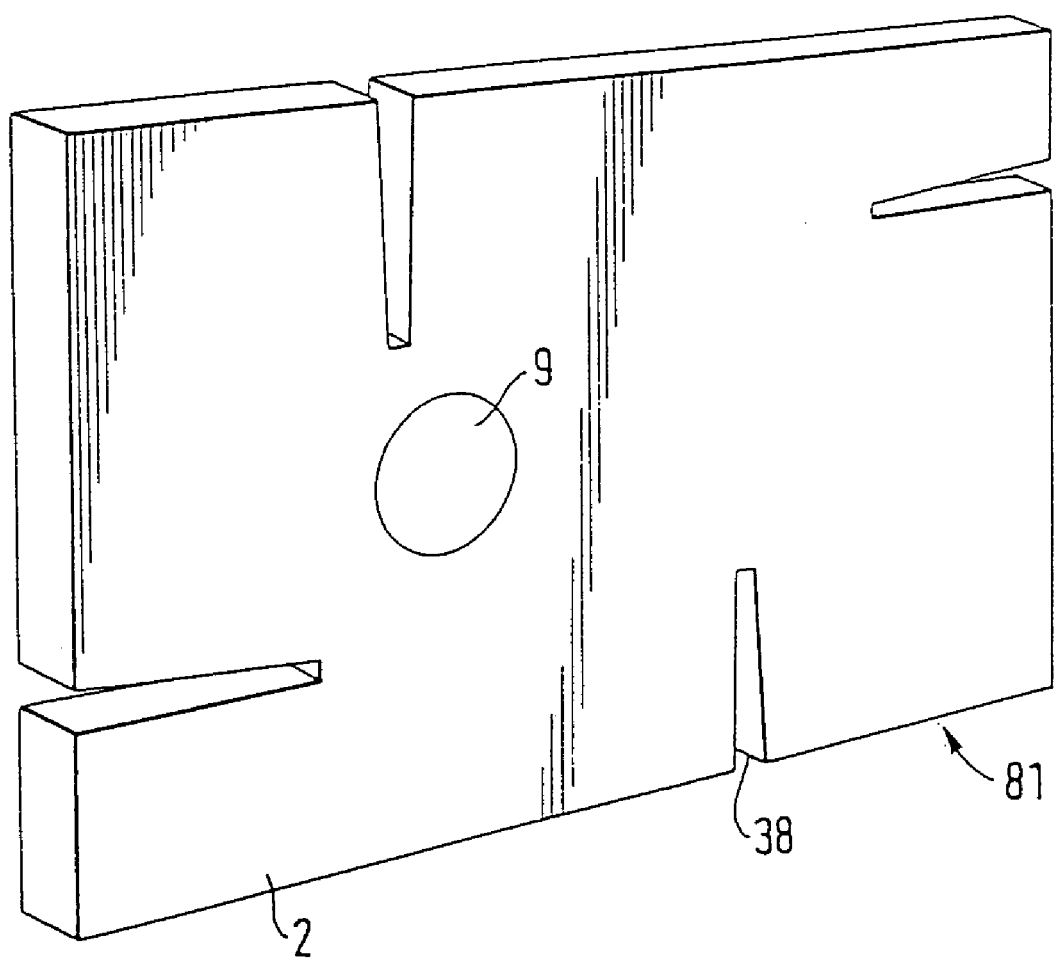
Figure 59A:
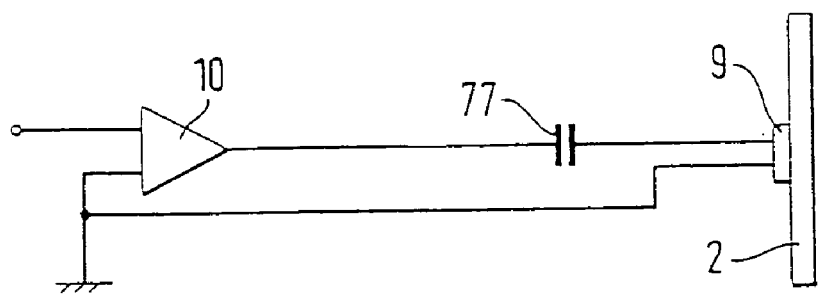
Figure 59B:
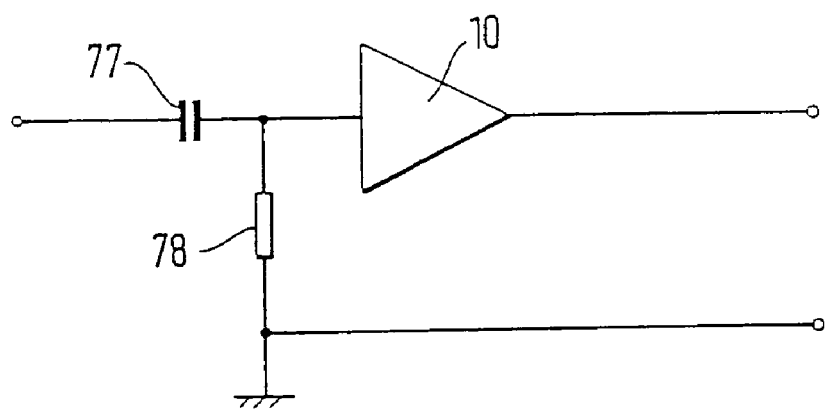
Figure 60A:
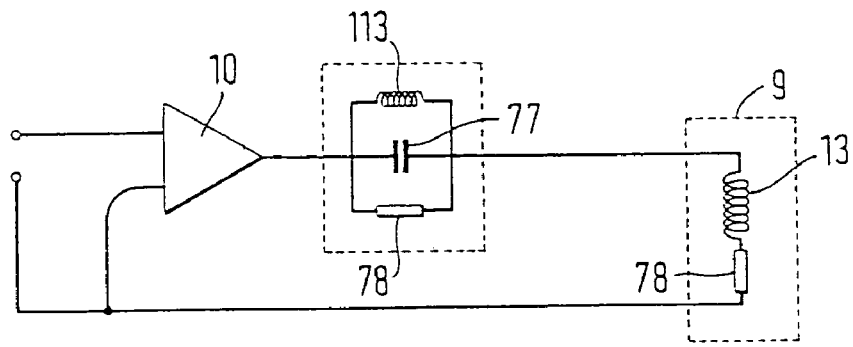
Figure 61A:
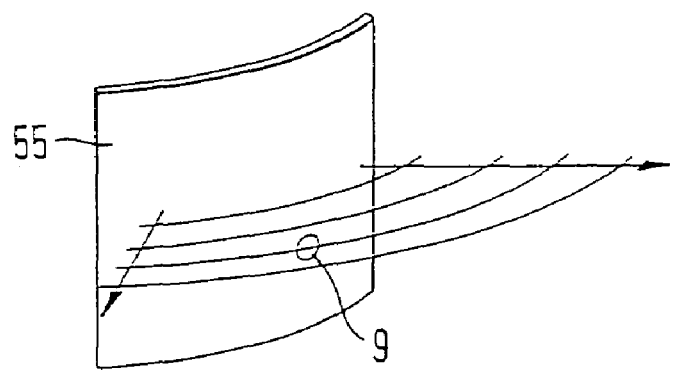
Figure 62:
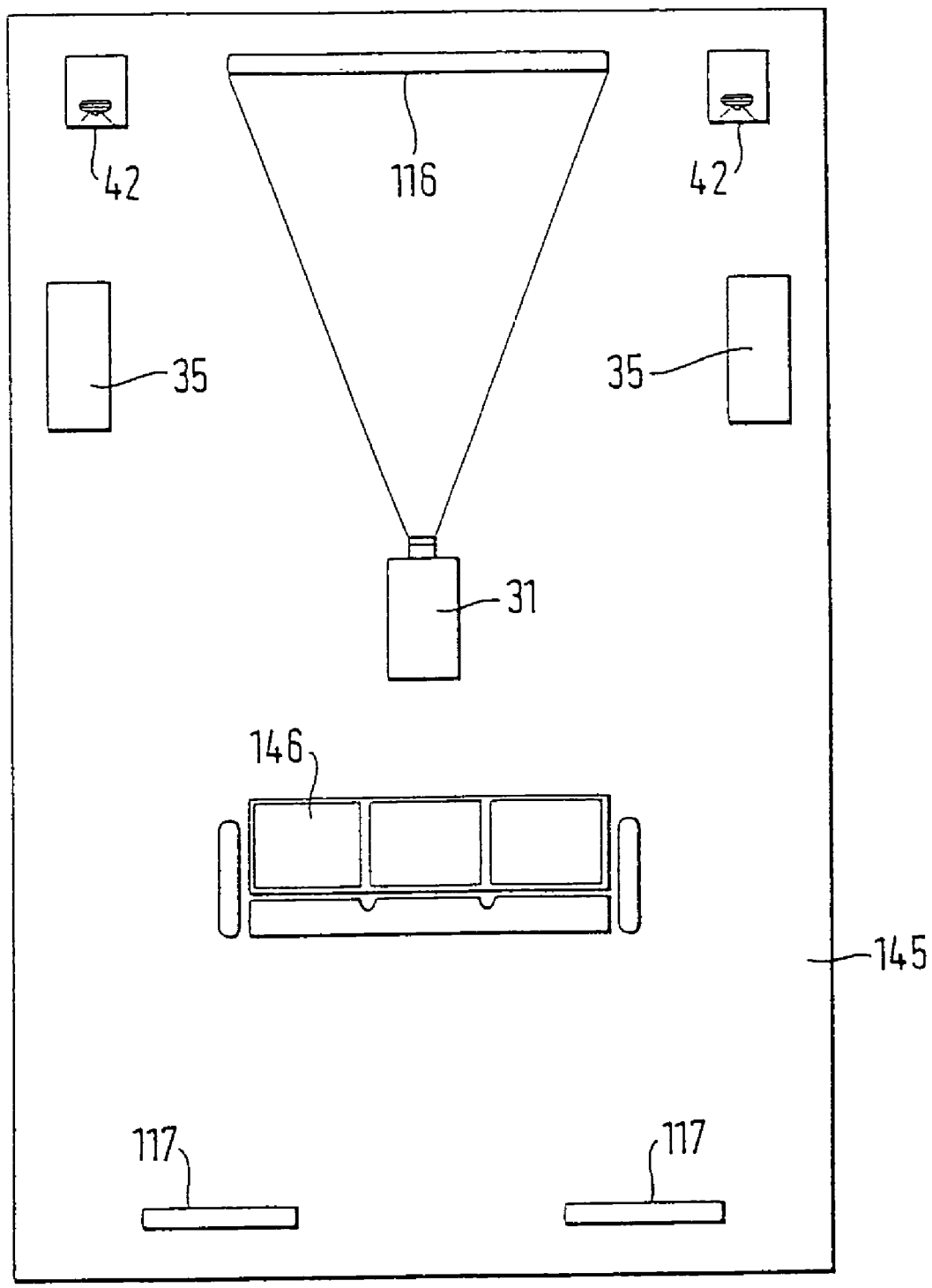
Figure 63:
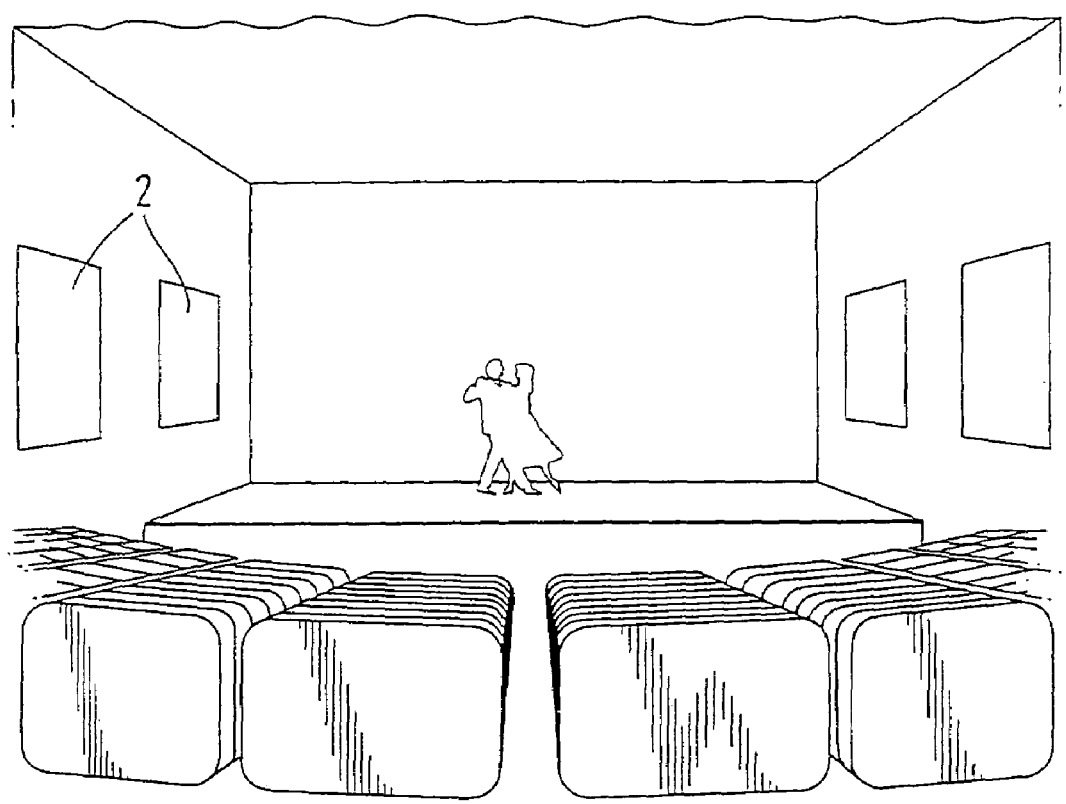
Figure 64:
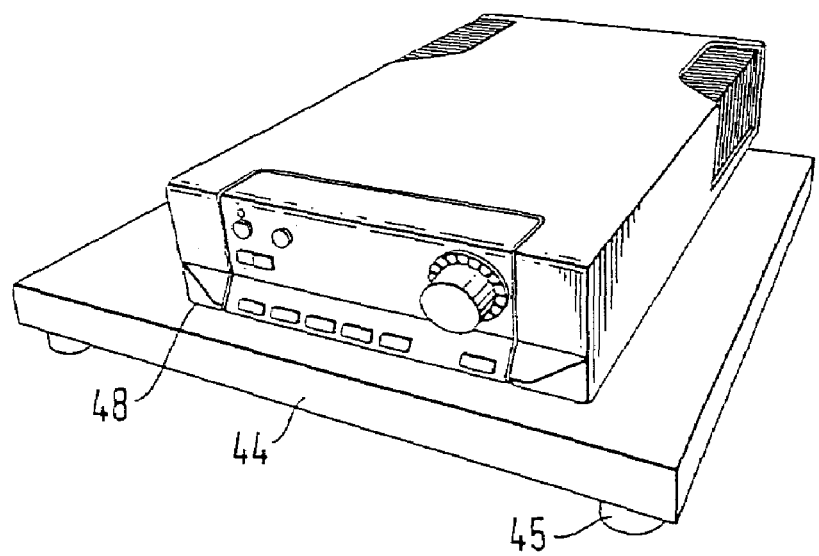
Figures 67A, 67B:
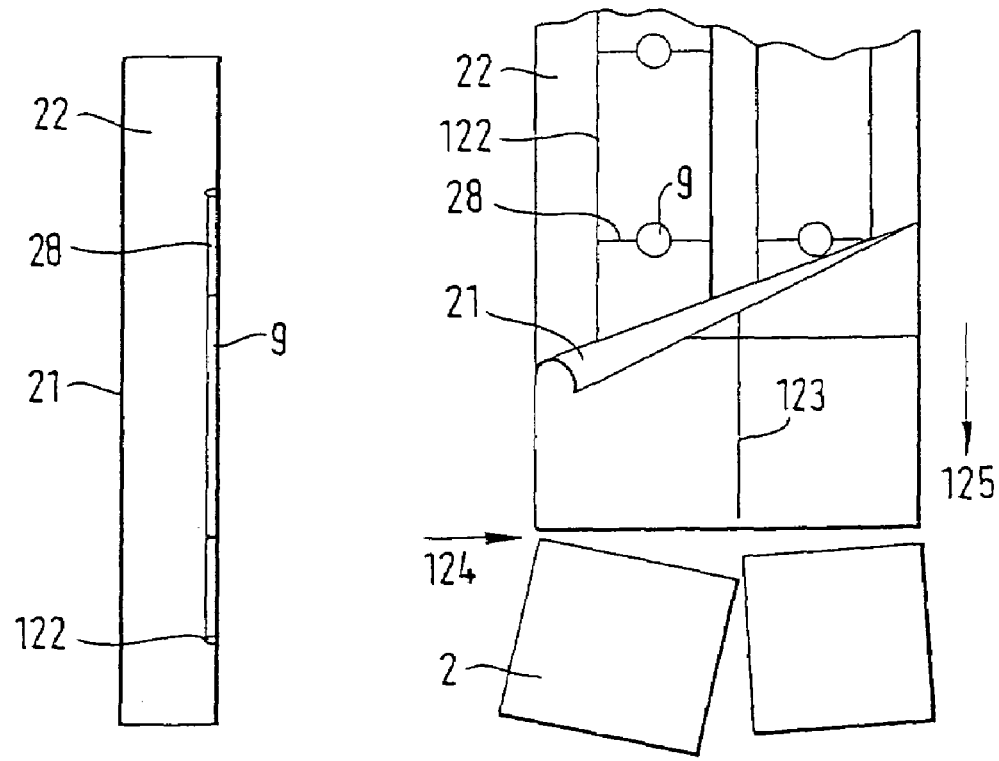
Figure 65:
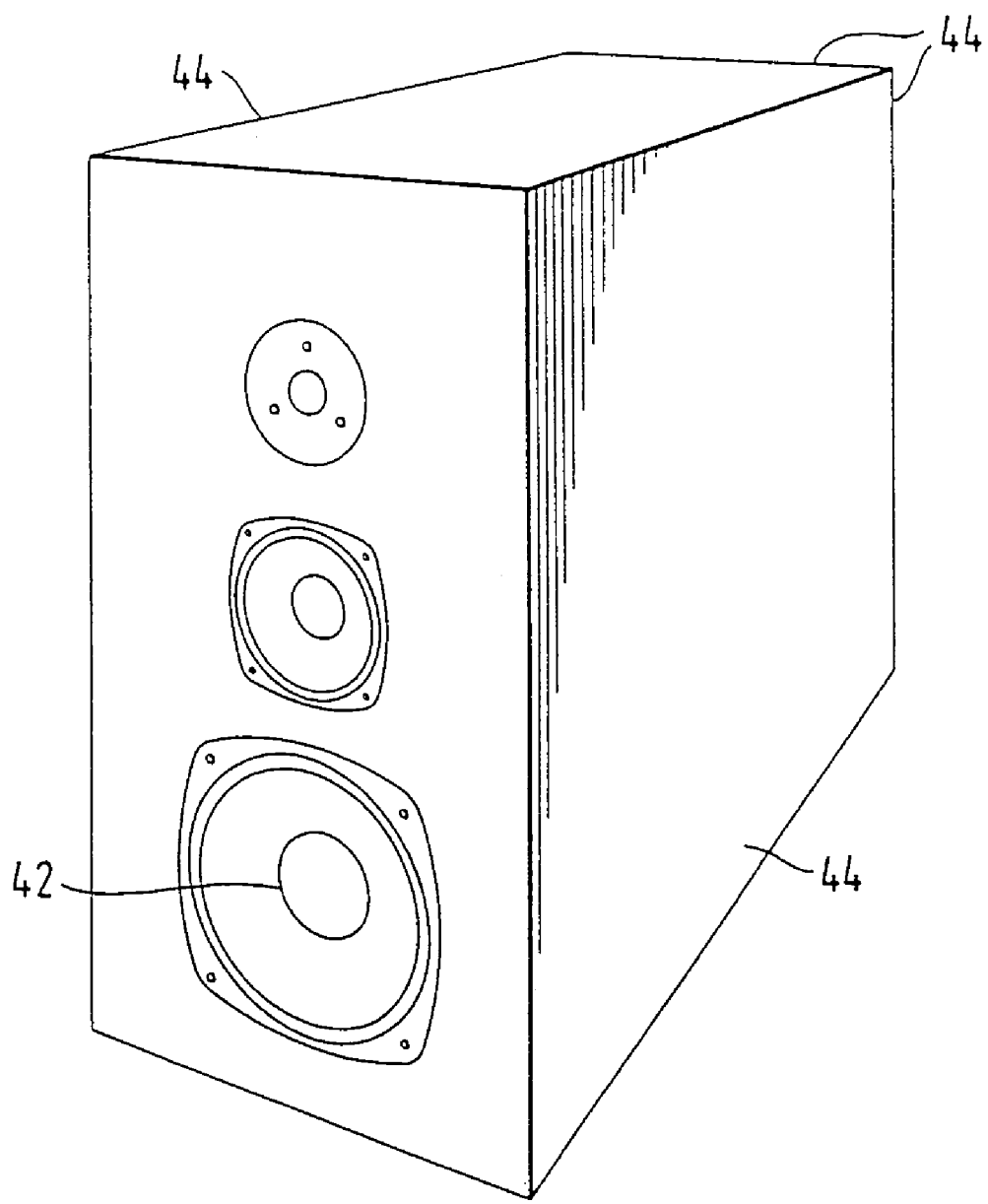
Figure 66A:
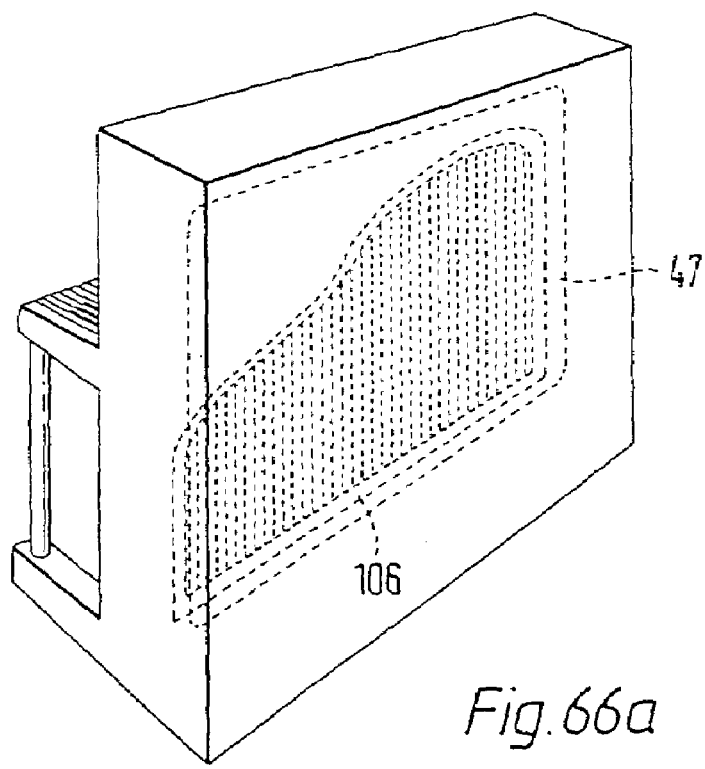

In the drawings:

FIG. 1 is an outline view of a distributed mode loudspeaker;

FIG. 2a is a partial section of FIG. 1 on the line A—A;

FIG. 2b is an enlarged cross-section through a distributed mode radiator of the kind shown in FIG. 2a and showing two alternative constructions;

FIG. 3a indicates preferred transducer location(s) for a substantially rectangular panel;

FIGS. 3b and 3c likewise for substantially true elliptical and super-elliptical panels;

FIG. 3d for a composite shaped panel;

FIG. 4 shows a distributed mode loudspeaker;

FIG. 5a is a perspective view of another distributed mode loudspeaker;

FIG. 5b is a partial cross-sectional view of the loudspeaker of FIG. 4a;

FIG. 6a is a perspective view of another distributed mode loudspeaker;

FIG. 6b is a partial cross-sectional view of the loudspeaker of FIG. 5a;

FIG. 7a is a front view of a distributed mode loudspeaker;

FIG. 7b is a side view of the distributed mode loudspeaker of FIG. 7a;

FIG. 7c is a rear view of the loudspeaker of FIG. 7a;

FIG. 8 shows a distributed mode loudspeaker;

FIG. 9 is a sectional side view of a first electromagnetic transducer;

FIG. 10 is a sectional side view of a second electromagnetic transducer;

FIG. 11a is a sectional side view of a third electromagnetic transducer;

FIG. 11b is a sectional side view of a fourth electromagnetic transducer;

FIG. 11c is a sectional side view of a fifth electromagnetic transducer;

FIG. 12 is a sectional side view of another electromagnetic transducer;

FIG. 13 shows a first piezoelectric transducer;

FIG. 14 shows a second piezoelectric transducer;

FIG. 15 shows a third piezoelectric transducer;

FIG. 16 shows a further electromagnetic transducer;

FIG. 17 shows another electromagnetic transducer;

FIG. 18 shows a distributed mode loudspeaker;

FIG. 19 shows application of drive/excitation signals;

FIGS. 20 and 21 show variations;

FIG. 22 is a diagram of an embodiment of distributed mode combination loudspeaker microphone;

FIG. 23 is an outline view of a distributed mode microphone;

FIG. 24 shows crystalline disc type piezoelectric transducer;

FIG. 25 is a perspective outline view of a room incorporating a suspended ceiling;

FIG. 26 is a cross-sectioned side view of a distributed mode loudspeaker in the form of a ceiling tile;

FIG. 27 is a perspective outline view of a visual display unit;

FIG. 28 is a partial cross-sectional view, through the loudspeaker of FIG. 27;

FIG. 29 is a perspective view of a laptop computer;

FIG. 30 is a partial cross-sectional view of a detail of FIG. 29;

FIG. 31 is a perspective view of a first portable compact disc player in a storage position;

FIG. 32 is a perspective view of the player of FIG. 31 in a use position;

FIG. 33 is a scrap view of part of the player of FIGS. 31 and 32;

FIG. 34 is a perspective view of a second embodiment of portable compact disc player;

FIG. 35 is a scrap view of part of the player of FIG. 34;

FIG. 36 is a perspective view of the passenger cabin of a vehicle;

FIG. 37 is a partial cross-sectional view of a detail of FIG. 36;

FIG. 38 is a perspective view of a prior art automobile door;

FIG. 39 is a perspective view of an automobile door;

FIG. 40 is a partial cross-sectional view of a detail from FIG. 6;

FIG. 41 is a perspective view of an automobile;

FIG. 42 is a partial cross-section view of a detail from FIG. 41;

FIG. 43 is a perspective diagram of a keyboard electronic instrument;

FIG. 44 is a plan view of the underside of the instrument of FIG. 3;

FIG. 45 is a partial cross-sectional view of the instrument of FIGS. 3 and 4;

FIG. 46 is a perspective view of a second musical instrument;

FIG. 47 is a perspective view of a vending machine;

FIG. 48 is a partial cross-sectional view of a detail of the vending machine of FIG. 3;

FIG. 49 is a perspective diagram of a modified form of vending machine;

FIG. 50 is a perspective diagram of a first noticeboard;

FIG. 51 is a perspective view of a second noticeboard;

FIG. 52 is a partial cross-sectional view of the noticeboards shown in FIGS. 50 and 51;

FIG. 53 is a perspective diagram of packaging;

FIG. 54 is an outline perspective view of a greetings card embodiment of this present invention;

FIG. 55 is a perspective outline view a projection screen;

FIG. 56 is a partial view of a detail of the screen of FIG. 55;

FIG. 57 is a plan view of a room incorporating the projection screen of FIG. 55;

FIG. 58 is a perspective view of a loudspeaker panel member with edge slotting;

FIGS. 59a,b,c,d are diagrams concerning circuits for input bandwidth control;

FIGS. 60a,b,c,d are diagrams concerning passive equalisation;

FIGS. 61a,b,c show curved diffusing and focussing panel loudspeakers hereof and their use in a room;

FIG. 62 is an outline plan view of a five channel home movie system room using some panel loudspeakers;

FIG. 63 is an outline inside view of a room with voicing by passive panels hereof;

FIG. 64 is a perspective view of a passive panel hereof as a mounting base for an audio unit;

FIG. 65 is a perspective view of passive panels hereof as an enclosure for a conventional loudspeaker;

FIGS. 66a,b are perspective and scrap section views of a piano with a passive panel hereof as a sounding board; and FIGS. 67a,b are outline plan and enlarged scrap sectional views for making loudspeakers hereof.

Throughout the drawings, to aid correlation and understanding, the same references are used for functionally similar parts, particularly for resonant panels (2), transducers (9), edge support frames (1) and intermediates (3), etc, indeed generally.

BEST MODES FOR CARRYING OUT THE INVENTION

Referring to FIG. 1 of the drawings, a panel-form loudspeaker (81) comprises a rectangular frame (1) carrying a resilient suspension (3) round its inner periphery which supports a distributed mode sound radiating panel (2) formed structurally and configured as variously developed above. A transducer (9), e.g. as described later with reference to FIGS. 9–17, is mounted wholly and exclusively on or in the panel (2) at a predetermined location defined by dimensions x and y. The latter are, of course the proportionate side length coordinates (from any corner) as indicated above. Conversion to being centre-related coordinates could be of general value, e.g. where corners of the panel member (2) are trimmed or cropped or finished short as made, see dashed (2d) and above regarding refinement of acoustic action/performance. Alternative, or combiningly and cooperatingly, effectively analogous such refinement by prescribing diagonal bending stiffness is also indicated diagrammatically, see arrows (V, W).

The transducer (9) serves to launch or excite bending waves in the panel to cause the panel to resonate and radiate an acoustic output; and is shown driven by a signal amplifier (10), e.g. an audio amplifier, connected to the transducer by lead conductors (28). Amplifier loading and power requirements can be similar to conventional cone type speakers, sensitivity being of the order of 86–88 dB/watt under room loaded conditions. Amplifier load impedance is largely resistive at 6 ohms, and power handling 20–80 watts. Where the panel core and/or skins are of metal, they may serve as a heat sink for the transducer, say to remove heat from a voice coil of the transducer, and thus improve power handling.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include such as used in picture framing, say of extruded metal (e.g. aluminium alloy) or plastics, etc. Suitable surround materials can meet desiderata above and include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight laminated sandwich-type panel having a core (22) e.g. of rigid plastics foam (97) or cellular matrix (98) such as a honeycomb matrix of metal foil, plastics or the like, with the cells extending transversely to the plane of the panel, and closed by opposed skins (21), e.g. of paper, card, plastics or metal foil or sheet.

Where the skins are of plastics, they may be reinforced with fibres e.g. of carbon, glass, Kevlar or the like in a manner known per se to improve their tensile properties. Envisaged skin layer materials and reinforcements thus include carbon, glass, Kevlar®, Nomex® or aramid etc, fibres in various lays and weaves, as well as paper, bonded paper laminates, melamine, and various synthetic plastics films of high modulus, such as Mylar®, Kaptan®, polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms reinforcing striations in the direction of injection, a preferred orientation for the good propagation of treble energy from the driving point to the panel perimeter.

It is convenient to advert further to above-mentioned prescription of bending stiffness that can be directionally differential parallel to pairs of sides of the panel (9), see other arrows (C, D), or at any angle(s), including from lay or weave or directed reinforcement, see arrows (E, F); and/or by plural superposed sub-layers with their directionality at appropriate relative angles, see arrows (G, H) shown symmetrically at 45 degrees, though they could be otherwise as to angle and symmetry. Core shear can also contribute, as it is often directionally different in available materials.

Additional moulding for plain or reinforced plastics, usually thermoplastics materials, would allow for mould tooling to carry location and registration features, such as grooves or rings for the accurate location of transducer parts, e.g. excitation coil and/or magnet suspension. Additionally, with some weaker core materials, it is can be advantageous to increase the skin thickness locally, e.g. up to 15% of the transducer diameter, to reinforce that area and beneficially couple bending wave vibration inducing energy into the panel. High frequency response can be improved for some foam materials by this means.

Envisaged core layer materials include fabricated honeycombs or corrugations of aluminium alloy sheet or foil, or Kevlar®, Nomex®, plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also using an alloy Aerogel or metal honeycomb core, will have substantial radio frequency screening properties which should be important in several EMC applications. Conventional panel or cone type speakers have no inherent EMC screening capability.

Much has been said in the extensive preamble to this specification concerning materials parameters in relation to sandwich structures, as to cores and skins. Moreover, progress in materials technology is very swift indeed these days. However, it must be useful to say a little more, based on materials available to us to date, about useful practical criteria we have developed in relation to requirements in relation to materials selection. Thus, we use the following guidelines:

(a) Cellular core has shear modulus of at least about 10 megapascals and adhered skin Young's modulus of at least about 1 gigapascal.
(b) For sizes of panel members below about 0.1 square meter, lowest bending wave frequencies above about 100 Hz, a bending stiffness that can be below about 10 Newton-meters, core shear modulus that can be as low as about 10 megapascals or less, and skins' Young's modulus in the range from about 0.5 to about 2.5 gigapascals.
(c) For sizes between about 0.1 and about 0.3 square meter, lowest bending wave frequencies as low as about 70 Hz, bending stiffness between about 5 and about 50 or more Newtonmeters, core shear modulus that is usually above 10 megapascals typically about 15 megapascals up to about 80 or more megapascals, and skins' Young's modulus of at least about 2 gigapascals up to about 70 or more gigapascals.
(d) For sizes between about 0.3 and about 1 square meters, lowest bending wave frequency as low as about 50 Hz, a bending stiffness usually above about 20 Newton-meters typically about 50 up to about 500 or more Newtonmeters, core shear modulus that is usually above about 10 typically about between about 20 and about 90 megapascals, and skins' Young's modulus of at least about 2 gigapascals feasibly up to at least about 70 gigapascals.
(e) For sizes over about 1 up to perhaps 5 square meters or more, a lowest bending wave frequency that can be as low as about 25 to 70 Hz, a bending stiffness above about 25 Newtonmeters, core shear modulus usually over 30 megapascals, and skins' Young's modulus of at least about 20 gigapascals ranging up to at least about 1,000 gigapascals.
(f) Generally, bending stiffness between minima of about 0.1 to about 1,000 and maxima of about 4 to about 3,500 Newton-meters, and mass per unit area between minima of about 0.05 to about 1.5 and maxima of about 1 and about 4 kilograms/square meter, depending on size/application.

These guidelines are given in good faith after extensive testing, calculation and investigation etc, but are not intended to be unduly limiting. Thus, we have succeeded in driving/exciting structures with bending stiffness as high as 7.5 Newton-meters, though not as efficiently as we would look for in purpose-designed loudspeakers. In principle, it is difficult to see any absolute upper limit, though necessary input power can get very high, and efficiency rather low; but, if such was acceptable, even preferred, say for matching existing structural and cladding materials, we could do so. Also, progress in materials technology seems certain to enable structures with combinations of properties that are beyond forecast; and our own knowledge cannot be truly comprehensive, having been gathered over quite a short time.

In addition, preferred forms of piezoelectric transducers and ferromagnetic electromagnetic transducers have negligible electromagnetic radiation or stray magnetic fields. Conventional speakers have a large magnetic field, up to 1 meter extent unless specific compensating counter-measures are taken.

Where it is important to have or maintain screening in any application, electrical connection can be made to the conductive parts of an appropriate DML panel or an electrically conductive foam or similar interface may be used for the edge mounting.

The suspension (3) may damp the edges of the panel (2) to prevent excessive edge movement of the panel without generally preventing desired edge vibration. Additionally or alternatively, further damping may be applied, e.g. as patches, bonded to the panel in selected positions, see dashed at 2P, to control particular frequency modes in damping excessive movement, and help distribute resonance more equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersable low frequency vibration modes of panels hereof. Edgewise fixing of damping means can usefully lead to a panel with its said sheet material fully framed, though at least their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at effective medial localised positions of said area.

An acoustic panel hereof is truly bi-directional. The sound energy from the back is not strongly phase-related to that from the front. Consequently there is the benefit of overall summation of acoustic power in the room, sound energy of uniform frequency distribution, reduced reflective and standing wave effects, and the advantage of good reproduction of the natural space and ambience in the reproduced sound recordings.

Whilst sound etc radiation from the acoustic panel is largely non-directional, the percentage of phase-related information increases off axis. For improved focus for so-called phantom stereo image, placement of the speakers like pictures, i.e. at the usual standing person height, confers the benefit of a moderate off-axis placement for a normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which is quite free of effects of the inverse square law for distance for an equivalent point source. Consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker. With conventional speakers, the ear tends to favour earliest arriving sounds, so care tends to be taken that neither loudspeaker channel is nearest.

Whilst acoustic panel members hereof will normally be sized including adjustment as to differential bending stiffnesses to make a match with resonantly outer operative area, that is not essential. Other measures, indicated dashed in FIGS. 2a and 2b, include cutting partially (22C) into the core (22) through one skin 21 or adding damping or stiffening material/members (22S) as inner framing at least partially about the intended operative area, thereby reducing some of preferential size for the panel member structure concerned.

Regarding FIG. 3, FIG. 3a shows preferential transducer locations for a substantially rectangular panel member as indicated above, for isometric aspect ratio of 1.34:1, namely at crossings 'x' of orthogonal coordinates taken from 3/7, 4/9 and 5/13 of lengths of sides from its corners, other corners being as illustrated for just one one quadrant. In other Figures, the six transducer locations for any corner on a reference are to be implied as represented either individually or collectively (but used individually within each "collection" relative to centering a transducer thereat).

FIG. 3b shows one preferential transducer location as indicated above for substantially true elliptical panel member of aspect ratio 1.182:1, i.e. at 0.43 and 0.20 of major and minor axes from centre, as developed from elliptical cylindrical coordinates using the equations:

$$x = h \cdot \cos h(u \cdot um) \cdot \cos(v) \quad y = h \cdot \sin h(u \cdot um) \cdot \sin(v)$$

where $h \equiv \sqrt{(a^2 - b^2)}$ $um \equiv q \cdot \tan h(a/b)$ having constant values for u (0 . . . 1) and v (0 . . . π/2) at (0.366, 0.239π)

FIGS. 3c and 3d likewise show substantially super-elliptical and part super-elliptical/part-elliptical panel shapes, each with the preferred transducer locations being as indicated above, but only shown in approximate outline.

Regarding FIGS. 4 to 6, FIG. 4 shows a first distributed mode panel-form loudspeaker (81) generally of the kind shown in FIGS. 1 and 2 and in which the frame (1) is replaced by a baffle-board (6), e.g. of medium density fibreboard, having a rectangular aperture (82) in which a distributed mode radiator panel (2) is mounted with the interposition of a resilient suspension (3). The baffle-board (6) can help with low frequencies and/or if very close to a wall. A transducer (9) as described for FIGS. 9–17 is mounted wholly and exclusively on the panel (2) to excite the panel to cause it to resonate to produce an acoustic output.

In FIG. 4, the loudspeaker comprises a shallow box-like enclosure (8) having a top (148), a bottom (149), opposed sides (150); a back (151) and a front (152). The front (152) of the enclosure (8) consists of a rigid lightweight distributed mode radiator panel (2) of the kind described with reference to FIGS. 1 and 2 and comprising a core (22) enclosed by opposed skins (21). The panel (2) is supported in the enclosure (8) by means of a surrounding compliant suspension (17), e.g. a strip of latex rubber.

A transducer (9), e.g. of the kinds described for FIGS. 9–17 is mounted wholly and exclusively on the inwardly directed face of the panel (2) in a predetermined location as discussed above, to excite bending wave vibration in the panel to cause it to resonate to produce an acoustic output. The enclosure (8) may be formed with ports (109) e.g. in one side (150), to enhance bass performance of the loudspeaker, including of some pistonic action allowed by compliance of panel mounting in the box.

FIG. 5 illustrates a further loudspeaker (81) generally similar to that described above with reference to FIG. 4. The loudspeaker comprises a box-like enclosure (8) consisting of a front box portion (52) adapted to be mounted on a wall and a separable rear box portion (110) adapted to be set into a wall, e.g. a stud-work wall to further reduce the already shallow apparent depth of the loudspeaker enclosure. The front face (51) of the front box consists of a rigid lightweight multi-mode radiator (2) comprising, as for FIG. 3, a core (22) enclosed by opposed skins (21). The panel (2) is supported in the enclosure (8) by means of a surrounding resilient suspension (17), e.g. of rubber latex strip. The loudspeaker is thus generally of the kind described with reference to FIGS. 1 and 2 above. A transducer (9), e.g. of the kind described for FIGS. 9–17 is mounted wholly and exclusively on the inwardly directed face of the panel (2) in a predetermined location as discussed above to excite and vibrate the panel in bending wave mode to cause it to resonate to produce an acoustic output.

Such loudspeakers are relatively simple to make and can be made to have a relatively shallow depth, or apparently shallow depth, in comparison to conventional loudspeakers; and have a wide angle of dispersion in comparison to conventional pistonic loudspeakers. Where the radiator panel is made from or is skinned with metal foil or sheet, the loudspeaker can be made to be shielded against radio-frequency emissions.

Accordingly, particular device aspects of this invention include a panel-form loudspeaker comprising a resonant multi-mode acoustic radiator, drive means mounted to the radiator to excite multi-mode resonance in the radiator, and a baffle surrounding and supporting the radiator: for which resilient suspension may be interposed between the radiator and the surround, typically an elastomeric material such as rubber, and may be sponge-like, e.g. foamed rubber; the baffle may be substantially planar or may be in the form of an enclosure, e.g. a box-like enclosure, and of any suitable rigid material, e.g. medium density fibreboard, including formed into an enclosure as of so-called 'infinite baffle' form and/or or ported; the transducer may be mounted wholly and exclusively on the radiator; the enclosure may comprise a rear box portion adapted to be buried in a wall or the like surface and a front box portion adapted to project from the wall or the like, and such two box portions may be physically separable and adapted to be connected together in desired fashion.

FIG. 7 shows a floor-mounted panel-form loudspeaker (81), i.e. as generally shown in FIGS. 1 and 2, as a lightweight rigid rectangular distributed mode sound radiating panel (2) mounted in or on a resilient surround (3) shown supported in a rectangular frame (1) on a floor stand (23) having a ground-engaging foot (83) and an upright stem (84) to four generally horizontal arms (85) connected at their distal ends (86) to the respective corners (87) of the frame (1). A balanced pair of transducers (9) of the kind shown in FIGS. 9–17 are mounted at one respective end on the panel (2) with their other ends also supported on lugs (88) on the stem (84) to drive the panel.

The pair of transducers (9) are located on the panel (2) at predetermined locations as above. This arrangement is intended to operate to drive the panel (2) pistonically at low frequencies by reacting against the stem (84) which along with the arms (85) acts as the chassis of a conventional loudspeaker drive unit, but launch/excite bending wave vibration the panel at other than low frequencies of pistonic action, i.e. to resonate for corresponding acoustic output. The suspension (3) will be compliant, i.e. like the roll surround of a conventional pistonic loudspeaker cone driver. Such panel-form loudspeakers are relatively simple to make, and flatness makes them relatively easy to house, and there is a wide angle of acoustic dispersion in comparison to conventional loudspeakers.

Accordingly, particular device aspects of this invention include a panel-form loudspeaker as a resonant distributed mode acoustic radiator having a periphery, a transducer mounted to the radiator to excite distributed mode resonance in the radiator, and a frame supporting the radiator, the transducer being coupled between the radiator and the frame to vibrate the panel to cause it to resonate to produce an acoustic output, wherein frame means supports the radiator at its periphery, preferably for additional pistonic acoustic action, conveniently with resilient suspension means couples between the frame and the radiator periphery; and/or the frame having a portion surrounding the radiator panel and/or the resilient suspension of elastomeric material. The transducer being adapted both to cause the radiator to resonate and to move the radiator pistonically is a particular inventive feature, as is the frame comprising a floor stand having a ground engaging portion, a substantially upright portion extending from the ground engaging portion and a plurality of arms extending from the upright portion, the distal ends of which arms carry the resilient suspension. The radiator can be any shape preferably held peripherally by the arms, conveniently with transducer(s) mounted on or adjacent to the upright portion of the frame.

FIG. 8 shows another way of combining pistonic and distributed mode resonant behaviour for a loudspeaker (81). Lightweight, rigid distributed mode sound radiator panel (2), as in FIGS. 1 and 2, forms a front wall of a box-like enclosure (8) having sides (135) and a rear wall (12), e.g. of medium density fibre-board, together defining a cavity (155). A panel (51) of acoustic absorption material is provided in the cavity (155). A panel (51) of acoustic absorption material is provided in the cavity to damp standing waves. The radiator panel (2) is mounted in the enclosure (8) by means of a compliant suspension (7) e.g. to emulate the roll surround of a conventional pistonic cone loudspeaker and carries a transducer (9) as in FIGS. 9–17 mounted wholly and exclusively on the panel (2) at a predetermined location as described above.

The interior cavity (155) of the enclosure (8) is coupled to a bass pump (11), that is to say to the interior of a box-like enclosure (185) containing a pistonic bass loudspeaker drive unit (42), by means of pipe-like conduit (90), whereby air pressure waves of acoustic frequency in the bass region are applied to the interior (155) of the enclosure to cause the panel (2) to move pistonically on its compliant suspension (7) to produce a low frequency acoustic output. In addition the panel is caused to resonate by the transducer (9) to cause the panel to radiate an acoustic output at higher frequencies. An amplifier (1) is arranged to feed an acoustic signal to the bass pump (11) and to the transducer (9) to drive the loudspeaker.

Accordingly, particular device aspects of this invention include a loudspeaker comprising an enclosure, an acoustic radiator in the enclosure, a compliant suspension mounting the radiator in the enclosure for limited pistonic movement relative thereto, and transducer means for driving the radiator, wherein the radiator is a panel-form distributed mode acoustic radiator, by a first transducer mounted wholly and exclusively on the radiator to vibrate the radiator to cause it to resonate, and by means for varying the air pressure in the enclosure to cause the radiator to move pistonically; where the air pressure varying means may comprise an air pump, say as a subsidiary enclosure, a pistonic driver mounted in the subsidiary enclosure and means coupling the interiors of the respective enclosures such that air pressure waves produced by motion of the pistonic driver are transmitted to the said enclosure; and acoustically absorbent means, e.g. wadding, may be provided in the said enclosure and/or in the subsidiary enclosure.

Regarding FIGS. 9–11, FIG. 9 shows moving coil transducer (9) arranged to be embedded entirely within interior of stiff lightweight distributed mode panel (2) comprising a core (22) faced on both sides with skins (21) to excite/launch bending waves in the panel. The transducer comprises a coil (13) embedded in a fixing (16), e.g. of epoxy resin, in a cavity (29) in the core (22) of the panel (2), and surrounding a cylindrical coil former (18), the coil (13) and former (18) thus being rigidly fixed in the panel (2). Mounted in the portion of the cavity (29) defined by the coil former (18) is a magnet assembly comprising an opposed pair of magnets (15) separated by a pole-forming member (14), the magnet assembly being mounted on the inner faces of skins (21) of the panel (2) by means of opposed compliant suspension members (19) of rubber-like material, e.g. foam rubber, which are adhesively bonded to the magnet assembly and to the interior surfaces of the respective skins (21) of the panel. The magnet assembly (14,15) is thus mounted concentrically of the coil (13) and is axially movable on its suspension (19). The transducer (9) operates to launch/excite bending waves in the panel (2) by vibrating to cause local resilient deformation of the panel due to relative axial motion between the magnet assembly and the coil. The drive/excitation effect is enhanced by increasing the mass of the magnet assembly. In operation, at least at high frequencies, since the mass of the magnet assembly is relatively large in comparison to that of the panel, the inertia of the magnet assembly will tend to hold the magnet assembly stationary and to vibrate the panel relatively thereto.

FIG. 10 shows a moving coil transducer (9) similar to that shown in FIG. 9 and arranged to be embedded entirely within the interior of a stiff lightweight distributed mode radiator panel (2) comprising a core (22) faced with skins (21) to launch bending waves into the panel. The transducer (9) is formed as a modular assembly to facilitate its assembly into a panel (2). As shown, the panel (2) is formed with a suitable cavity (120) to receive the transducer (9). The transducer comprises a coil (13) fixed to the interior wall of a cylindrical coil former (18) e.g. by means of a rigid adhesive potting (20), the former (18) providing the outer casing of the transducer and being closed at its opposite axial ends by lightweight end caps (119) which are rigidly fixed to the coil former in any desired fashion, e.g. by means of adhesive bonds (220). The assembly is arranged to be located in the transducer cavity (120) in a distributed mode panel (2), by movement in direction of arrow 'A' as indicated in. The transducer is fixed in the cavity by means of an adhesive. Mounted in the cavity (29) defined by the coil former (18) is a magnet assembly comprising an opposed pair of magnets (15) separated by a pole-forming member (14), the magnet assembly being mounted on the end caps (119) of the coil former (18) by means of opposed compliant suspension members (19) of rubber-like material, e.g. foam rubber, which are adhesively bonded to the magnet assembly and to the interior surfaces of the respective end caps. The magnet assembly (14, 15) is thus mounted concentrically of the coil (13) and is axially movable on its suspension (19). The transducer (9) operates to launch/excite bending waves in the panel (2) by vibrating to cause local resilient deformation of the panel in the same way as described above with reference to the embodiment of FIG. 9.

The transducer (9) of FIG. 10 is intended as a low profile device which can be buried substantially within the thickness of a distributed mode panel (2). The transducer comprises a cylindrical coil former (18) adapted to be fixed, e.g. by means of an adhesive, in a corresponding aperture (29) in the panel (2). A coil (13) is secured to the interior face of the former (18) e.g. with the aid of an adhesive. The opposed axial ends of the former (18) are closed by disc-like compliant suspension members (59), e.g. of rubber or the like, each of which is formed with an annular corrugation (136) near to its periphery to form a roll surround similar to that used on conventional pistonic cone loudspeaker drive units. The peripheries of the members (59) are secured to the axial ends of the coil former (18) e.g. by clamping, with the aid of an adhesive or in any suitable fashion. The centre portions of the members (59), which centre portions are defined by the annular corrugations (136) carry between them a magnet assembly comprising an opposed pair of magnets (15) sandwiching a pole piece (14). The outer faces of the magnets (15) are bonded or otherwise secured to the centre portions of the members (59), whereby the magnet assembly (14,15) is located concentrically with respect to the coil (13) and is capable of limited axial movement relative thereto. The magnet assembly is shielded by means of disc-like screens (121) mounted on annular resilient members (17) supported on the panel (2) to prevent or limit the stray magnet field surrounding the panel adjacent to the transducer.

The transducer arrangement (9) of FIG. 11a comprises complementary push/pull drivers disposed on opposite sides of the panel (2) to launch bending waves into a rigid lightweight distributed mode radiator (2) comprising a core (22) enclosed by opposed skins (21), to cause the panel to resonate. Coils (13) are rigidly fixed, e.g. by means of an adhesive, on the outside of a coil former (18) to form a voice coil assembly which is rigidly bonded to the opposed surface skin (21) of the radiator panel (2), e.g. by means of an epoxy adhesive bond (16). Magnets (15) are enclosed by pairs of poles (14), one of which is disc-like and is disposed with its periphery close to the interior of each coil former (18), and the other of which has a peripheral flange (162) arranged to surround the coil (13). A fixing member (93) which is generally cylindrical in shape is arranged to pass freely through an aperture (29) in the panel (2). The fixing member (93) comprises opposed generally complementary parts each formed with a head (95) which are clamped against the axial extremities of the respective pair of transducers (9) to couple the drivers together. The complementary parts of the fixing member (93) are secured together by complementary screw-threaded portions (160, 161). The fixing member may be of any suitable material e.g. plastics or metal. The transducer arrangement (9) of FIG. 11a is not rigidly clamped to the panel (2) adjacent to the aperture (29) but is instead coupled to the panel via resilient pads (17) e.g. of foam rubber positioned close to the panel aperture (29) in much the same manner as is shown with reference to FIGS. 3 and 3 whereby the transducer works to launch bending waves into the panel by inertial effects due to the combined mass of the respective drivers.

The transducer (9) of FIG. 11b is generally similar to that of FIG. 11a but is intended for attachment to only one side of a panel (2). Thus the magnet assembly (14,15) is secured to the surface of the panel (2) by means of a resilient suspension (17) e.g. of rubber, which is attached to the periphery of the flange (162) of the outer pole pieces (14). FIG. 11c shown a transducer (9) of the kind shown in FIG. 11b and intended for easy application to a panel surface. Thus the transducer (9) is mounted, by way of the former (18) and resilient suspension (17) on a thin substrate (147) formed with a self adhesive outer layer whereby the transducer can be mounted in position.

Accordingly, particular device aspects of this invention include an inertial vibration transducer comprising a voice coil assembly has a tubular member and a coil rigidly fixed to the tubular member, a magnet assembly disposed concentrically within the voice coil, and resilient means supporting the magnet assembly for axial movement relative to the voice coil, the voice coil being adapted to be rigidly mounted to a distributed mode radiator: where the resilient means may comprise opposed elastomeric members; the axial ends of the voice coil may be closed by caps; and the resilient means may be mounted on the caps; the coil may be mounted on the inner face of the tubular member to form the voice coil assembly and/or be adapted for reception in a correspondingly shaped cavity in the radiator; the caps may comprise the resilient means, say each comprise an annular compliant roll surround; and magnetic shields may be disposed over the caps to reduce stray magnetic fields. Further, the voice coil assembly may be adapted to be rigidly fixed to a face of the radiator and/or the magnet assembly may comprise opposed generally disc-like pole pieces, the periphery of one of which is disposed within and adjacent to the voice coil assembly, the periphery of the other of which pole pieces being formed with a flange arranged to lie adjacent to and to surround the voice coil assembly; and/or the resilient member may be sandwiched between one of the pole pieces and a face of the radiator and/or the transducer may comprise complementary magnet assemblies and voice coil assemblies on opposite faces of the radiator, and means tying the magnet assemblies together for push-pull operation. Another inventive aspect is a loudspeaker comprising an inertial transducer as indicated and/or described above, and a loudspeaker comprising a distributed mode acoustic radiator and the transducer being coupled to vibrate the radiator to cause it to resonate.

FIG. 13 shows a piezoelectric transducer (9) in which a crystalline disc-like piezo bender (27) is mounted at its centre on one end of a lightweight rigid cylindrical block (93) of rigid foam plastics which is rigidly fixed in an aperture (20) in a distributed mode radiator panel (2) e.g. by means of an adhesive, the said one end of the block (28) projecting from the face of the panel (2) so that the periphery (31) of the bender (27) is freely suspended adjacent to a face of the panel (2). An annular ring (25) of plastics, e.g. mineral loaded polyvinylchloride is rigidly fixed to the periphery of the piezo bender (27) to add mass to the free periphery of the piezo bender. Thus when the transducer is energized with an acoustic signal, the piezo bender (27) vibrates and due to its mass launches bending waves into the panel (2) to cause the panel to resonate and produce and radiate an acoustic output. The transducer (9) may be covered by a domed housing (26) which is fixed to the panel (2) to protect the transducer.

The piezoelectric transducer (9) of FIG. 14 has a disc-like piezo bender (27) fixedly mounted by its periphery (31) on the surface of a panel (2) e.g. with the aid of an adhesive, with the central portion of the bender (27) freely suspended over a cavity (29) in the panel (2) such that only the periphery (31) of the bender (27) is in contact with the panel. A mass (25) e.g. of plastics material is attached to the centre of the bender (27) with the interposition of a damping pad (30) of resilient material, e.g. of an elastic polymer. Thus an acoustic signal applied to the piezo bender will cause the bender to vibrate and thus to launch bending waves into the panel. The drive effect of the transducer is enhanced by loading the driver (27) with the mass (25) to increase its inertia.

The transducer arrangement (9) of FIG. 15 is similar to that of FIG. 14 except that in this embodiment a pair of piezo benders (27) are attached on opposite sides of a cavity (29) through a panel (2) to operate in push/pull mode. In this arrangement, the centres of both benders (27) are connected together by a common mass (25) with resilient damping pads (30) positioned between each bender (27) and the mass (25). Such transducers are relatively simply in construction and are effective in use.

Accordingly, particular device aspect of this invention includes an inertial vibration transducer having a plate-like piezoelectric bender and means adapted to mount the bender on a member to be vibrated, the arrangement being such that a substantial part of the bender is spaced from the member for movement relative thereto; where a mass may be secured to the said substantial part of the bender, which may be of crystalline form, say disc-like; the mounting means may be disposed centrally thereof; and the mass may be secured to the periphery of the bender. Alternatively the peripheral margin of the disc-like bender may be fixed to the member, and the mass may be secured to the centre of the bender. A resilient member may be employed to attach the mass to the bender; and benders as described may be attached to opposite sides of the member to be bending wave vibrated and coupled together by a common mass to operate in push/pull mode. From another inventive aspect, a loudspeaker has a distributed mode acoustic radiator with a transducer as described above coupled to vibrate/excite the radiator in bending wave mode.

Turning to FIGS. 16 and 17, FIG. 16 shows a transducer (9) for exciting/launching bending waves in rigid lightweight distributed mode radiator panel (2), as shown in FIGS. 1 and 2, comprising a core (22) enclosed by opposed skins (21), to cause the panel to resonate. The transducer comprises a coil (13) rigidly fixed, e.g. by means of an adhesive, on the outside of a coil former (18) which is rigidly bonded to a surface skin (21) of the radiator panel (2), e.g. by means of an epoxy adhesive bond (16). A magnet (15) is enclosed by a pair of poles (14), one of which is disc-like and is disposed with its periphery close to the interior of the coil former (18), and the other of which has a peripheral flange (90) arranged to surround the coil (13). The magnet assembly including the magnet (15) and poles (14) is mounted on the panel (2) by means of a fixing (93), e.g. of metal or hard plastics, which passes through a cavity (29) extending through the panel (2). The fixing (93) comprises a complementary pair of threaded members (91,92) each having heads (95), one of which heads bears against an outer face of the transducer (9) and the other of which heads bear against a face of the panel (2) on the side of the panel opposite to that on which the transducer is mounted. A spacer (127) is trapped between the transducer (9) and the panel (2) to spruce the transducer from the panel. This transducer (9) operates by locally resiliently bending the panel between the fixing (93) and the former (18) when an acoustic signal is applied to the transducer to launch/excite bending waves in the panel to cause it to resonate.

The transducer arrangement (9) of FIG. 17 is similar to that described in FIG. 16, except that the transducer comprises complementary push/pull drivers of the kind shown in FIG. 16 disposed on opposite sides of the panel. A fixing member (93) is arranged to pass through an aperture (29) in the panel (2) to tie the two transducers together and to the panel. The fixing member (93) comprises opposed generally complementary parts each formed with a head (95) which are clamped against the axial extremities of the respective pair of transducers (9) to couple the drivers together. The complementary parts of the fixing member (93) are secured together by complementary screw-threaded portions (94, 96). The fixing member may be of any suitable material e.g. plastics or metal. In this case, the transducer device (9) is rigidly clamped to the panel (2) by means of rigid pads (19), e.g. of hard plastics, positioned between the panel and the poles (14) adjacent to the aperture (29), whereby the transducer works to launch bending waves into the panel by local resilient bending of the panel between the pads and the coil former (18).

Accordingly, particular device aspects of this invention include a vibration transducer to vibrate a member, such as inducing bending wave action in a said member hereof, having a face, wherein a voice coil assembly has a coil rigidly fixed to a tubular member, the assembly being adapted to be fixed to the said face of the member, and by a magnet assembly comprising opposed disc-like pole pieces, the periphery of one of which pole pieces is arranged to be disposed with and adjacent to the voice coil assembly, and the periphery of the other of which pole pieces is formed with a surrounding flange adapted to surround and to be disposed adjacent to the voice coil assembly; and wherein the magnet assembly is adapted to be secured at its centre to the said member to be vibrated; and/or the transducer may comprise fixing means to secure the magnet assembly to the member, and/or the fixing means may comprise a fastener adapted to engage in a cavity in the member, and/or the fastener may comprise a spacer for spacing the peripheries of the pole pieces from the said member; and/or the vibration transducer may comprise complementary voice coil assemblies and magnet assemblies adapted for mounting on opposed faces of the said member, and means tying the centres of the magnet assemblies together for push/pull operation, say by a fastener having heads at opposite ends and adapted to engage the respective magnet assemblies, such fastener preferably comprising a pair of interengaging screw-threaded portions, and having spacer means adapted for disposition adjacent to the fastener and adapted for sandwiching between the respective magnet assemblies and the opposed faces of the said member. Another inventive aspect arises from a loudspeaker of distributed mode acoustic radiator type hereof having a transducer as described above coupled to vibrate the radiator to cause it to resonate.

Regarding FIGS. 18 to 21, FIG. 18 shows a panel-form loudspeaker (81) generally similar to that of FIGS. 1 and 2 and in which the distributed mode panel (2) is formed with a generally rectangular aperture (82) within its boundaries in which is mounted a second distributed mode sound radiating panel (4) with a resilient suspension (3) interposed between the respective panels. The panel (4) is constructed in the same manner as the panel (2), e.g. with a central core (22) separating skins (21). The panel (4) is driven by its own transducer (9) mounted wholly and exclusively on or in the panel (4) at a predetermined location to produce a high frequency acoustic output, while the panel (2) is driven by a separate transducer (9) to produce an acoustic output of lower frequency, so that the loudspeaker can readily encompass the whole acoustic spectrum.

FIG. 19 illustrates how a distributed mode panel (2) hereof, or example of the kind shown in FIGS. 1 and 2, can be driven to resonate by a pair (70,71) of transducers (9). The smaller one of the transducers (70) is a high frequency piezoelectric transducer, e.g. of the kind shown in FIG. 24; and the larger one of the transducers (71) is of the electrodynamic kind, e.g. as shown in FIGS. 9–17.

The transducers (70,71) are driven by an amplifier (10) coupled in parallel to the respective transducers with the interposition of a step-up transformer (72) and matching resistance (73) in the line to the piezo transducer in view of its relatively high voltage requirement. FIG. 20 illustrates how a distributed mode panel (2) hereof, e.g. of the kind shown in FIGS. 1 and 2, can be driven by a pair (70,74) of transducers (9), the transducer (70) being a high frequency piezoelectric transducer e.g. of the kind shown in FIG. 24 and the transducer (74) being a low frequency piezoelectric transducer of the kind shown in FIGS. 13–15. Reference (75) indicates that the transducer (74) is weighted with a mass to increase its inertia. The transducers (70,74) are driven by an amplifier (10) to which they are connected in parallel, with resistors (78) interposed to provide a frequency dividing network.

FIG. 21 illustrates how a distributed mode panel (2) hereof, e.g. of the kind shown in FIGS. 1 and 2, can be driven by a pair (68,69) of electrodynamic transducers, e.g. of the kinds shown in FIGS. 9–17. The transducer (68) is intended as a high frequency driver and is thus of low inductance, whereas the transducer (69) is intended as a low frequency driver and is of high inductance. The transducers (68,69) are driven in parallel by an amplifier (10) with a capacitor (77) in the line to the transducer (68) to act as a frequency divider to pass most of the high frequency signal to the transducer (68).

Particular inventive device aspects include a panel-form loudspeaker having a distributed mode acoustic radiator and a first transducer coupled to the radiator to excite distributed mode resonance in the radiator, and having a second transducer coupled to vibrate the radiator; where the first and second transducers may be adapted to operate in different frequency ranges; where one of the transducers may be of electromagnetic type and/or one of the transducers be of piezoelectric type; the panel-form loudspeaker may have a second distributed mode acoustic radiator mounted on or in the first said radiator, and resilient suspension coupling between the first and second radiators, the first transducer being mounted wholly and exclusively on the first radiator and the second transducer being wholly and exclusively mounted on the second radiator and/or the second radiator mounted in an aperture in the first radiator.

FIG. 22 shows a distributed mode panel (2) hereof, say as for FIGS. 1 and 2, intended for use both as a loudspeaker and as a sound receiver or microphone, e.g. for use in an interactive environment. Although not shown in FIG. 22, the panel (2) is mounted in a surrounding frame (1) and is attached to the frame via a resilient suspension (3) in the manner shown in FIGS. 1 and 2. The frame is suspended on a pair of wires (33), e.g. from a ceiling or on a floor standing frame (not shown). The panel is driven to resonate and produce an acoustic output by a transducer (9) which in turn is connected to and driven by an amplifier (10).

The panel also carries a pair of vibration sensing transducers (63), which may be piezoelectric benders as illustrated earlier, and are coupled in parallel to drive a signal receiver and conditioner (65) connected to an output (66). Another vibration transducer (63) on the panel (2), e.g. as earlier discussed, is coupled to drive a filter/correlator the output from which is fed to the signal receiver and conditioner (65), to provide signal correction. Such simple loudspeaker/microphone has wide scope for industrial application, e.g. for use in an interactive environment.

Accordingly, a particular device aspect of this invention arises as a panel-form loudspeaker having a distributed mode acoustic radiator and a transducer coupled to vibrate the radiator to cause it to resonate, wherein a second transducer is coupled to the radiator to produce a signal in response to resonance of the radiator due to incident acoustic energy; preferably with the distributed mode acoustic radiator mounted in a surrounding frame by means of an interposed resilient suspension, and/or having at least two said second transducers at spaced locations on the radiator, and/or having a further transducer and means for comparing the signal generated by the or each said second transducer with that of those generated by the said second transducer(s), for which suitable comparison means may comprise a signal receiver and conditioner and signal output means.

Regarding microphones, particularly in introduction to FIG. 23, a distributed mode panel member generally as above and described for FIGS. 1 and 2 is a good receiver of sound which appears as acoustic vibration over the panel. A preferably lightweight panel structure aids sensitivity, and the vibration may be sensed by one and preferably more simple bending transducers, e.g. of piezoelectric type as described earlier. A plurality of transducers and transducer placement positions optimises the quality of coupling from the distributed panel vibrations to the desired electrical output signal. Placement should be in position(s) of high modal density, preferably variantly for each of plural transducers, inboard of the panel, while the panel itself should have the preferential actual or equivalent geometry for good modal distribution.

Sound energy incident on the panel is converted into free mode bending wave vibration, which may be sensed by optical or electrodynamic vibration transducers, and the result is a microphone. For non-critical applications a single sensor is effective, placed at a single preferred or optimum transducer location. For higher quality, the non-reciprocal nature of the free air/bending wave in panel member transduction principle concerned here needs to be taken into account. Two pertinent factors arise; firstly, providing some frequency-dependent equalisation to reach a flat frequency response; and secondly, looking to capture a broader, preferably as broad as possible, sampling of the complex vibrations of the acoustic panel. At least three transducers is preferred, and they can be inexpensive piezoelectric benders with their outputs connected in parallel. Alternatively, larger area polymer piezoelectric films may be applied, say with suitable geometric pickup patterning to define the vibration integration areas for the required optimisation of sensitivity versus frequency response.

For microphone applications it is advantageous for the panel to be light, preferably as light as feasible, to provide best available match between the radiation impedance of the air and consequent bending wave vibration in the panel. Higher or highest sensitivity is achieved with lower or lowest mass per unit volume of panels. For a single transducer, calculations for the theoretical model indicates an optimal arrangement including at least one sensing transducer location at a panel corner since all vibrational modes are 'voiced' at the corners (though not well driven/excited for a loudspeaker device hereof).

FIG. 23 illustrates a distributed mode panel (2) as a said member hereof, generally as for FIGS. 1 and 2, as intended for use as a sound receiver or microphone will be mounted in a surrounding frame (1) and attached to the frame via a resilient suspension (3) omitted in FIG. 23, but see FIGS. 1 and 2. The frame is suspended on a pair of wires (33), e.g. from a ceiling or a floor-standing frame (not shown). The panel is shown carrying an array of four vibration transducers (63) spaced over the panel and which may be piezoelectric transducers of the kind shown in FIG. 24 below which are coupled in parallel to drive a signal receiver and conditioner (65) connected to an output (66). Full-line transducer locations are diagrammatic, and actual locations can correspond, as to centering of the transducer, with different combinations of the above indicated 3/7, 4/9, 5/13 corner-related, side-length proportion coordinates, which, as noted in FIG. 3, are topographically very close together, especially for 3/7 and 4/9, and shown collectively as single outlines, perhaps even being reasonably considered as effectively a single "sweet spot" for a small panel member hereof, though accurate centering according to those coordinates is especially effective for loudspeaker embodiments as noted above.

FIG. 24 shows a transducer (9) for a distributed mode panel (2) in crystalline disc-like piezoelectric bender form (27) mounted on a disc (118), e.g. of brass, which is bonded to a face of the panel (2), e.g. by an adhesive bond (20). In operation an acoustic signal applied to the transducer (9) via leads (28) will cause the piezo disc (27) to bend and thus locally resiliently deform the panel (2) to launch bending waves into the panel.

Particular device aspects of this invention include a panel-form microphone comprising a distributed mode acoustic member and at least one transducer each coupled wholly and exclusively to the member to produce a signal in response to resonance of the member due to incident acoustic energy; the member preferably being mounted in a surrounding frame by means of an interposed resilient support, and/or there being at least two said transducers at spaced locations on the member, and/or a further transducer on the member to produce a signal in response to resonance of the member due to incident acoustic energy, and/or means for comparing the signal generated by the said further transducer with that of those generated by the said transducer(s). Suitable comparison means may comprise a signal receiver and conditioner and signal output means, the distributed mode acoustic member may be a stiff lightweight panel having a cellular core sandwiched between skins, and the or each transducer may be a piezoelectric device.

FIGS. 25 and 26 show a ceiling tile (36) of the kind adapted to be supported in a grid-like suspended frame (99) to form a suspended ceiling, but which is formed as a loudspeaker (81), generally of the kind shown in FIGS. 1 and 2, that is to say comprising a stiff, lightweight multi-mode resonating panel (2) having a core (22) enclosed by skins (21) on both sides. The panel (2) is mounted at its periphery on a resilient suspension (3) of foam rubber which is supported on the frame (99). The suspension (3) may be attached to either the panel (2) or to the frame (99) by means of an adhesive, but the connection may be by gravity alone. The panel (2) carries a transducer (9), e.g. of the kind shown in FIGS. 7 to 12, to launch bending waves into the panel to cause it to resonate to produce an acoustic output.

In a preferred example of good quality, the panel (2) is made as an expanded polystyrene foam core of typically 100 g/m3 density, 8 mm thick, skinned with hardened aluminium alloy skins of 0.1 mm. A soft foam or felt strip, some 3 mm thick is fixed to the perimeter to provide a partially compliant mounting when placed in the ceiling frames and also helps to suppress any possible vibration in ceiling framing sections.

A preferred form of excitations is a unitary moving coil inertial transducer with a 25 mm or 38 mm voice coil, 6 ohms impedance, 40 watt power handling, with the coil bonded directly to the panel surface. A compact cup type magnet system enclosed and self sealing may also be bonded directly to the panel via a resilient decoupling ring chosen for its vibro-mechanical properties and dimensional stability.

Depending on application, a low cost form ceiling tile can be made with a plastics foam cored paper faced board material, which may have a light alloy foil layer for fire retardancy, driven by low cost piezo vibration exciters. Reduced maximum sound levels are obtained, still more than sufficient for personnel announcements, voice-overs and background music distribution. The wide area coverage is maintained.

When metallic or carbon conductive skins or cores are employed the speaker may be earth bonded or grounded to maintain EMC screening of an installed structure.

Accordingly, a particular device aspect of this invention arises as a ceiling tile for a suspended ceiling and incorporating a loudspeaker, the tile being in the form of a distributed mode acoustic radiator, and a transducer being mounted wholly and exclusively on the radiator to vibrate the radiator to cause it to resonate, preferably with a resilient suspension the periphery of the radiator and by which the radiator is supported in the suspended ceiling, and/or the radiator being a stiff lightweight panel comprising a cellular core sandwiched by high modulus skins.

The essence of the aforesaid partial cutting/inner framing feature could be applied analogously to such as polystyrene foam ceiling tiles, say as rearward ribbing defining desired operative area within which preferential transducer location can be applied.

Such a ceiling tile loudspeaker does not require a frame, chassis, or acoustic baffle. The entire speaker panel is unitary and may be placed in position just like a passive decorative ceiling tile. The acoustic panel is relatively lightweight, reducing ceiling loadings and aiding installation. It may readily be made fire resistant. It can be decorated, painted or papered to render it invisible in a ceiling installation without significant acoustic impairment. Minor damage does not impair the performance as compared with diaphragm—of cone-type speakers which are very fragile. Also important is the great advantage in sound distribution given by the acoustic panel speaker. Its combination of high intelligibility and wide angle coverage means that in a typical large area installation superior acoustic performance may be achieved with around half the number of conventional installed loudspeakers, with a great saving in installed cost.

FIG. 27 shows a visual display unit (137), e.g. a computer monitor or the like, having a screen (37) formed in any desired fashion, e.g. as a cathode ray tube or as a liquid crystal display. The unit (137) comprises a box-like housing (101) having opposed sides (102) each of which is formed to incorporate a multi-mode acoustic radiator (2) generally similar to that described above with reference to FIGS. 1 and 2 to form loudspeaker (81).

The housing (101) is moulded from plastics and the opposed sides (102) are moulded with generally rectangular relatively thin rectangular areas, in comparison to the general thickness of the housing, bounded by grooves (100) to define the radiators (2). These areas (2) are stiffened on their inner faces with a lightweight core (22) which is backed by an inner skin (21) to form a rigid lightweight multi-mode radiator panel (2) of the kind described above e.g. with reference to FIGS. 1 and 2. The grooves effectively define a resilient suspension (3) of the kind shown in FIGS. 1 and 2 and the surrounding housing (101) forms the frame (1). A transducer (9) is, in accordance with teachings hereof, attached to each panel (2) to launch/excite bending waves into the panels to cause them to resonate to produce an acoustic output.

Particular device aspects of this invention include a visual display unit comprising a display screen and a housing in which the display screen is mounted, wherein the housing carries a loudspeaker comprising a distributed mode acoustic radiator and transducer means mounted wholly and exclusively on the radiator to vibrate the radiator to cause it to resonate, preferably with the radiator being integral with the housing, e.g. an external wall thereof, and/or the radiator comprising a stiff lightweight panel having a cellular core sandwiched by skin layers, one of which skin layers can be integral with the housing, and/or said one skin layer being thinner than the average wall thickness of the housing, and/or the external wall of the housing being formed with a groove which surrounds the radiator and which can further usefully afford a resilient suspension in coupling the loudspeaker to the housing.

FIGS. 29 and 30 show a laptop personal computer (128) having a keyboard (137) and a member (130) incorporating a visual display screen (129) and which member is provided with an opposed pair of loudspeakers (39,40) attached to the visual display member (130) to adapt the computer for multi-media applications and the like. The loudspeakers (39,40) are formed as thin rectangular panels hereof which as indicated at (39) and by arrow 'A' may be slid from the position of use indicated in the drawing into a storage position in the member (130) through a slot (82). Alternatively, as indicated at (40) and by arrow 'B' the loudspeaker panel may be folded about hinges (34) from the position of use indicated in the drawing to a storage position in which the panel (40) overlies the screen member (130).

Each of the loudspeakers (39,40) hereof is formed as a lightweight multi-mode acoustic radiator of the kind described above with reference to FIGS. 1 and 2. Thus each loudspeaker (39,40) comprises a stiff lightweight panel (2) having a cellular core (22) skinned on both sides with surface sheets (21), the panel (2) being supported at its periphery on a resilient suspension (3) of an elastomeric material which in turn is supported in a lightweight surrounding frame (1), e.g. of plastics. A transducer (9) is mounted on each panel (39,40) at a predetermined position as discussed above to launch/excite bending waves in the panel (2) to produce an acoustic output. The transducer (9) may be as illustrated herein. A decorative lightweight cover (not shown) may be positioned over the panel (2) surround (3) and frame (1) to obscure the loudspeaker.

Particular device aspects of this invention include a laptop computer comprising a combined keyboard and display screen, characterised by an opposed pair of loudspeakers attached to the computer, and in that each loudspeaker comprises a distributed mode acoustic radiator having a transducer wholly and exclusively mounted thereon to vibrate the radiator to cause it to resonate. The loudspeakers may be mounted to the display screen. The loudspeakers may be hinged on the display screen.

The display screen may comprise a housing and the loudspeakers may each be housed in a slot in the display screen housing for sliding movement between a stored position, in which the loudspeakers are substantially wholly housed in the slot, and a use position in which the loudspeakers are positioned on opposite sides of the display screen.

Each radiator may comprise a stiff lightweight panel having a cellular core sandwiched by opposed high modulus skin layers, and the panel may be supported in a surrounding frame by means of a resilient suspension.

FIGS. 31 to 35 show a portable personal compact disc player (41) of the kind having a body (85) formed with a slot (82) through which discs are loaded into, and removed from the player and control buttons (137) by which the player is operated. The player (41) is provided with an opposed pair of loudspeakers (81) in the form of thin panel-form members (40) hinged to opposite sides of the player (41) to sandwich the player. The loudspeakers (40) are sized to be coextensive with the player and are arranged to be hinged from the closed position shown in FIG. 31 to the extended position shown in FIG. 4 as indicated by arrow 'C'. In the extended position, the body (85) of the player (41) tends to act as a central baffle separating the loudspeakers (40) to improve channel separation.

Each of the panel-form loudspeakers (40) is a distributed mode acoustic radiator hereof, generally and/or as in FIGS. 1 and 2. Thus each loudspeaker comprises a rigid lightweight panel (2) formed from a cellular core (22) enclosed by skin layers (21), the panel being mounted in a surrounding resilient suspension (3), e.g. of foam rubber, which in turn is mounted in a lightweight rectangular frame (1) e.g. of plastics. A transducer (9), e.g. of the kind described with reference to FIG. 24 is mounted on each panel (2) to launch/excite bending waves in the panel to cause the panel to resonate and produce an acoustic output. The transducers (9) are positioned on the respective panels (2) in predetermined locations as set out above.

FIGS. 34 and 35 illustrate a portable compact disc player (41) of the kind comprising a body (85) carrying a turntable (86), operating buttons (137) and a lid (139) hinged as shown by arrow 'D' to close over the turntable. The player (41) is provided with an opposed pair of loudspeakers (81) in the form of thin panel-form members which as shown at (40) may be hinged to the sides of the lid (139) to be movable as indicated by arrow 'E' from a closed position (not shown) to the extended position shown. Alternatively as shown at (39) the panel-form loudspeakers (81) may be housed in a slot (not shown) in the lid (139) and slid as indicated by arrow 'F' between extended and retracted positions. Each of the panel-form loudspeakers (39, 40) is a distributed mode acoustic radiator hereof. Thus each loudspeaker comprises a rigid lightweight panel (2) formed from a cellular core (22) enclosed by skin layers (21), the panel being mounted in a surrounding resilient suspension (3), e.g. of foam rubber, which in turn is mounted in a lightweight rectangular frame (1) e.g. of plastics. A transducer (9), e.g. of the kind described with reference to FIG. 24 is mounted on each panel (2) to launch/excite bending waves in the panel to cause the panel to resonate and produce an acoustic output. The transducer (9) are positioned on the respective panels (2) in accordance with teaching hereof Particular device aspects of this invention include a portable compact disc player having an opposed pair of panel-form loudspeakers attached to the player, each loudspeaker being of distributed mode acoustic radiator type hereof having a transducer mounted wholly and exclusively thereon to vibrate the radiator to cause it to resonate. The portable compact disc player may comprise a body portion having a turntable and a lid adapted to close over the turntable, the loudspeakers being mounted on the lid, say hinged on/to the lid. Alternatively, the loudspeakers may each be housed in a slot in the lid for sliding movement between a stored position, in which the loudspeakers are substantially wholly housed in the slot, and a use position in which the loudspeakers are positioned on opposite sides of the lid.

In FIGS. 36 and 37, a cabin (102) of a passenger vehicle, e.g. an aircraft, railway carriage, motor coach or ferry, has rows of passenger seats (103) into the backs (203) of which are incorporated loudspeakers (81). As is conventional the seat backs (203) are shells moulded from a suitable plastics material. As shown more particularly in FIG. 37, the moulded backs (203) of the seats (103) are moulded with generally rectangular relatively thin areas (2) bounded by grooves (100). These areas (2) are stiffened on their inner faces with a lightweight cellular core (22) which is backed by an inner skin (21) to form a rigid lightweight multi-mode radiator panel (2) of the kind to which this invention generally and FIGS. 1 and 2 particularly relate. The grooves (100) effectively define a resilient suspension (3) and the surrounding seat backs (203) form the frame (1). A transducer (9), e.g. of the kind described in detail herein, is attached to each panel (2) to launch or excite bending waves in the panels to cause them to resonate to produce an acoustic output.

FIG. 38 illustrates a conventional domestic automobile door (140) in which a conventional cone-type pistonic loudspeaker drive unit (42) is mounted in a pocket (141) in a moulded or pressed door lining (104). The normal consequence of this is that the sound radiated by the drive unit (42) is directed towards the feet of the occupant(s) of the automobile, matters being made worse by directional characteristics of conventional loudspeaker drivers.

In FIG. 39 an automobile door (140) has a door lining (104) having a pocket (141) incorporating a loudspeaker (81) hereof. As usual, the door lining (104) is moulded or pressed from plastics or fibreboard. The lining is formed with a generally rectangular thin area (2) bounded by a groove (100). The area (2) is stiffened on its inner face with a lightweight cellular core (22) which is backed by an inner skin (21) to form a rigid lightweight multi-mode radiator panel (2) of the kind described above with reference to FIGS. 1 and 2. The groove effectively defines a resilient suspension (3) and the surrounding lining (104) forms the frame (1). A transducer (9) e.g. of the kind described in detail for FIG. 24, is attached to the panel (2) to launch/excite bending waves in the panel to cause it to resonate to produce an acoustic output. The wide dispersion of sound produced by a loudspeaker hereof will provide an improved sound field for the occupants of the vehicle, with much reduced local 'hot' spots.

FIGS. 41 and 42 show an automobile (106) with loudspeakers (81) in a parcel shelf (105) towards the rear of the automobile. It will be noted that the parcel shelf is divided longitudinally by means of a structural rib (43) into two areas to produce a stereo pair of loudspeakers (81). Otherwise, the configuration of the loudspeakers is as shown in FIGS. 39 and 40.

Accordingly, a particular device aspect of this invention arises as a vehicle having a passenger compartment with a loudspeaker of distributed mode acoustic radiator type hereof with a transducer mounted wholly and exclusively on the radiator to vibrate/excite the radiator and cause it to resonate. The radiator may be integral with a passenger seat in the vehicle or with a door into the passenger compartment. The radiator may be integral with the interior of the passenger compartment. The vehicle may comprise a plastics moulded component in or forming part of the passenger compartment, and the radiator may be integral with the component. The radiator may comprise a stiff lightweight panel having cellular core sandwiched between skin layers, and wherein one of the skins is integral with the moulded component. The said one skin may be thin in comparison to the average wall thickness of the component. The said one skin may be surrounded by a groove in the component, the groove defining a resilient surround for the radiator. In another aspect, a vehicle component comprises a loudspeaker having a distributed mode acoustic radiator and a transducer mounted wholly and exclusively on the radiator to vibrate the radiator to cause it to resonate.

FIGS. 43, 44 and 45 illustrate an electronic keyboard musical instrument (137), e.g. a piano, comprising a body (138) supported on ground engaging legs (139). The body (138) is formed with a keyboard (140) by which the instrument is played. In conventional fashion the instrument is provided with a signal generator connected to the keys and with a signal amplifier driving a loudspeaker, which is a distributed mode acoustic radiator (81) hereof, see FIGS. 1 and 2, incorporating a stiff lightweight rectangular panel (2) mounted by its periphery in a frame (1) with an interposed resilient suspension (3) and driven by a transducer (9), all as described above with reference to FIGS. 1 and 2. As shown, the loudspeaker (81) forms the base of the body (138). FIG. 46 illustrates an electronic keyboard musical instrument, (137) quite similar to that of FIGS. 43 to 45 having a body (138) having a keyboard (140). The body is supported on front legs (141) and is provided with a panel-form loudspeaker (81) as a back support of the instrument.

The loudspeaker (81) comprises a rigid lightweight distributed mode acoustic radiator panel (2) mounted by its periphery in a surrounding resilient suspension (3) e.g. of foam rubber, the suspension being supported in a baffle-like frame (6), e.g. of medium density fibreboard. A transducer (9), is attached to the panel (2) to launch bending waves into the panel to cause the panel to resonate to produce an acoustic output. The arrangement is thus of the kind shown in FIGS. 1 and 2. The transducer (9) will be driven by an amplifier (not shown) which is connected to receive signals produced by depression of the keys of the keyboard, in generally conventional fashion.

Particular device aspects of this invention include an electronic musical instrument having a keyboard, with a loudspeaker comprising a distributed mode acoustic radiator and a transducer mounted wholly and exclusively on the radiator to vibrate the radiator to cause it to resonate, the radiator being generally as herein, e.g. as a stiff lightweight panel having a cellular core sandwiched by a pair of high modulus skins, a frame surrounding the panel and a resilient suspension supporting the panel on the frame. The electrical musical instrument may have legs supporting the instrument above the ground and the radiator may be provided at the base of the instrument. The loudspeaker may be positioned with the radiator substantially vertical. The loudspeaker may form a ground support for the instrument.

FIG. 47 illustrates a vending machine (108), e.g. a drinks dispenser incorporating a loudspeaker (81) whereby the loudspeaker forms part of the front face (109) of the vending machine. The loudspeaker (81) is arranged to provide audio information as to the dispensable contents of the machine and/or the manner it is to be operated. The front (109) of the machine carries the normal coin or the like freed mechanism (143), product selector panel (137) and dispenser outlet (142). The loudspeaker (81) comprises a rectangular lightweight rigid distributed mode radiator panel (2) comprising a cellular core (22) having skin layers (21) on both faces, the panel being supported around its periphery on a resilient suspension (3), e.g. of foam rubber. The suspension is mounted in a rectangular frame (1) mounted in the front face (109) of the machine (108). Thus the loudspeaker is of the kind described in FIGS. 1 and 2. Visual information, e.g. in the form of graphics and text, may be applied to the panel (2) as desired. The panel (2) carries a transducer (9) hereof to excite bending wave vibration as resonation to produce an acoustic output. The machine will incorporate the required signal generator to produce the necessary messages and amplifier means (not shown) for driving the transducer (9). If desired the device can be made to be proactive by arranging that the distributed mode panel (2) is capable of use both as a loudspeaker and as a sound receiver or microphone, as shown in FIG. 49.

The panel is shown driven into excitation a piezoelectric transducer (9) as shown in FIG. 24, which in turn is connected to and driven by an amplifier (10). The panel also carries a pair of vibration transducers (63) which also be piezoelectric much as in the same FIG. 24 which are coupled in parallel to drive a signal receiver and conditioner (65) connected to an output (66). Another vibration transducer (63) on the panel (2), e.g. of the kind shown in FIG. 6 is coupled to drive a filter/correlator the output from which is fed to the signal receiver/conditioner (65), to provide signal correction. At least one of the transducers is configured such that verbal instructions can be given to the vending machine.

Particular device aspects of this invention include a vending machines incorporating active acoustic devices hereof, e.g. in the form of loudspeakers for the purpose of providing information concerning the manner of operation of the machine or its contents, wherein a vending machine may comprise a store of articles or product to be dispensed, user-operated means for selecting the article or product to be dispensed, means, e.g. a coin freed mechanism authorising dispensing, its loudspeaker hereof allowing voice communication, conveniently along with a visual display panel afforded by the radiator, say as a stiff lightweight panel having a cellular core sandwiched between a pair of skins, the panel being surrounded by a frame and mounted in the frame by means of a resilient suspension. Such vending machine may comprise a body and the frame may be attached to or formed by the body; and may have a second transducer coupled to the radiator to produce a signal in response to resonance of the radiator due to incident acoustic energy. Preferably, at least two said second transducers are provided, at spaced locations on the radiator. A further transducer may be provided on the radiator to produce a signal in response to resonance of the radiator to due to incident acoustic energy, and means may be provided for comparing/conditioning the signal generated by the said further transducer with that of those generated by the said second transducer(s).

As introduction to FIGS. 50 to 52, the acoustic panel technology of FIGS. 1 and 2 and generally hereof can be applied to the design of normal board material commonly used for notices and display advertising, the normal processing of these boards e.g. lamination, screen printing or spray painting, being unhindered. The board itself may thus be specified, dimensioned and electrodynamically driven to operate as a wide coverage acoustic radiating panel a flat loudspeaker. As such, a moderate audience of up to 10 persons for a small 0.56 m square meter panel or 30–50 persons for a 0.7 to 1.2 square meter size may be served at natural volume levels with highly articulate reproduction of speech and also background music or relevant sound effects, as required. Due to the naturally dispersed acoustic radiation properties of the panel, the distorting effects of local boundary reflections are minimised. A substantial physical obstruction of a proportion of the acoustic panel does not significantly impair the sound distribution.

Lower levels of sound and of electrical input power are required for a given level of articulation/intelligibility. In a preferred form the acoustic panel comprises a low cost structure of paper honeycomb or foam core 3 to 6 mm thick bonded to reinforcing paper, plastic film or plastic film coated paper skins of 0.08 to 0.3 mm thickness. The preferred drive for an inexpensive design using a flat surface or even embedded transducer, is piezoelectric, operated in bending or mass loaded, vibration coupled forms. These transducers have a naturally rising acoustic output with frequency which is predictably and optimally adjusted to a flat response by a combination of series resistive drive to the capacitance load of the transducer, and also by mass loading of the piezo element (for a given mass the acceleration is inversely proportional to frequency) and via the detailed specification of the mechanical properties of the board. By control of the fibrous loss factor in the skins, the viscoelastic properties of the adhesive bonding the skin to core, and the piezo element to the skin by applied surface laminates, including the backing for the displayed image or text, and the bulk properties of the core in shear and compression, the desired frequency response may be achieved.

Where higher sound levels and larger panels are concerned, alloy or part alloy skins will provide good energy coverage over the panel, with a proportionally lower loss factor which appropriately matched to a higher power moving coil type of transducer. The latter has a flat region of frequency response. Where a flat, uninterrupted surface is required on both sides of the panel, the transducer may be of the embedded type concealed within. If magnetic screening is required for the latter, thin 0.5 mm mild steel foils may be included under the skin surface over the transducer area. A small gain in efficiency will also result due to improved flux linkage.

Small, low cost examples of the noticeboard will not require specific framing or specified damping. If of the desk or counter top form, sufficient damping is provided by the simple contact of the lower edge of the acoustic panel with the surface it is placed on. The device would have a photo frame type of back rest, effective even if fabricated in light card. Certain classes of stiff foamed plastic, e.g. unplasticised PVC, have appropriate bulk properties either self skinning or unskinned, to operate within the acoustic panel theory range. These can be used directly as acoustic panels of this type without additional stiffening skins.

FIGS. 50 to 52 illustrate a noticeboard, advertising display board or the like (48) incorporating loudspeaker technology hereof, and as shown in FIGS. 1 and 2. Thus, a loudspeaker (81) incorporating a rigid lightweight distributed mode acoustic radiator panel (2) of the kind shown in FIGS. 1 and 2 has graphic information, e.g. text and/or pictures of any desired kind printed on the panel (2). The graphic information can then be supplemented by an audio message via the loudspeaker to reinforce the message.

As shown in FIG. 50 the loudspeaker/display board (48) is mounted on a stand (23) in the form of an easel. Alternatively the loudspeaker/display board may be suspended on wire (33) as shown in FIG. 51. Alternatively the noticeboard may be supported in any other desired manner. As shown in FIG. 52, the frame (1) may incorporate a return lip (41) to conceal the resilient suspension (3) which is attached between the rear face thereof and the peripheral margin of the panel (2). A suitable transducer is as shown in FIG. 24, i.e. of piezoelectric bender-on-disc type.

Particular device aspects of this invention include visual display apparatus comprising a notice or the like board in the form of a distributed mode acoustic radiator having a transducer mounted wholly and exclusively thereon to vibrate the radiator to cause it to resonate, thus be a loudspeaker which can be used to reinforce the visual information displayed thereon: where the radiator may comprise a stiff lightweight panel having a cellular core sandwiched between skin layers, a surrounding frame and a resilient suspension mounting the panel in the frame; the frame may have a return lip concealing the suspension; the skins may be of or may comprise paper and the core may comprise paper honeycomb; and the transducer may be a piezo electric bender.

FIG. 53 illustrates packaging incorporating the loudspeaker technology hereof. The packaging is shown in the form of a box (111) having a hinged lid (139), the box, or at least part of it being made from a composite comprising a core of foamed plastics sandwiched between sheets of Kraft board to form a panel as shown in FIG. 2, such that the box comprises a rigid, lightweight distributed mode acoustic radiator as described with reference to FIGS. 1 and 2. The rear panel (140) of the box is shown used to form a distributed mode radiator loudspeaker (81), although any one of the panels making up the sides of the box would be appropriate if suitably constructed. An alternative placement for the transducer (9) is shown in dotted lines.

A piezoelectric transducer (9) can be as shown in more detail in FIG. 24, and is illustrated attached to the inner face of the rear panel (140) of the box and is driven by a sound generator/amplifier/battery unit (112) also mounted on the rear panel. The unit (112) is controlled by a switch formed integrally with a hinge (53) by which the lid (139) is secured to the box, whereby the sound generator is activated when the lid is lifted. In this arrangement the edge termination of the panel (2) is formed by the corners of the box so that no additional frame (1) or suspension (3) of the kind shown in FIGS. 1 and 2 is required. It will be appreciated that the packaging need not be of the shape shown in the drawing, and could, for example, be shaped according to the requirements of the contents. Thus the packaging might be shaped to enclose a compact disc or the like and may be arranged to preview the contents of the compact disc or to provide other information relating thereto.

Particular device aspects of this invention include packaging comprising a board component comprising a distributed mode acoustic radiator having a transducer mounted wholly and exclusively on the radiator to vibrate the radiator to cause it to resonate; where the board may be a panel having a cellular core sandwiched between skin layers, typically a core of foamed plastics sandwiched between sheets of Kraft board; the transducer may be a piezoelectric bender, and the board may form one side of a box, which may have a lid; and means may be associated with the lid for triggering actuation of the transducer on movement of the lid relative to the box. The packaging may further comprise a signal generator, an amplifier and an electric battery.

FIG. 54 shows a greetings or similar card (44) incorporating loudspeaker technology hereof. The card is in the form of a folded member having a front leaf (145) and a rear leaf (146). At least the rear leaf (146) is made from a composite board consisting of a core (22) of foam plastics sandwiched by skins of Kraft board (21) to form a rigid lightweight distributed mode acoustic radiator panel (2) of the kind described in FIGS. 1 and 2. Such composite boards are known under the trade name KAPPABOARD. It has been found that a panel shaped according to the European standard 'A' series is suitable. A transducer (9) as shown in FIG. 24 is attached to the rear leaf (146) to vibrate the panel (2) to cause it to resonate to produce an acoustic output. The transducer (9) is driven by a signal generator/amplifier/battery unit (112) which is actuated by a switch (53) concealed in the fold of the card so as to activate the signal generator when the card is opened.

It will be noted that in this arrangement, no frame (1) or surround (3) is required. Sufficient damping of the card is provided either by the material from which the card is constructed and/or by holding the card or standing it on a surface.

Particular device aspects of this invention include a greetings or the like card having or comprising a board forming at least part of the card, the board being a distributed mode acoustic radiator having a transducer, preferably of piezoelectric bender type say a crystalline disc, mounted wholly and exclusively on the radiator to vibrate the radiator to cause it to resonate, the board preferably being a panel having a cellular core sandwiched between skin layers, say a core of foamed plastics sandwiched between sheets of Kraft board. Such board may form a leaf of the card, which may have a pair of leaves, preferably with associated means for triggering actuation of the radiator on movement of one leaf relative to the other leaf; and a greetings or the like card may comprise a signal generator, an amplifier and an electric battery on a leaf of the card.

FIG. 55 shows a multi-media audio-visual system comprising a moving picture projector (31) arranged to project an image onto a projection screen formed by a loudspeaker panel (32) of the kind shown in FIGS. 1 and 2. The latter (32) comprises a panel (2) having aluminium or carbon fibre reinforced skins (21) sandwiching a honeycomb core (22) of aluminium foil. The composite may be secured together using any epoxy adhesive. For a screen panel size of 1.22×1.38 m, the thickness of the aluminium skins may be 300 microns. The core thickness may be 11 mm and the cell size of honeycomb may be 9.5 mm. Such a panel is stiff, of low density, high modulus and is substantially isotropic as to bending stiffness.

A pair of smaller subsidiary loudspeakers (114) of the kind described in FIGS. 1 and 2 are hinged on opposite sides of the centre channel loudspeaker panel (32) by means of hinges (34) whereby the subsidiary panels can be hinged against the primary panel (32) when not in use and can be moved into the position as illustrated for use. The subsidiary panels (114) are arranged to receive and radiate respective left and right hand channel information, e.g. for stereo operation. The subsidiary loudspeakers (114) may comprise panels (2) having skins (21) of aluminium foil, or carbon fibre or glass fibre reinforced plastics. A decorative film, e.g. of Melanex, may be applied over one or both of the skins. The core (22) of the panels (114) may be of aluminium foil, e.g. in a honeycomb cell arrangement, or may be of paper cells. Where paper is employed it may be impregnated with a plastics material such as a phenolic compound to improve the stiffness of the paper. The cell size may be in the range 3 to 6 mm and the core thickness may be of the order of 3 to 10 mm. Where the skins are of aluminium foil they may be 25 to 100 microns in thickness. An epoxy adhesive may be used to assemble the panel.

Stereo, i.e. two-channel sound reproduction, involves the creation of sound stage illusion containing the properties of source location, perspective and the ambience of the original recording. Stereo with conventional speakers is strong on aspects of phantom source location and in some cases perspective, but is weaker in respect of the expression of natural space and ambience. This is because the near point source nature of conventional pistonic speakers makes it easy aurally to identify their physical location, which in conflict with the desire for overall stereo image localisation.

It is often said that as reproducing devices the loudspeakers should disappear into the sound stage illusion. Part of the problem lies in the relatively narrow forward radiating directivity of conventional speakers. Additionally, the sound balance to the sides and rear of the enclosure, sound which strongly drives the reverberant sound field in the room, is coloured and unbalanced with significant variations in frequency response. This detracts from the sense of natural acoustic space and ambience.

The embodiment of FIG. 55 employs a pair of acoustic panel speakers for left and right channels which are set in complex vibration over the whole surface over a wide frequency range typically 100 Hz to 20 kHz. The central/primary loudspeaker panel (32) is shown suspended on suspension means (33) but alternatively the panel may be supported e.g. on a floor stand.

FIG. 57 shows how the projection apparatus may be arranged in a room (145) equipped with seating (146). The apparatus has a projector (31) projecting an image onto the screen (32) and also includes a pair of subwoofers (35), which may be of conventional construction, at the sides of the room to improve bass audio extension and a pair of rear effect loudspeakers (117) i.e. so-called ambience speakers, at the rear of the room. Suitably the rear speakers (117) are also of the kind shown in FIGS. 1 and 2 in view of their wide and even sound dispersion characteristics. The rear effect loudspeakers may be of the same construction as the subsidiary loudspeakers (114).

A distributed mode panel loudspeaker hereof can have remarkable non-directional properties. For acoustic reproduction of ambience channels of a sound system, the energy must be widely distributed, ideally from non-directional sources. It is important that the sound source is not well localised otherwise the perception of a large ambient space, the simulated acoustic region behind the listener, is unsatisfactory.

Hitherto conventional directional and/or small source speakers, generally moving coil types, have been used for ambience reproduction. Due to the intensity phenomenon of aural perception, audience members seated closer to a nearby ambience speaker find their perception strongly localised on that speaker greatly impairing the ambience effect and their whole appreciation of the multichannel sound field. The localisation may be so powerful that aural attention is drawn away from the primary front stage sound channels.

An ambience reproducing system built with one or more loudspeakers according to the teachings hereof deliver a large sound field or near uniform intensity which has deliberately poor localisation. A large audience may be handled, even with some persons in close proximity (as near as 0.5 m) to the panel loudspeakers without any significant localisation of the immediate reproducing channel and with the vital property of an unimpaired aural perception of the important front channels. Greatly improved realism is achieved for the multi-channel sound reproducing system as a whole as a result of the desirable radiating characteristics of the acoustic panel sound reproducer. The ambience loudspeakers may if desired be suspended on wires and disguised, by the application of a suitable image to the panel (2) to resemble pictures.

FIG. 56 shows how the frames (1) of the projection/loudspeaker panel may be formed with a return lip (36) whereby the suspension (3) can be concealed. The frames of the subsidiary loudspeakers (114) and the ambience loudspeakers (117) may be similarly formed.

Particular device aspects of this invention include a projection screen comprising a panel having a light reflective surface, wherein the screen is a distributed mode acoustic radiator having a transducer mounted wholly and exclusively thereon to vibrate the radiator to cause it to resonate; the radiator preferably comprising a stiff lightweight panel having a cellular core sandwiched between a pair of high modulus skins, a surrounding frame, and a resilient suspension mounting the panel in the frame, the cellular core preferably being of honeycomb aluminium foil, and the skins preferably being of fibre-reinforced plastics: and/or as the projection screen comprising panel-form loudspeakers attached to opposite sides thereof to provide left and right hand channel information, say left and right hand loudspeakers being hinged on the radiator to be foldable against the radiator for storage, preferably themselves as distributed mode acoustic radiators each having a transducer mounted wholly and exclusively thereon to vibrate the radiator to cause it to resonate: and/or as audio visual apparatus characterised by a projection screen as aforesaid and/or the audio-visual apparatus comprising at least one rear channel loudspeaker in the form of a distributed mode acoustic radiator having a transducer mounted wholly and exclusively thereon to vibrate the radiator to cause it to resonate.

Such an acoustic panel built to sufficient size to serve as a projection screen for still, film and video images, is thus simultaneously a sound reproducer, with advantage as the centre or dialogue channel of home theatre equipment, and an acoustic panels hereof having good size, say over 0.6 m wide, and providing very good sound coverage for audiences. Working demonstrations have shown high intelligibility and sound clarity over the whole audience region with a major advantage that persons nearest to the screen do not suffer blasting from excessive proximate sound levels, invariably a flaw of conventional direct radiating cone based speakers.

Moreover, another inventive aspect of a projection screen hereof arises in relation to conventional centre channel speakers and the ear's readiest tendency for locating the acoustic centre of a cone/diaphragm loudspeaker, so that all sounds appear to come from such concentrated small source, thus detracting from the sense of realism; whereas, for an acoustic panel hereof, its uniquely non-directional radiation property means that the sound appears to come from the general acoustic region of the screen but not from one isolated point, so that, when the image is accompanied with sound on the panel, there is a powerful synaesthetic effect, in that lack of specific sound source localisation allows the ear/brain sound-sensing combination freely to associate an imagined, virtual and undefined/approximate location for sound sources sensorally to appear to be synchronised and/or registering with locations presented by the visual image on the acoustic surface, e.g. mentally relating voices quite closely and accurately to mouths and faces. With well recorded dialogue sections, not only does a virtual or perceived acoustic image appear to track the actual visual image, but can also serve to convey the information needed for the perception to depth/perspective, so that the quality of audience involvement in the cinematic experience is substantially enhanced.

Slotting (38) for edges of resonant mode panel members hereof, see FIG. 58, can also be useful in dealing with improving uniformity of bending wave action, and/or generally for controlling particular frequencies by affecting relevant resonant modes.

In relation to any desired further correction, or composition of desired frequency-related response, perhaps particularly at low or high frequency ends of operating range, say if coincidence frequency is included either at such end or medially, electronic input signal processing for a loudspeaker hereof can be provided.

Figure 59C:
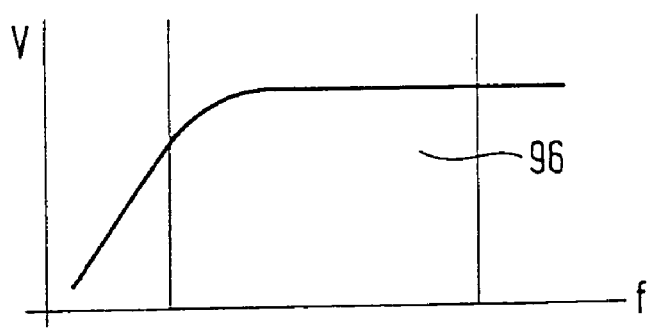
Figure 59D:
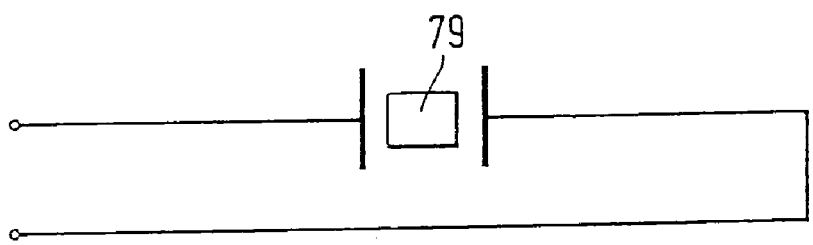

FIG. 59 shows simple input signal bandwidth control through capacitor (77) and resister capacitor (78,77) amplifier (10) circuits (FIGS. 59a, 59b) for piezoelectric transducers (9, FIG. 59a; 79, FIG. 59d) including assessing to a required range response (96, FIG. 59c).

Figure 60B:
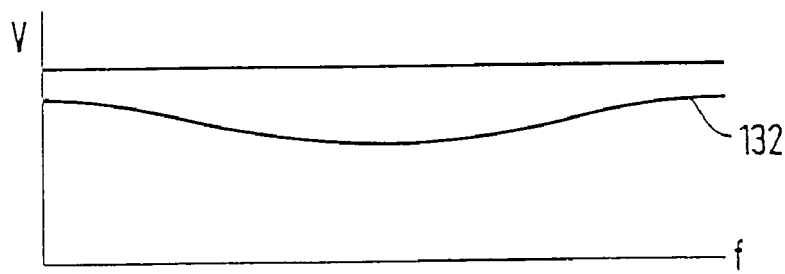
Figure 60C:
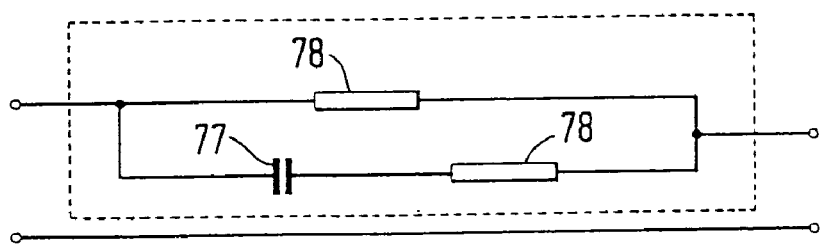
Figure 60D:
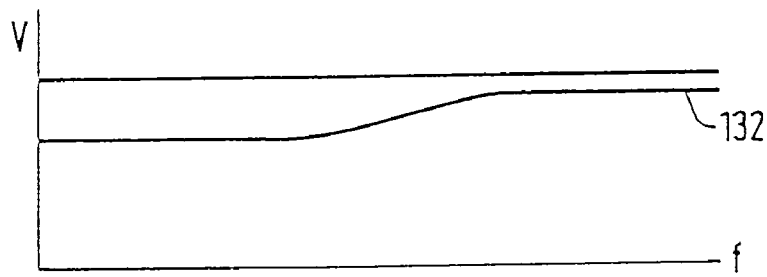

Further sample passive equalizer circuitry (compared with normal core-type cross-over networks) is indicated in FIG. 60a (using amplifier 10 with parallel LCR network 113, 77, 78) and FIG. 60c (parallel resistor-capacitor circuit (78, 77)) relative to particular frequency response requirements (FIGS. 60b, 60d) perhaps of particular relevance to dealing with included coincidence frequency effects.

Figure 61B:
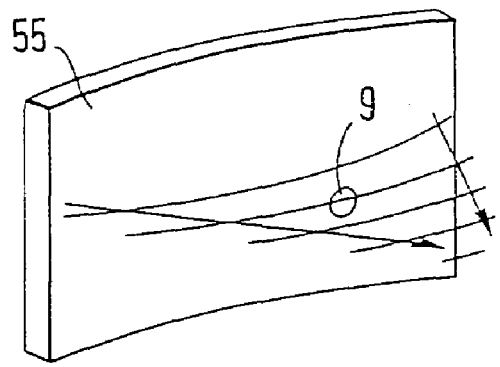
Figure 61C:
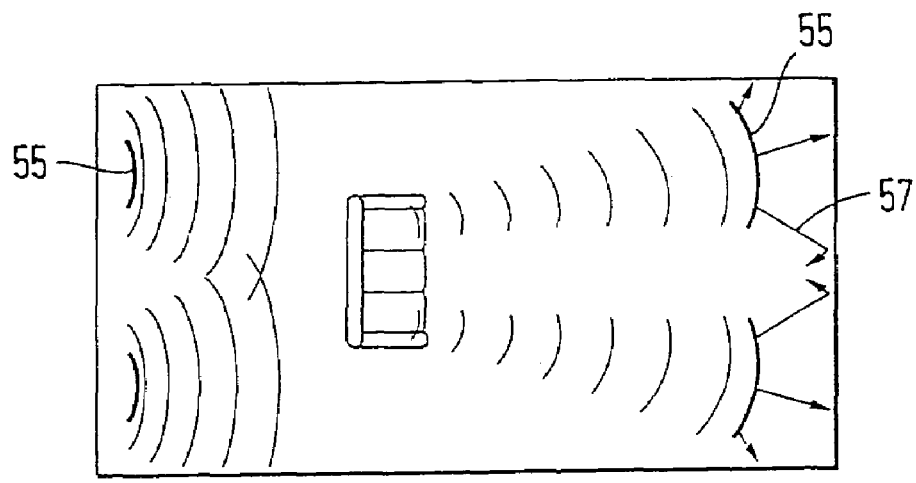

Areal curving of resonant panel members hereof has been mentioned in relation to affecting bending stiffness in the dimension of the panel member concerned. However, there can be other desiderata or requirements for curved loudspeakers, or microphones, or passive reverberation, filtering or voicing panels, say unobtrusively to fit to curved surfaces, such as columns. FIG. 61 indicates use of curved resonant panel loudspeakers (55), or as repeaters or satellites, that demonstrate diffusion (FIG. 61a), focussing (FIG. 61b) and application in a listening room involving forward focussing loudspeakers, typically for defining stereo with diffusion (57) behind them, and rearward diffusing loudspeakers, typically for improving ambience.

As to full five channel home theatre ambience systems, such as achievable using resonant panel loudspeaker hereof, including the screen (118) itself as the centre channel and any desired sub-woofers (35). However, particular merit is seen in systems where perhaps only rearward ambience loudspeakers are of resonant panel type, see 117 or FIG. 62, perhaps because conventional core-type forward stereo loudspeakers (42) are, for some reason, actually preferred.

Figure 66B:
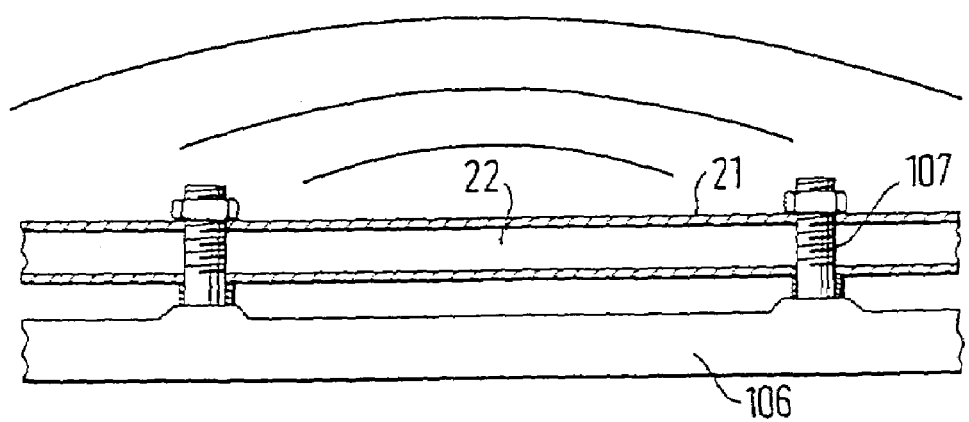

Turning to use of panel members hereof purely as passive acoustic devices, FIG. 63 shows voicing for a small theatre or dance studio; and FIG. 64 shows use in mounting such as a Hi-Fi unit (46), say as a base (44) shown on pads or feet (45). FIG. 65 shows use as structural panels (44) of an enclosure for conventional core-type (42) loudspeaker units, and can be highly successful as to giving minimum colouration and/or even correcting room or other colouration if "varied" appropriately. FIGS. 66a and 66b show a panel (22) used as an upright piano sounding board (47) mounting backing onto its stringed frame 108, with fixing by studs 107 that can have a clamping or only a just retaining action, it being the case that holes through panels hereof need not be deleterious if in appropriate calculable positions, even can be beneficial in relation to specified modal frequencies. It would be feasible to so mount with good location, but no unwanted effects on vibrational performance.

FIG. 67 concerns manufacture from the point where stock sheet for the cores (22), which is in a size from which several panel members (2) can result, has at least one skin applied (lower in FIG. 67b); and the other skin (21) is applied (upper in FIG. 67a) over as much as desired up to the whole of the core sheet after the transducers (9) are installed, conveniently along with printed wiring track (122) and transducer lead wiring (28), advantageously connected up for reeling out, before the upper of the skins (21), and fixing into shallow indenting of the core stock material. Movement shown by arrow 125 allows guillotining (124) at one desired panel dimension (length) and the other (width) can be set by width of the stock core material or by splitting as shown and leading to highly effective mass production. The panel member dimensions (length/width) are, of course, as readily determined in practising methods hereof, including for other than rectangular shapes to be finished from rectangular precursors that correspond with relevant aspect ratio determined as herein.

INDUSTRIAL APPLICABILITY

Embodiments of this invention have the same and more uses and applications than the ubiquitous conventional cone-type loudspeakers.

The invention claimed is:

1. A loudspeaker comprising a panel-form member capable of sustaining bending waves and having locations for at least one transducer to couple to plural low frequency modes, and at least one transducer mounted to the member at one of the locations to vibrate the member to cause the member to resonate to form an acoustic radiator which provides an acoustic output when resonating.

2. A loudspeaker according to claim 1, wherein the transducer is coupled to the member at an asymmetric off-centre position away from corners of the member.

3. A loudspeaker according to claim 2, wherein the member is substantially rectangular, and the transducer is located at a position corresponding to about 3/7, 4/9 or 5/13 of the lengths of sides of the member used as coordinates from a corner of the member.

4. A loudspeaker according to claim 3, wherein the member comprises a stiff lightweight panel having a cellular core sandwiched by opposed skin layers.

5. A loudspeaker according to claim 1, wherein the member is supported in a surround.

6. A loudspeaker according to claim 5, wherein the surround forms a baffle.

7. A loudspeaker according to claim 6, wherein the baffle forms an enclosure.

8. A loudspeaker according to claim 7, comprising a resilient suspension interposed between the surround and the member.

9. A loudspeaker according to claim 8, wherein the member is integral with the surround.

10. A loudspeaker according to claim 9, comprising a groove surrounding the member and which defines the suspension.

11. A loudspeaker according to claim 8, wherein the suspension is such that the member is mounted for pistonic movement, wherein the transducer is coupled between the member and the surround, and wherein the transducer is adapted to move the member pistonically.

12. A loudspeaker according to claim 8, wherein the suspension is such that the member is mounted for pistonic movement, and wherein the surround is in the form of an enclosure, and comprising means for cyclically varying air pressure in the enclosure to cause the member to move pistonically.

13. A loudspeaker according to claim 5, comprising a resilient suspension interposed between the surround and the member.

14. A loudspeaker according to claim 13, wherein the member is integral with the surround.

15. A loudspeaker according to claim 14, comprising a groove surrounding the member and which defines the suspension.

16. A loudspeaker according to claim 1, wherein the transducer is inertial.

17. A loudspeaker according to claim 1, comprising a second panel-form member capable of sustaining bending waves, and a transducer mounted to the second member to form an acoustic radiator which provides an acoustic output, the second member being mounted in an aperture in the first said member.

18. A loudspeaker according to claim 1, comprising first and second transducers mounted to the member at two of the locations.

19. A loudspeaker according to claim 1, comprising a transducer mounted to the member at one of the locations to produce an output signal in response to resonance of the member due to incident acoustic energy.

20. A loudspeaker according to claim 1, wherein the member forms a suspended ceiling tile.

21. A loudspeaker according to claim 1, wherein the member forms part of a housing for a visual display unit.

22. A loudspeaker according to claim 1, wherein the member forms part of a display screen of a computer.

23. A loudspeaker according to claim 1, wherein the member forms part of a portable disc and the like media player.

24. A loudspeaker according to claim 1, wherein the member forms part of the trim in the passenger compartment of a vehicle.

25. A loudspeaker according to claim 24, wherein the member forms part of a passenger seat.

26. A loudspeaker according to claim 24, wherein the member forms part of a door lining.

27. A loudspeaker according to claim 1, wherein the member forms part of an electronic musical instrument.

28. A loudspeaker according to claim 1, wherein the member acts as or forms part of a notice board or the like visual display apparatus on which notices or the like can be displayed.

29. A loudspeaker according to claim 1, wherein the member forms part of a greetings or the like card.

30. A loudspeaker according to claim 1, wherein the member forms part of a display screen having a light reflective or light emitting surface.

31. A loudspeaker according to claim 1, wherein the member forms part of a vending machine.

32. A loudspeaker according to claim 1, wherein the member forms part of packaging.

* * * * *